Nov. 27, 1951 W. T. GOLLWITZER 2,576,596
PLATE BLANK HANDLING MEANS FOR EMBOSSING MACHINES
Filed Aug. 1, 1946 23 Sheets-Sheet 1
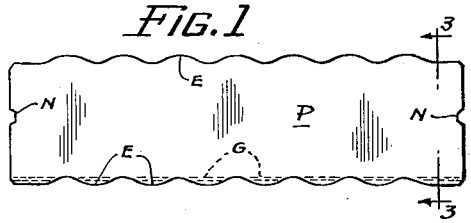
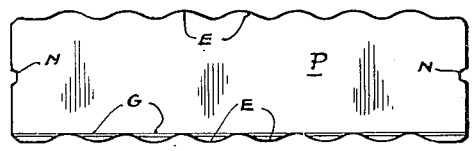
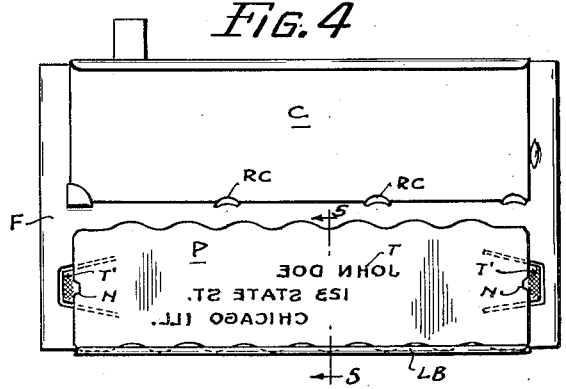
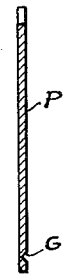
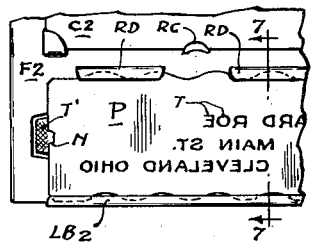
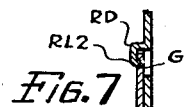
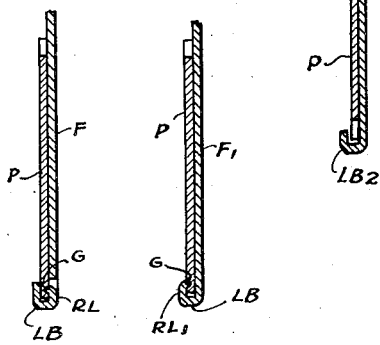
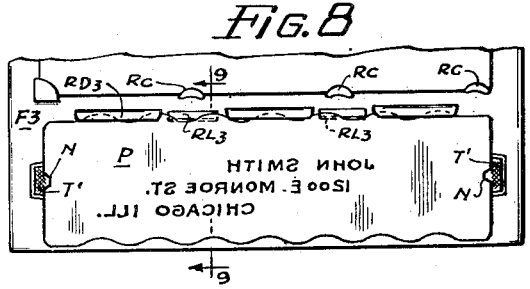
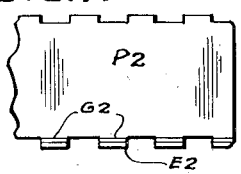
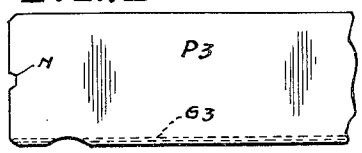
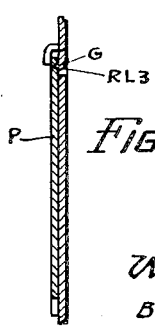
INVENTOR
Walter T. Gollwitzer
BY Wallace and Cannon
ATTORNEYS Nov. 27, 1951 W. T. GOLLWITZER 2,576,596
PLATE BLANK HANDLING MEANS FOR EMBOSSING MACHINES
Filed Aug. 1, 1946 23 Sheets-Sheet 2
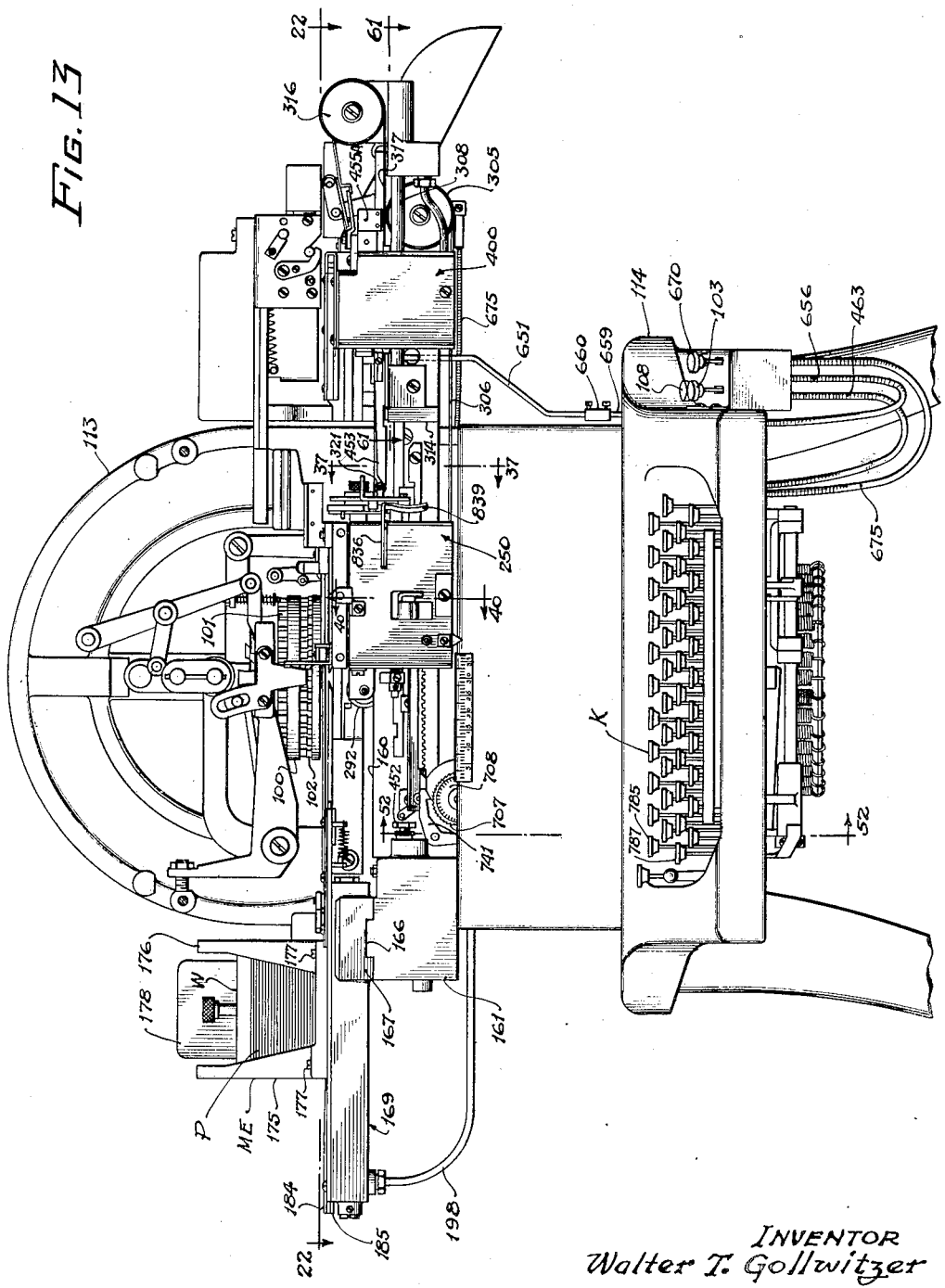
INVENTOR
Walter T. Gollwitzer
BY Wallace and Cannon
ATTORNEYS

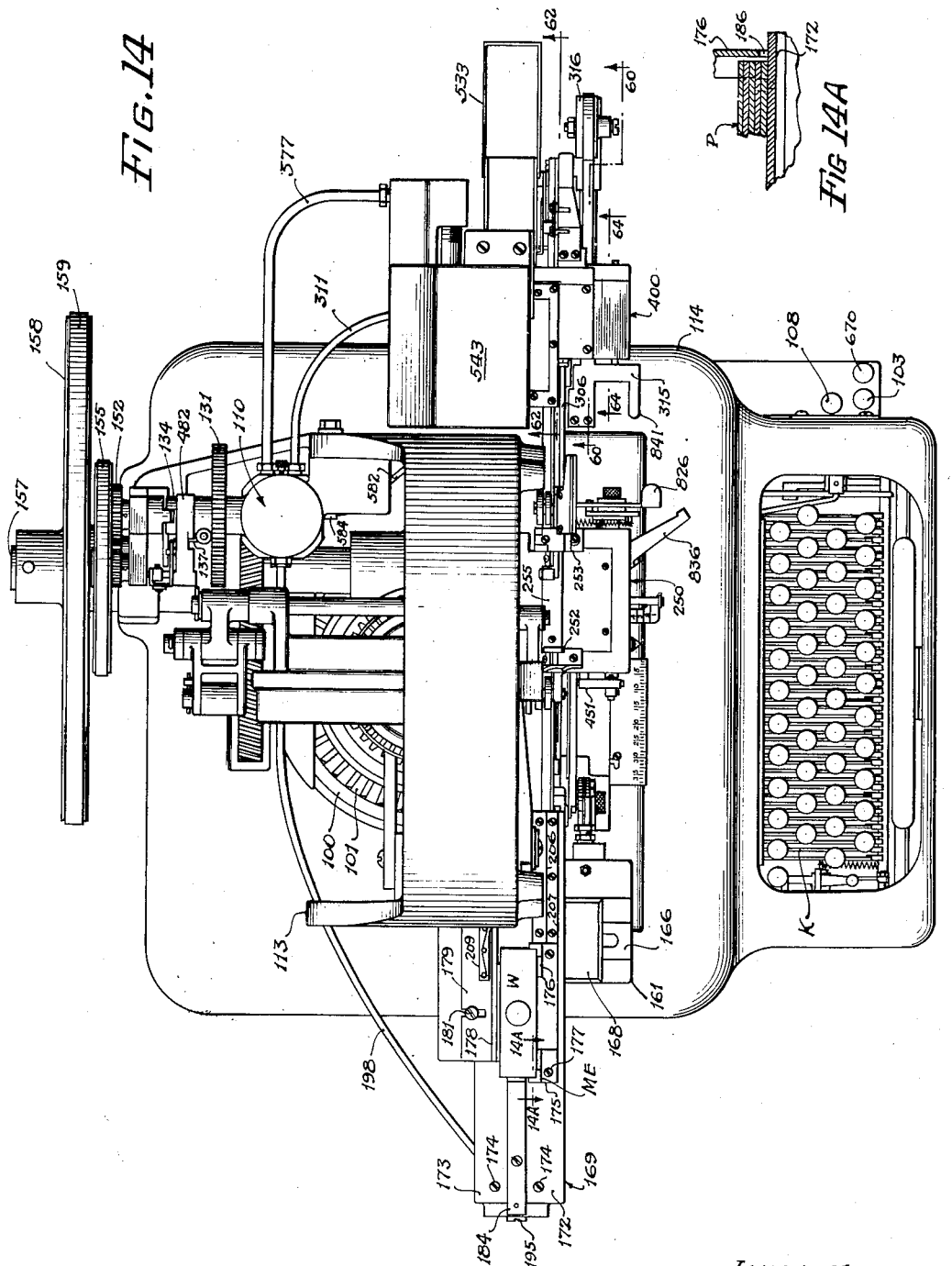

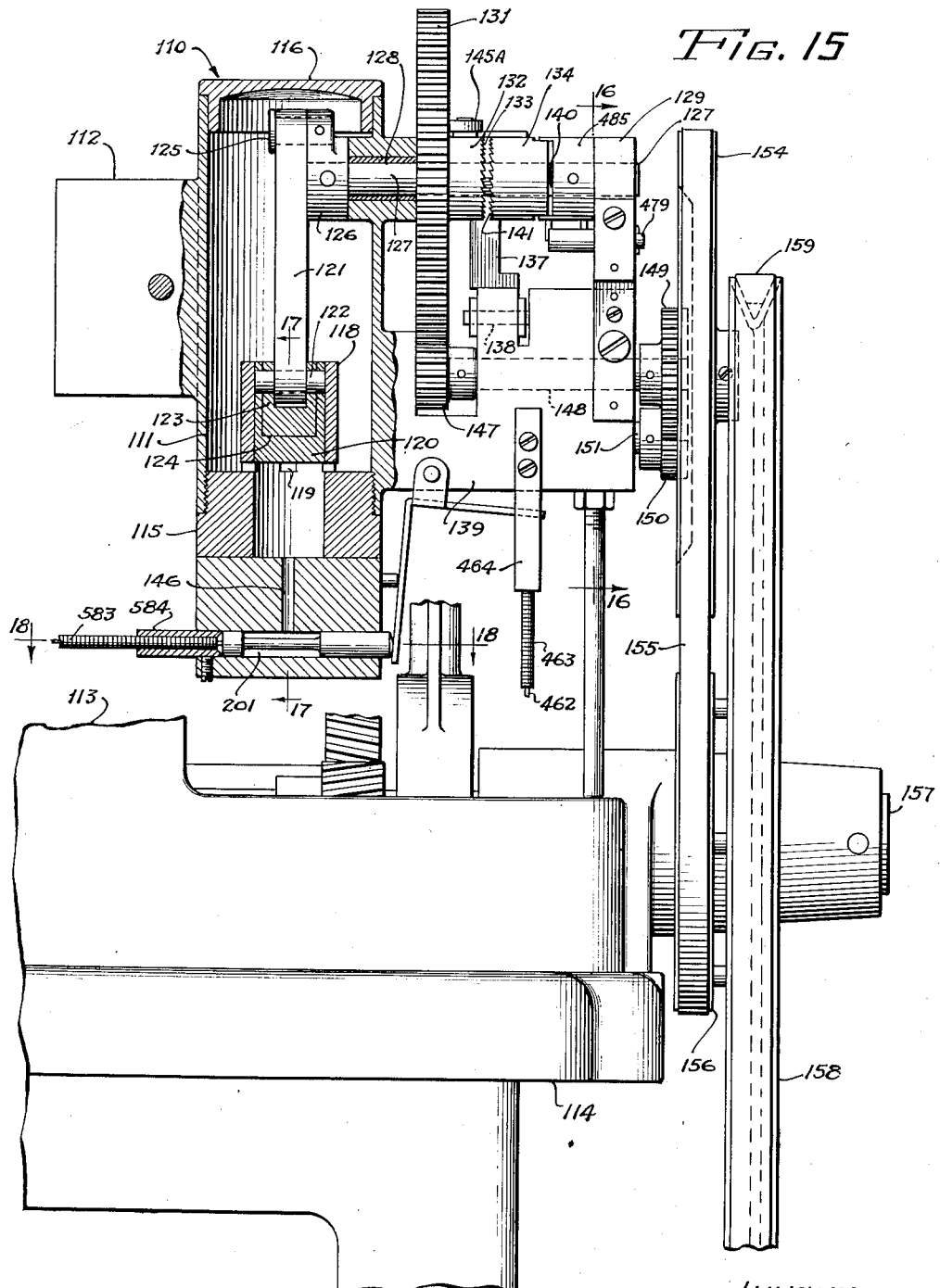

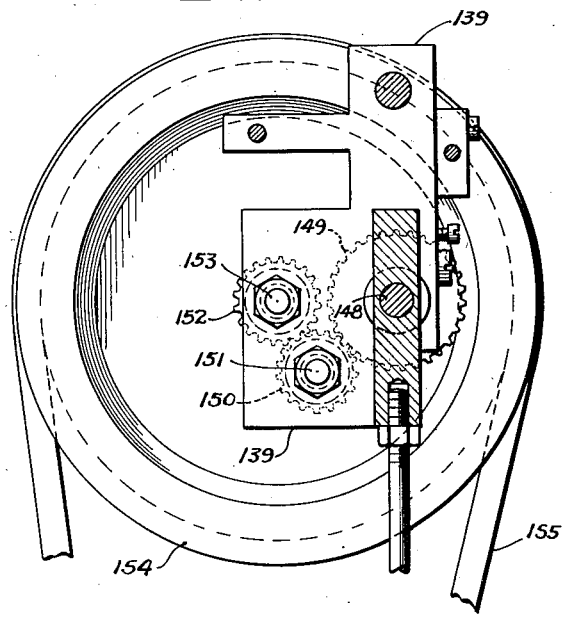
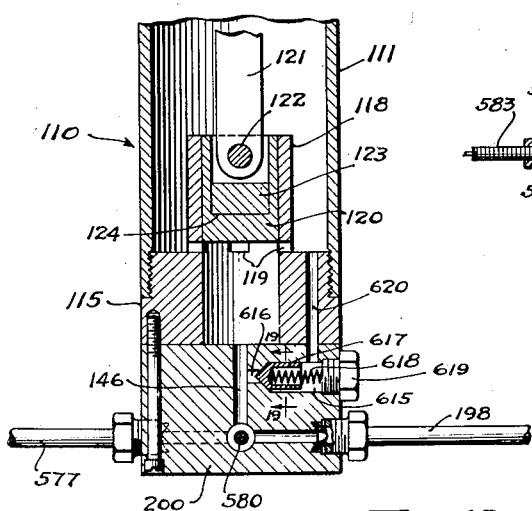
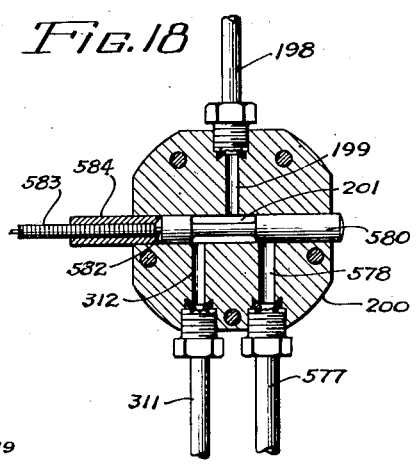
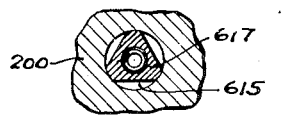

Nov. 27, 1951     W. T. GOLLWITZER     2,576,596
PLATE BLANK HANDLING MEANS FOR EMBOSSING MACHINES
Filed Aug. 1, 1946     23 Sheets-Sheet 6
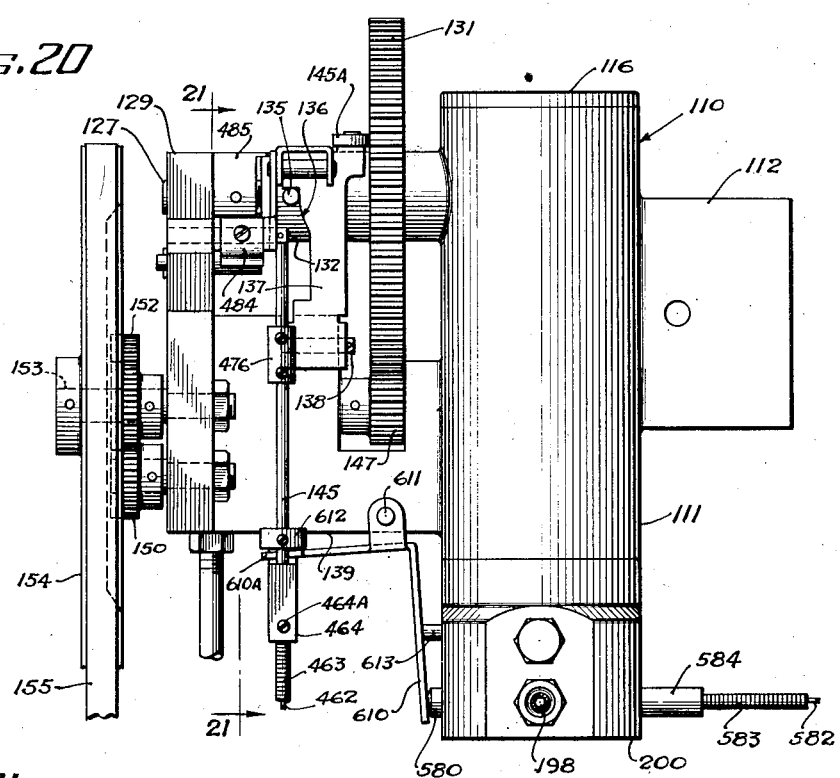
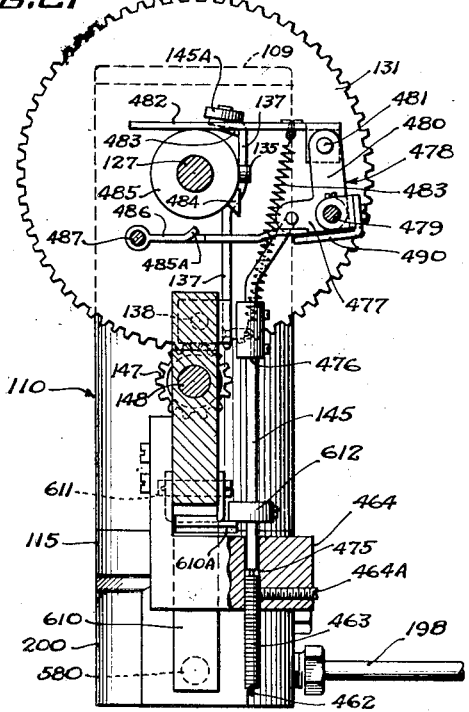
INVENTOR
Walter T. Gollwitzer
BY Wallace and Cannon
ATTORNEYS

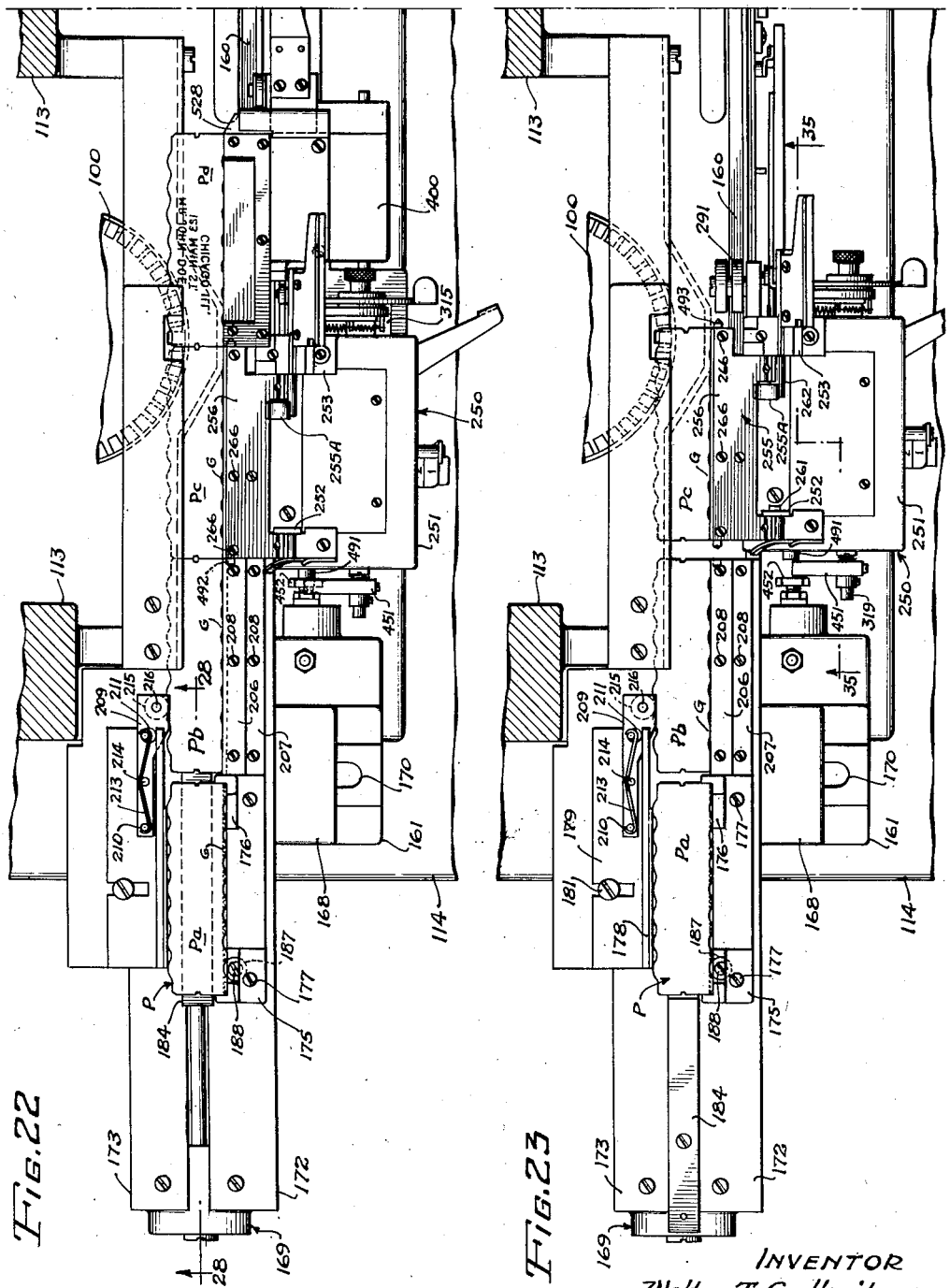

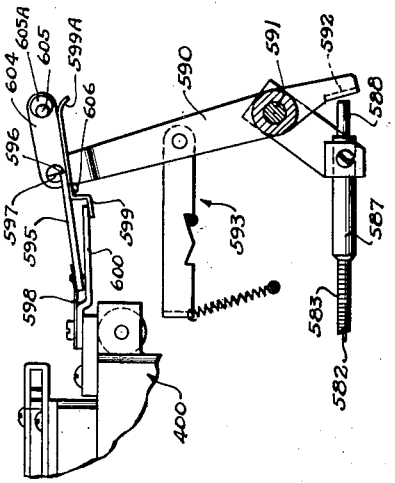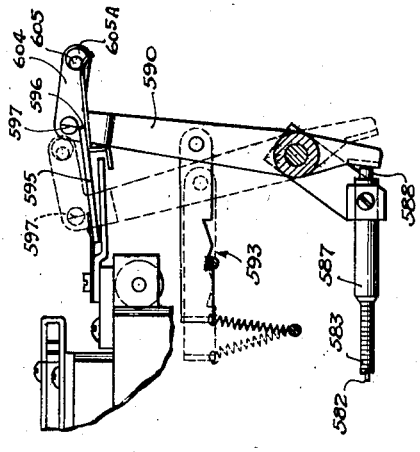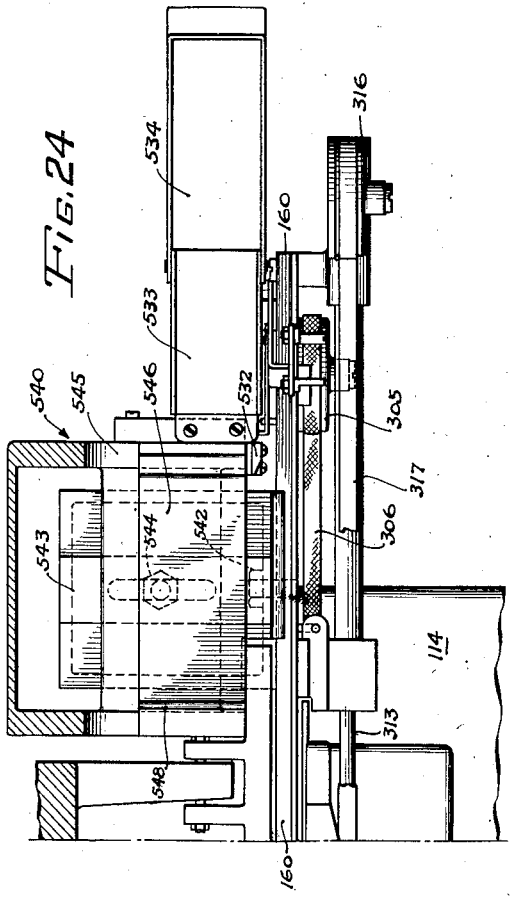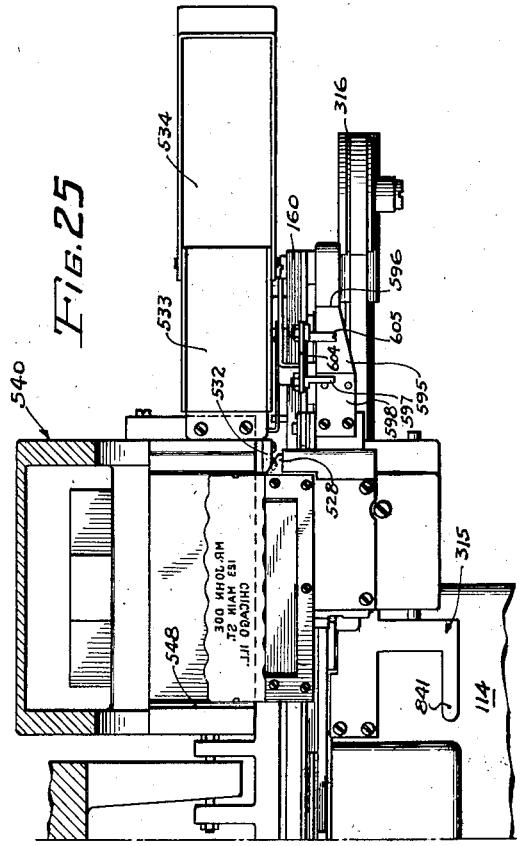

Nov. 27, 1951 W. T. GOLLWITZER 2,576,596
PLATE BLANK HANDLING MEANS FOR EMBOSSING MACHINES
Filed Aug. 1, 1946 23 Sheets-Sheet 9
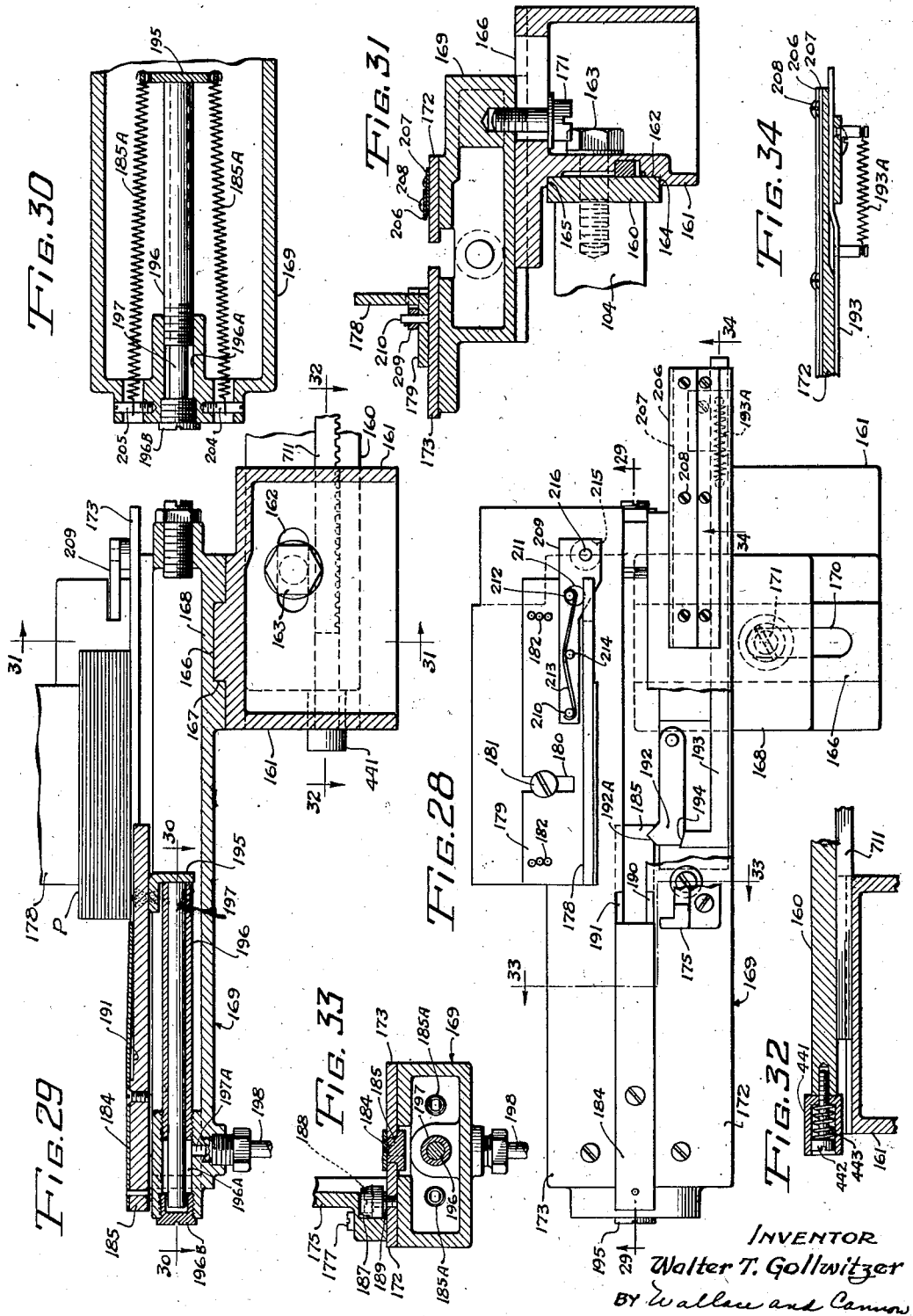
INVENTOR
Walter T. Gollwitzer
BY Wallace and Cannon
ATTORNEYS

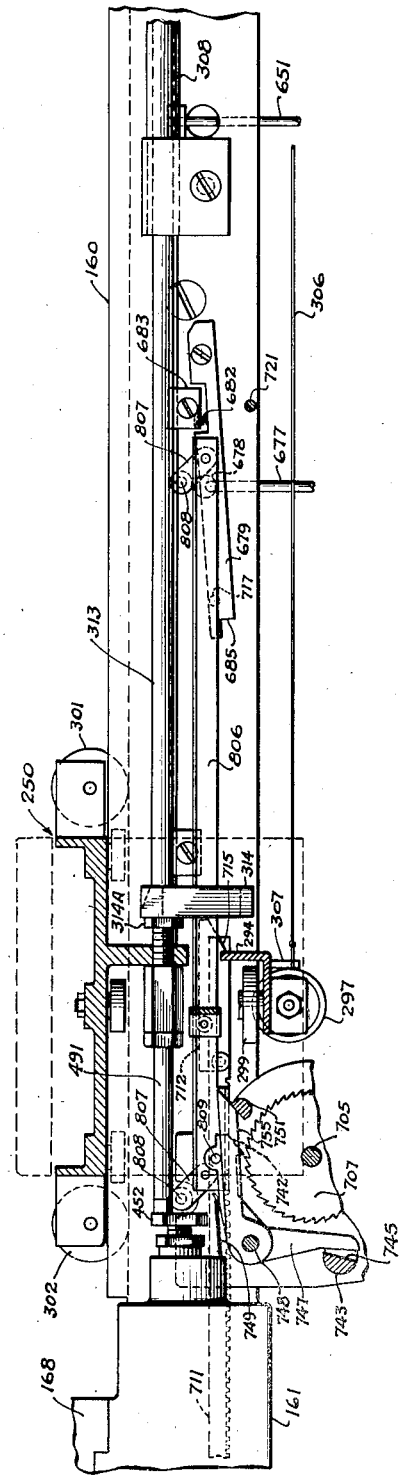

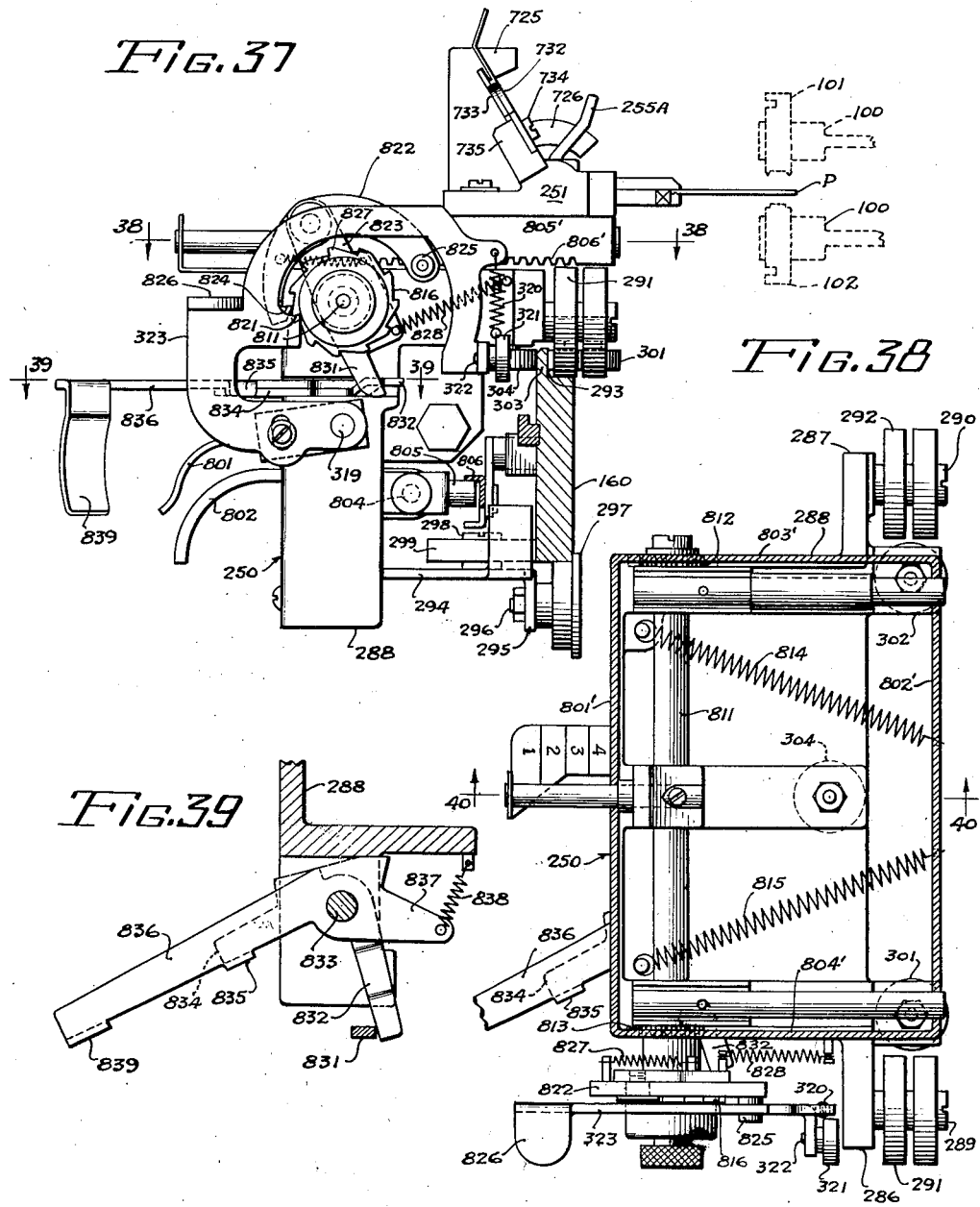

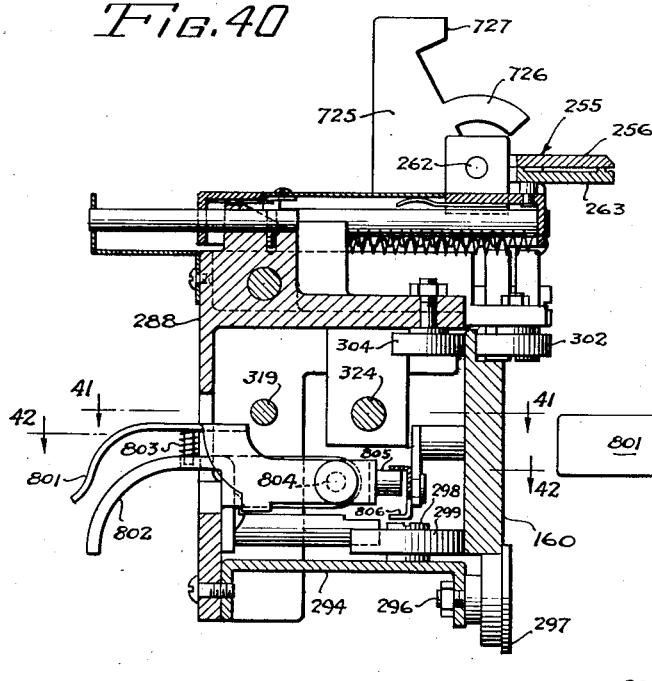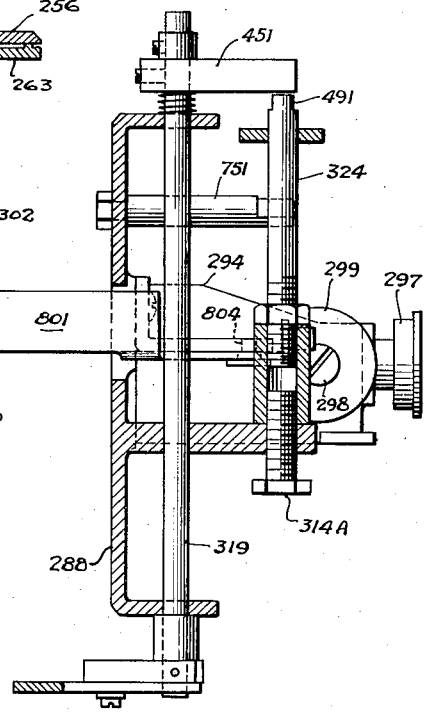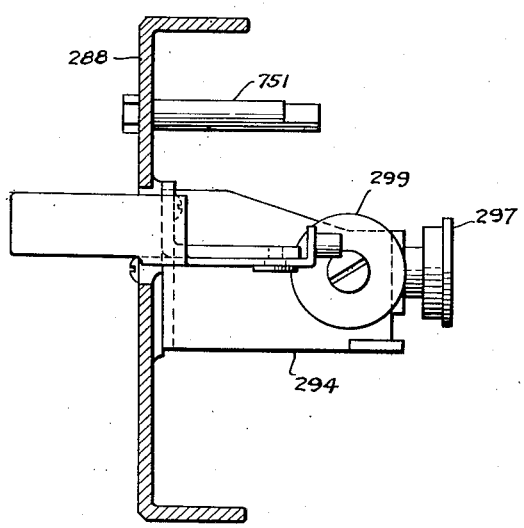

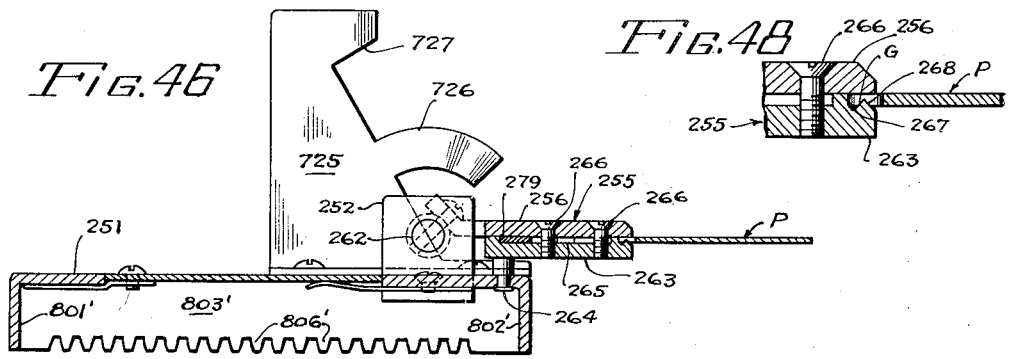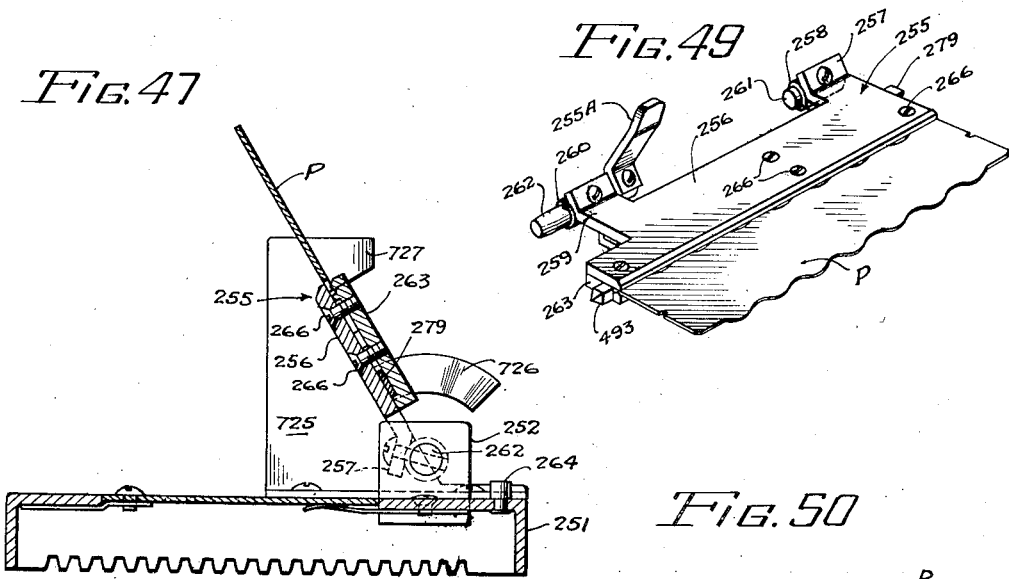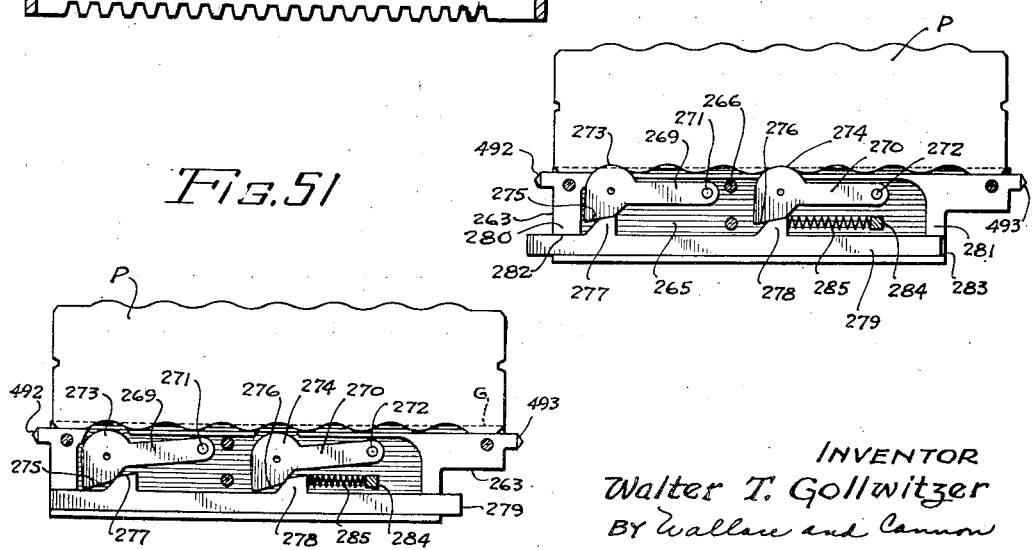

Nov. 27, 1951 W. T. GOLLWITZER 2,576,596
PLATE BLANK HANDLING MEANS FOR EMBOSSING MACHINES
Filed Aug. 1, 1946 23 Sheets-Sheet 15
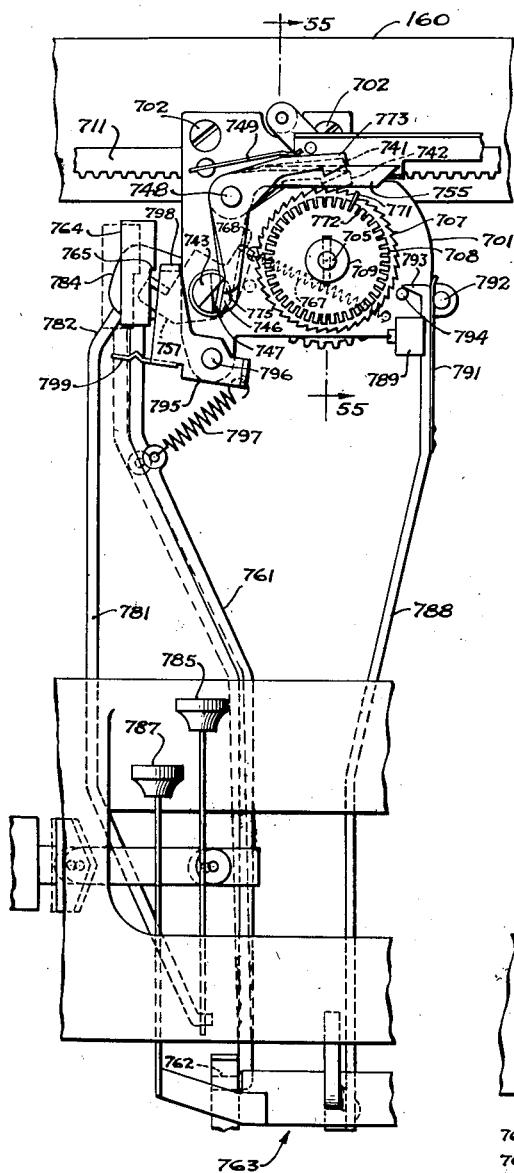
INVENTOR
Walter T. Gollwitzer
BY Wallace and Cannon
ATTORNEYS Nov. 27, 1951  W. T. GOLLWITZER  2,576,596
PLATE BLANK HANDLING MEANS FOR EMBOSSING MACHINES
Filed Aug. 1, 1946  23 Sheets-Sheet 16
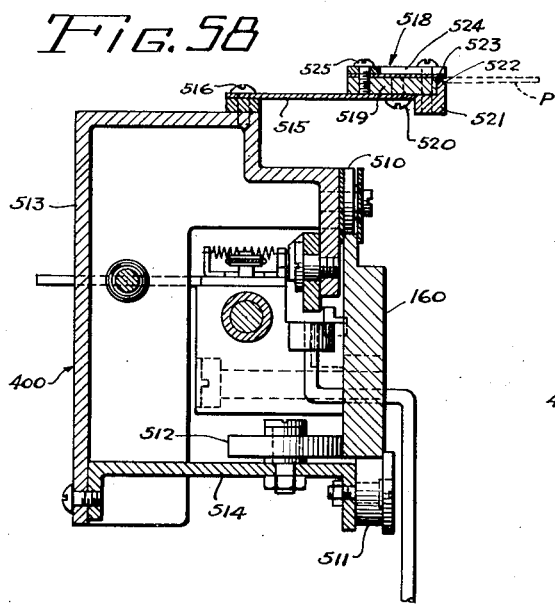
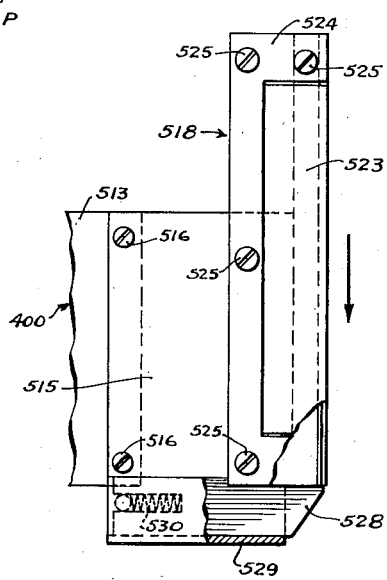
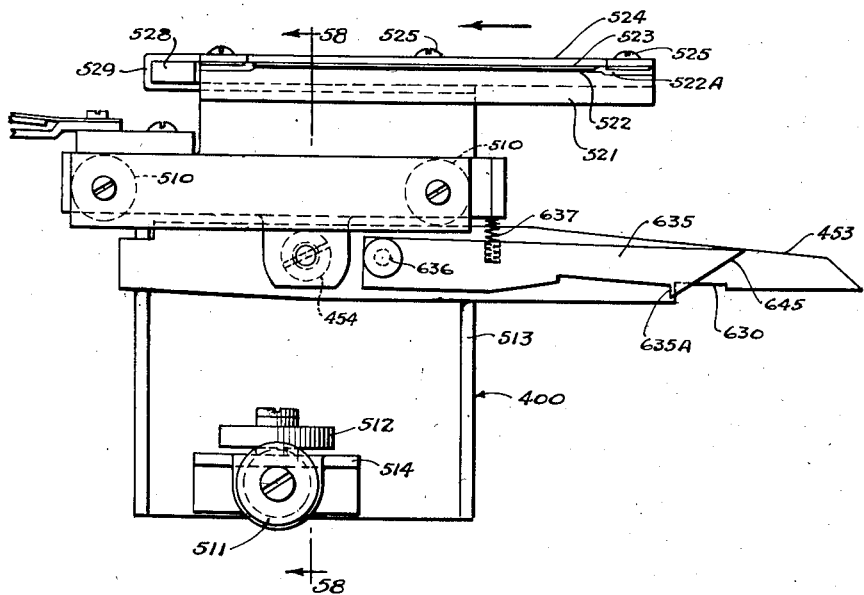
INVENTOR
Walter T. Gollwitzer
BY Wallace and Cannon
ATTORNEYS Nov. 27, 1951 W. T. GOLLWITZER 2,576,596
PLATE BLANK HANDLING MEANS FOR EMBOSSING MACHINES
Filed Aug. 1, 1946 23 Sheets-Sheet 17
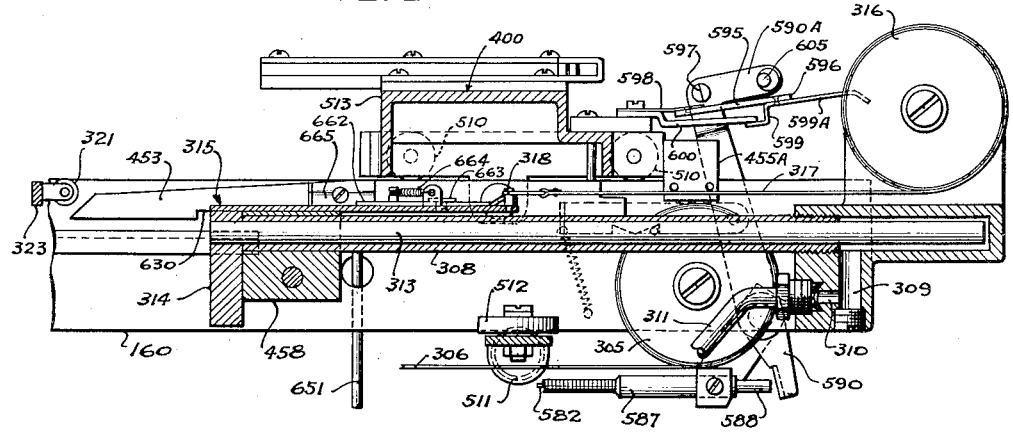
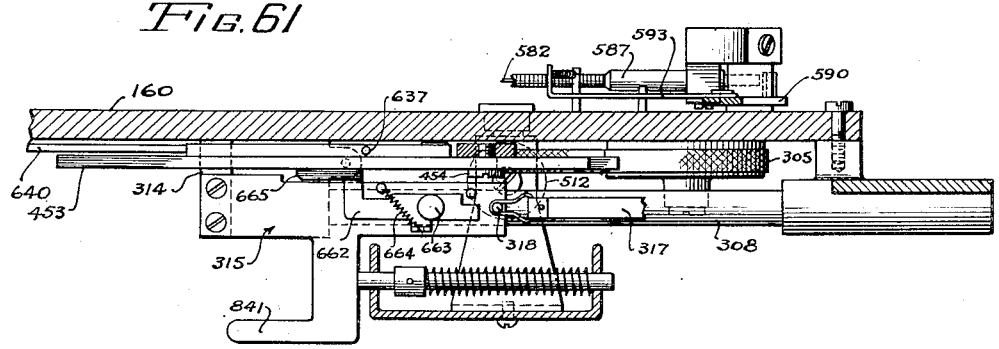
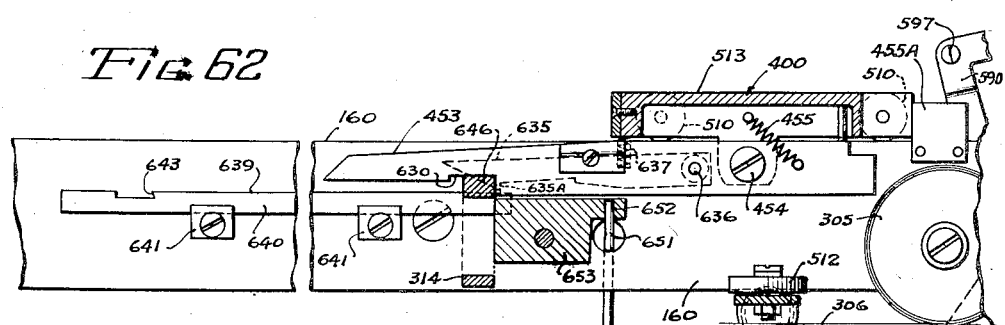
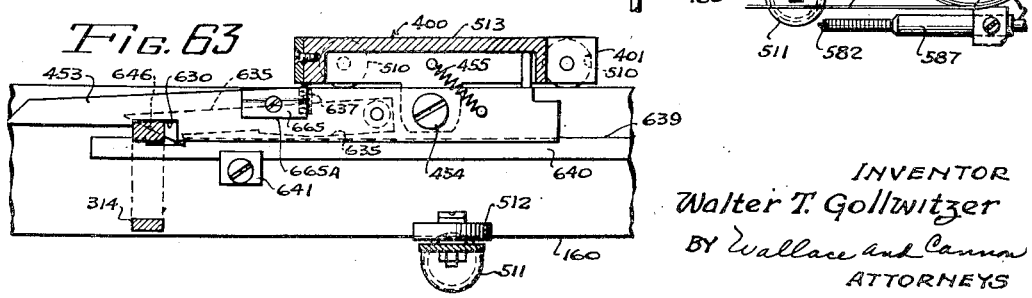
INVENTOR
Walter T. Gollwitzer
BY Wallace and Cannon
ATTORNEYS Nov. 27, 1951 W. T. GOLLWITZER 2,576,596
PLATE BLANK HANDLING MEANS FOR EMBOSSING MACHINES
Filed Aug. 1, 1946 23 Sheets-Sheet 18
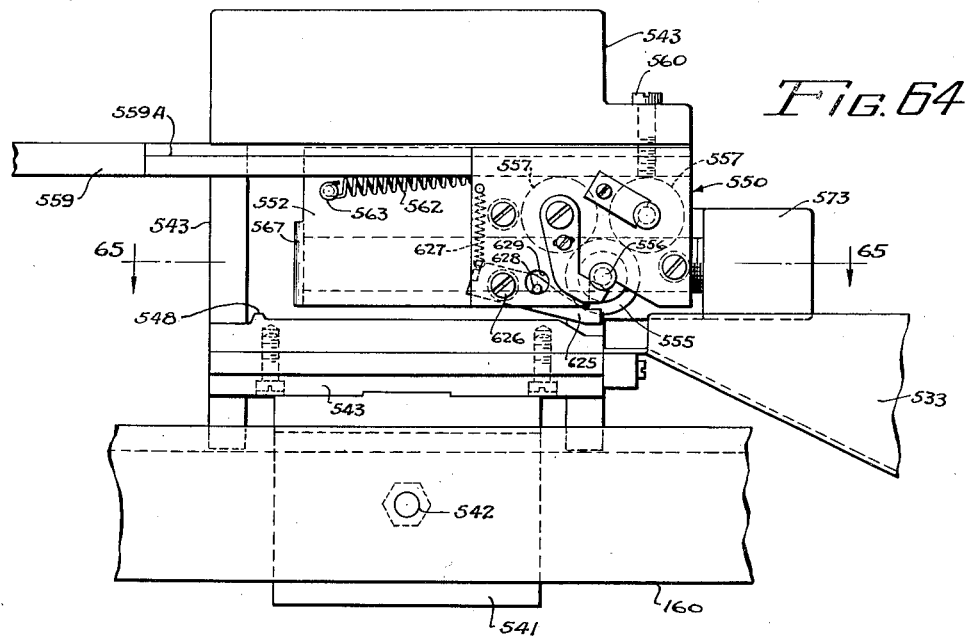
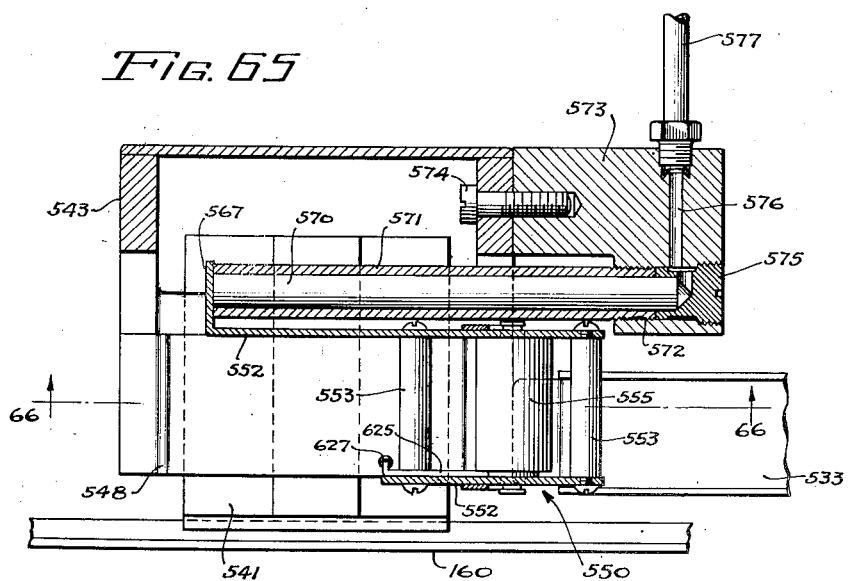
INVENTOR
Walter T. Gollwitzer
BY Wallace and Cannon
ATTORNEYS

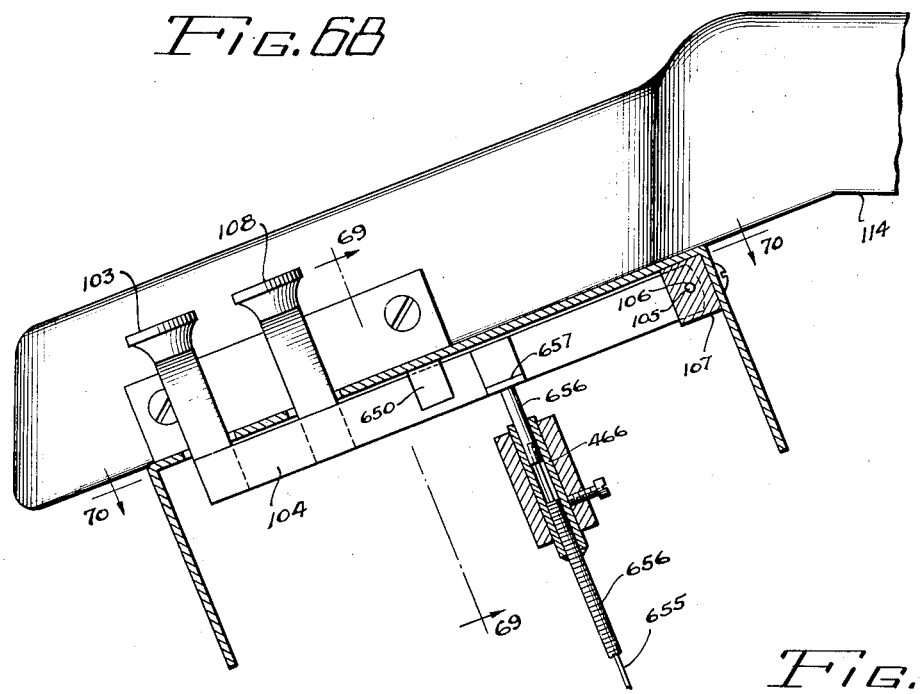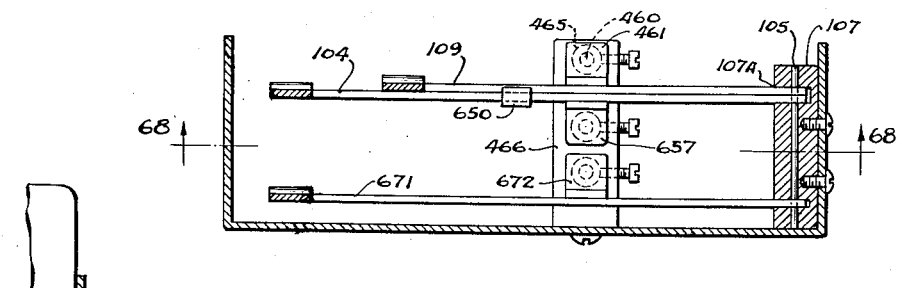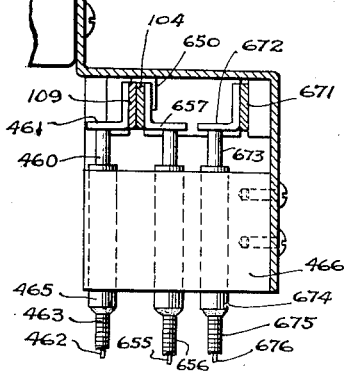

Nov. 27, 1951 W. T. GOLLWITZER 2,576,596
PLATE BLANK HANDLING MEANS FOR EMBOSSING MACHINES
Filed Aug. 1, 1946 23 Sheets-Sheet 21

INVENTOR
Walter T. Gollwitzer
BY Wallace and Cannon
ATTORNEYS

Nov. 27, 1951 W. T. GOLLWITZER 2,576,596
PLATE BLANK HANDLING MEANS FOR EMBOSSING MACHINES
Filed Aug. 1, 1946 23 Sheets-Sheet 22

INVENTOR
Walter T. Gollwitzer
BY Wallace and Cannon
ATTORNEYS

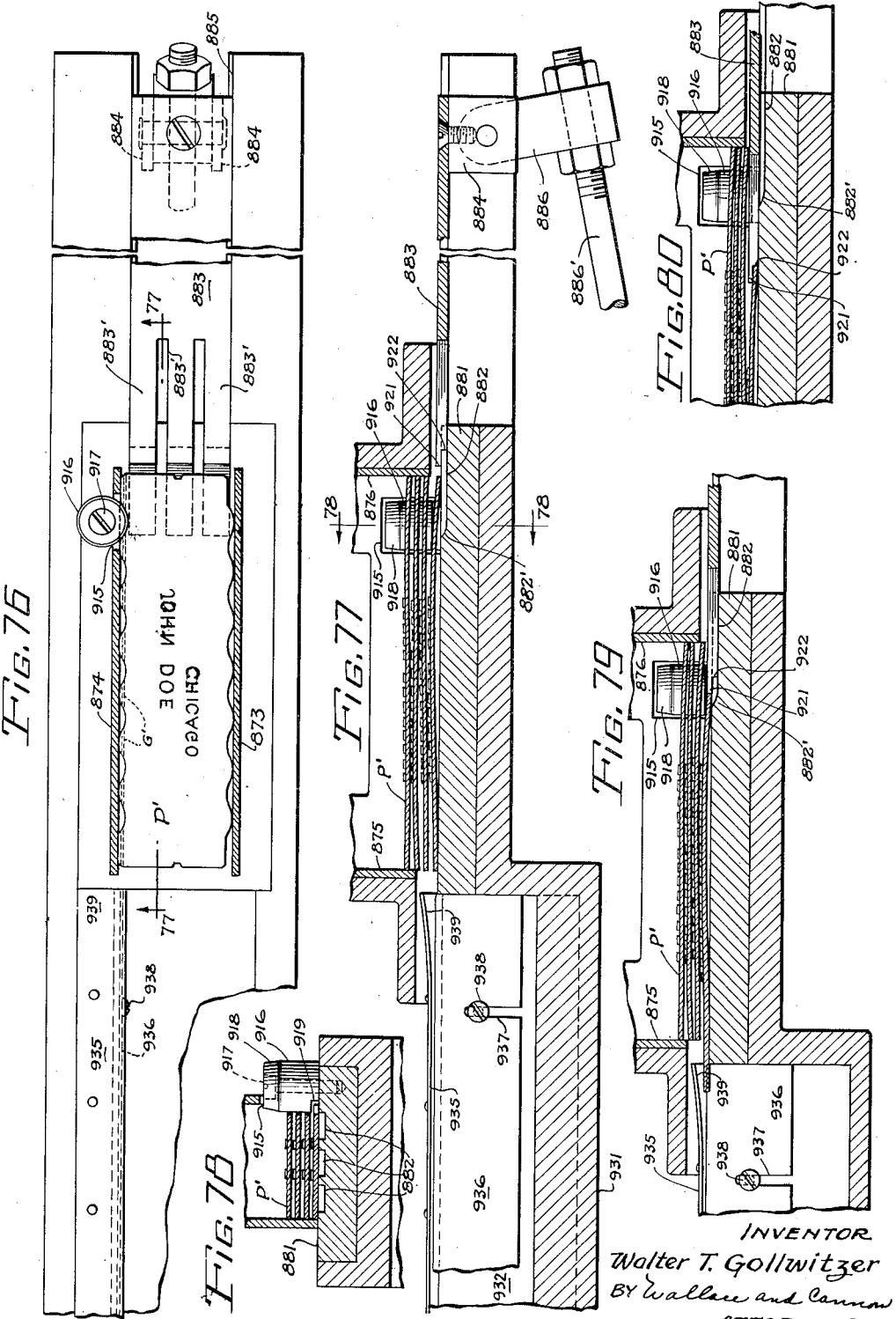

UNITED STATES PATENT OFFICE 2,576,596

PLATE BLANK HANDLING MEANS FOR EMBOSSING MACHINES

Walter T. Gollwitzer, Euclid, Ohio, assignor to Addressograph-Multigraph Corporation, Cleveland, Ohio, a corporation of Delaware Application August 1, 1946, Serial No. 687,724

14 Claims. (Cl. 197—6.6)

The present invention relates to printing plate handling means, and more particularly to such means for use in embossing machines.

More particularly the invention pertains to a novel printing plate, equipment designed to produce such plate, and equipment in which such may be used, all aspects being interrelated so that the advantages inherent in the novel printing plate are utilized both in mechanism such as an embossing apparatus for the further preparation of such device for printing and in mechanism adapted for its use in printing.

It has been customary in the past to employ printing devices of the general character to which one aspect of my present invention relates, to pass such devices through embossing mechanism to provide printing characters thereon, and finally to utilize such devices in printing machines through which the devices are passed sequentially for printing such data as names and addresses of a list of customers, subscribers, and the like. A printing device, which may be simply a printing plate or a more complex unit involving other elements in addition to the plate, is usually provided for each customer, subscriber, etc. A supply of such devices is prepared and retained for periodical reuse. Although such printing devices and the mechanisms with which they are employed have gone into wide use and have been successful in accomplishing great savings in time and economies in various types of operations, they have nevertheless required a great deal of manual handling. Thus, in the past, it has been necessary to take each printing plate and insert it manually into a holding device for passing it through an embossing machine or the like, to form printing characters thereon. After the printing characters have been formed, it has been customary to apply the plate manually to a supporting frame which may bear an identification card, control tabs, and other material. The complete printing device, usually comprising a frame and plate assembly, is then passed through printing mechanism, particular feeding devices being required for handling such printing devices.

It is an object of my present invention to eliminate a large part of the manual handling formerly required in the use of printing devices of the aforesaid character by so modifying the printing plate that certain manual operations may be eliminated and other operations expedited.

A further object of my invention is to so form the printing plate blank itself that it is particularly well adapted for automatic processing through embossing dies and for automatic handling in printing machines.

Another object is to so modify the printing plate per se that it may be utilized in mechanism for embossing, printing, etc., as mentioned above, but is also still suitable for use in existing types of equipment in the manner which has been customary in the past.

Another object is to provide an improved embossing mechanism for forming type characters on plates of the aforesaid character, said embossing mechanism being particularly suited for handling automatically the improved type of printing plate.

Still another object of my invention is to operate plate embossing mechanism entirely automatically, means being provided for feeding plates automatically in sequence to carriage mechanism by which such plates may be processed through embossing dies of standard embossing machines.

Another object is to modify standard embossing machines so as to render them capable of automatic operation in the manner aforesaid without major structural changes.

An additional object is to utilize plates of the aforesaid character by feeding them directly through printing machines without assembling them with frames or carriers.

Still another object is to design printing equipment which is adapted to utilize automatically embossed printing plates of the aforesaid character without necessitating the use of frames, the printing means being designed to hold unmounted plates positively and accurately, and to feed them into operating position in a reliable and exact manner.

Yet another object of the invention is to correlate the improved printing plate, embossing mechanism, and printing equipment for utilizing such plates so that the advantages flowing from the improvement in the plate itself may be fully realized in the operation of the embossing mechanism and the printing machinery.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a plan or face view of the preferred form of the novel printing plate of this invention;

Fig. 2 is a view of the rear face of the plate shown in Fig. 1;

Fig. 3 is a sectional view of the plate shown in Fig. 1 drawn to an enlarged scale and taken substantially on the line 3—3 on Fig. 1;

Fig. 4 is an elevational view of a printing device of the character in which the novel printing plate of the present invention may be utilized;

Fig. 5 is a sectional detail view drawn to an enlarged scale and taken substantially on the line 5—5 on Fig. 4;

Fig. 5A is similar to Fig. 5, showing a modification;

Fig. 6 is a fragmentary elevational view similar to Fig. 4 and showing a modified form of a printing device in which the novel printing plate of this invention may be utilized;

Fig. 7 is a sectional detail view taken substantially on the line 7—7 on Fig. 6;

Fig. 8 is another fragmentary elevational view of yet another modified form of printing device in which the novel printing plate of this invention may be utilized;

Fig. 9 is a sectional detail view taken substantially on the line 9—9 on Fig. 8;

Figs. 10 and 11 are fragmental rear face views similar to Fig. 2 and showing modified forms of the novel printing plate of this invention;

Fig. 12 is a face view, similar to Fig. 1, of another form of plate made according to my invention;

Fig. 13 is a front elevational view of an apparatus in which type characters may be embossed on the novel printing plate of the present invention and which is arranged for use with such a printing plate;

Fig. 14 is a plan view of the embossing machine shown in Fig. 13;

Fig. 14A is a sectional detail view taken substantially along the line 14A—14A, Fig. 14;

Fig. 15 is a front elevational view in which certain parts are broken away of the hydraulic pump and the drive therefor employed in the embossing apparatus shown in Fig. 13;

Figure 43:
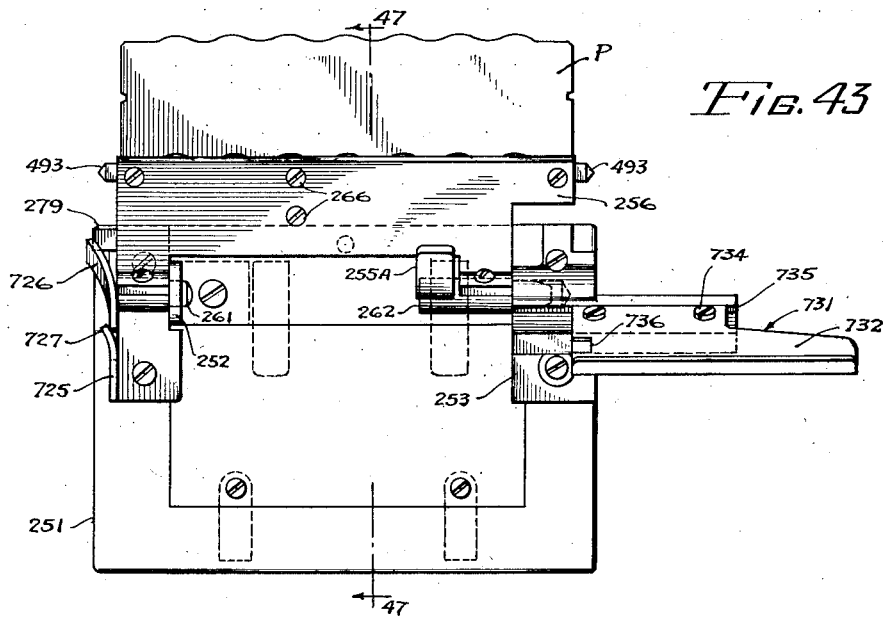
Figure 44:
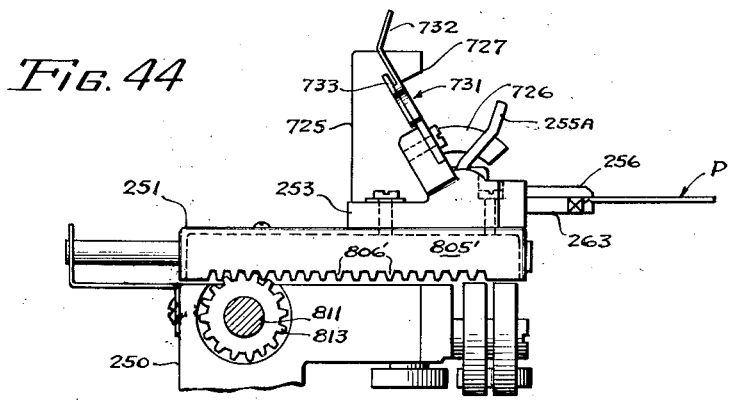
Figure 45:
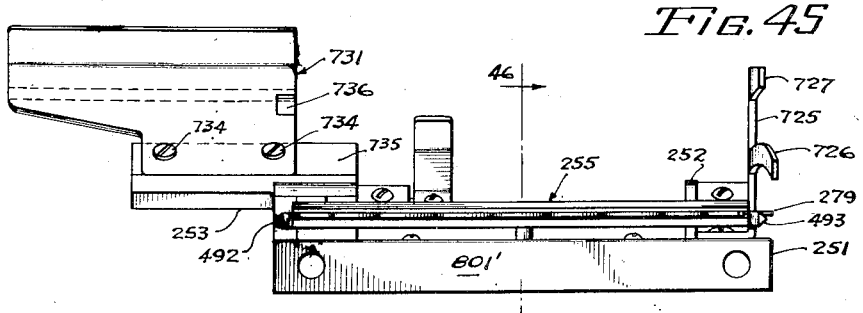
Figure 66:
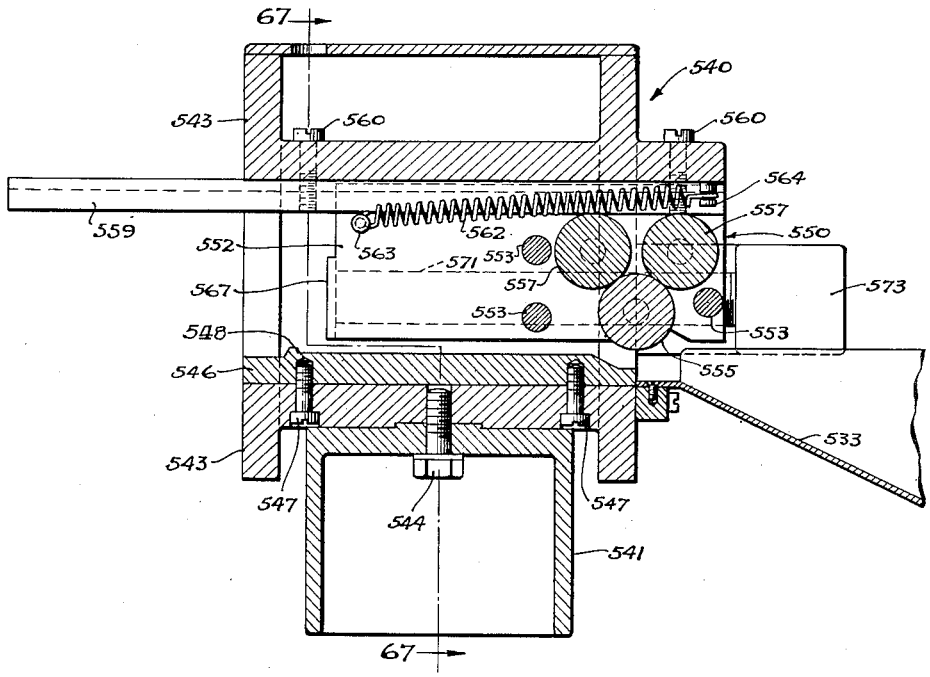
Figure 67:
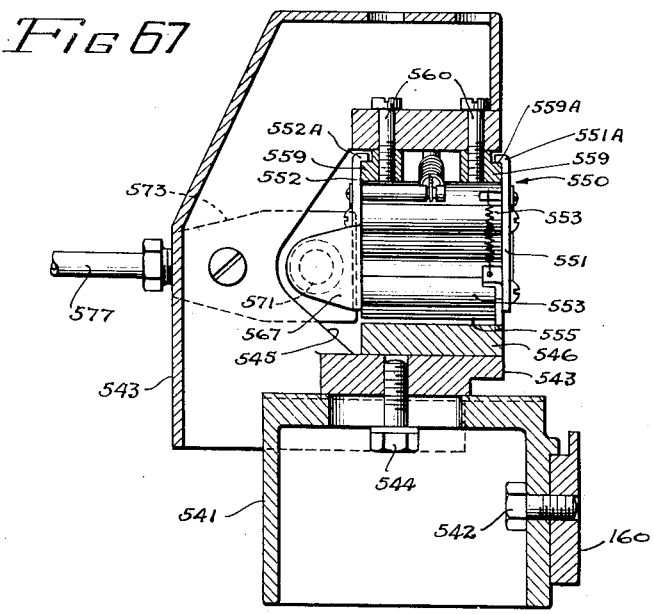
Figure 71:
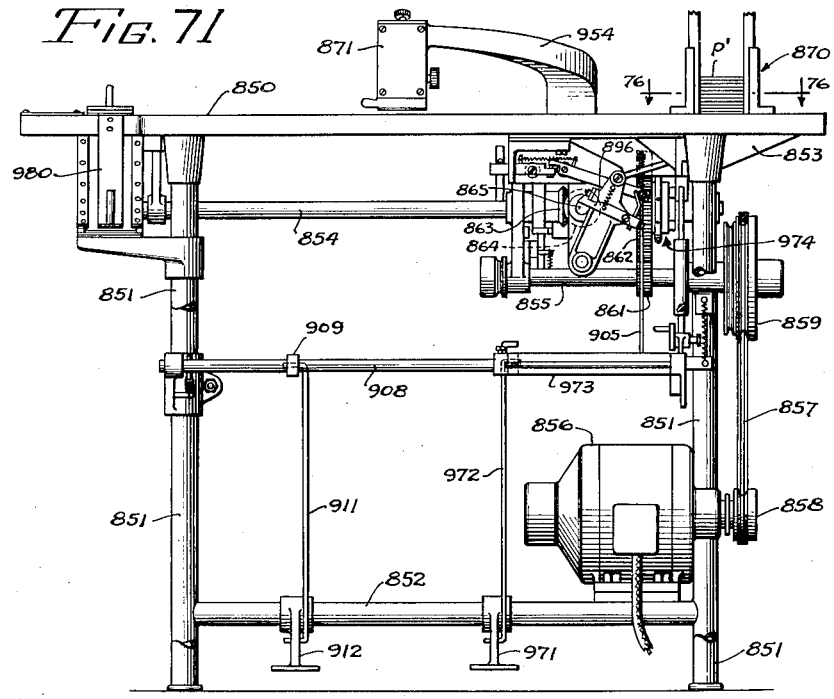
Figure 72:
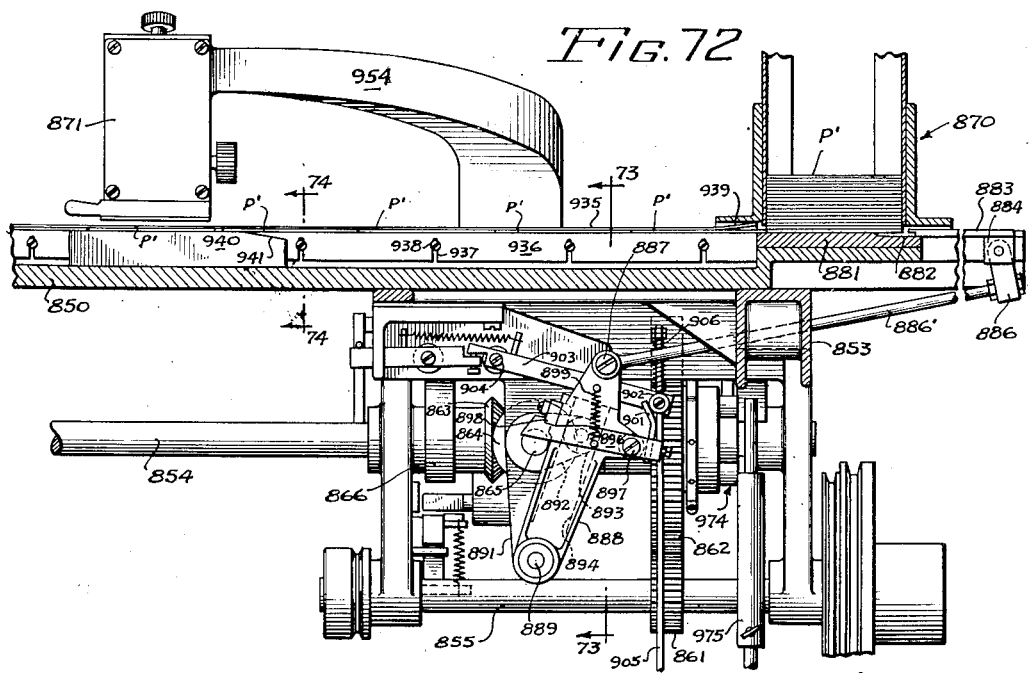
Figure 73:
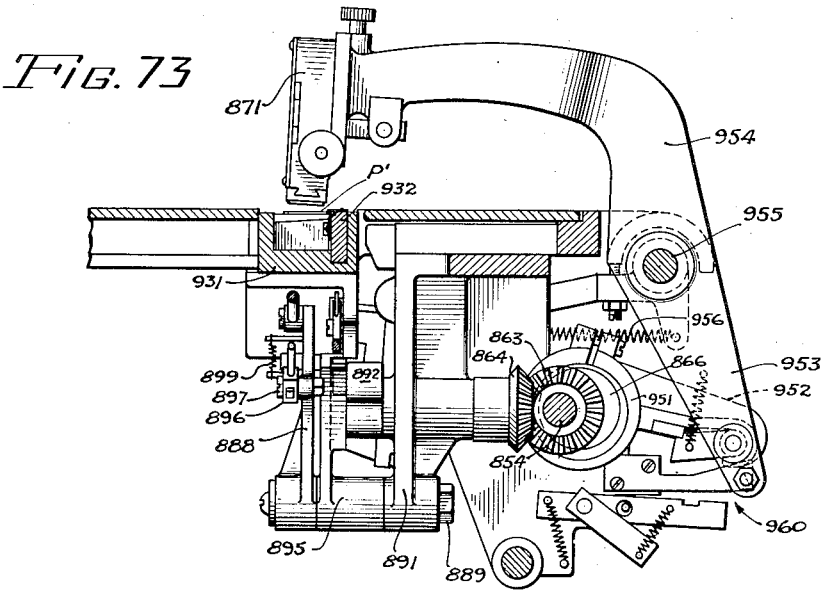
Figure 74:
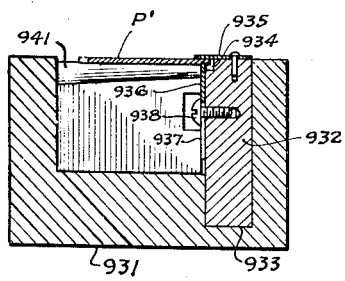
Figure 75:
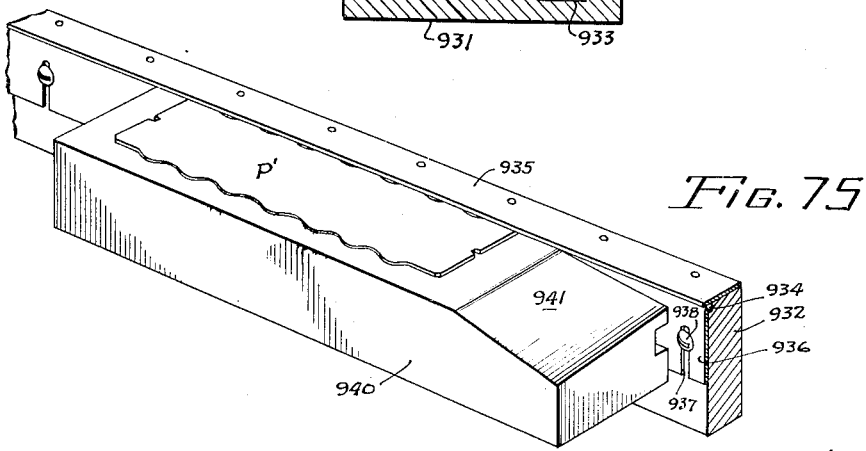

Figs. 16, 17 and 18 are sectional detail views taken substantially and respectively on the lines 16—16, 17—17 and 18—18 on Fig. 15;

Fig. 19 is a fragmentary detail view taken substantially on the line 19—19 on Fig. 17;

Fig. 20 is a rear elevational view of the apparatus shown in Fig. 15;

Fig. 21 is a detail view taken substantially on the line 21—21 on Fig. 20;

Fig. 22 is a fragmentary plan view taken substantially on the line 22—22 on Fig. 13 but showing the plate receiving carriage in position to have a plate discharged therefrom and also to have a new plate inserted thereinto;

Fig. 23 is a view similar to Fig. 22 but showing the carriage in the position occupied thereby at the start of an embossing operation;

Fig. 24 is a continuation of Fig. 22 and when joined, Figs. 22 and 24 illustrate the entire carriage mechanism and associated devices;

Fig. 25 is a view similar to Fig. 24 which when joined to Fig. 23 shows the remaining portion of the apparatus;

Fig. 26 is a fragmentary detail view of a control arrangement for the hydraulic system employed to control movements of the carriage and other functions of the embossing apparatus illustrated in Fig. 13;

Fig. 27 is another view of the control arrangement shown in Fig. 26 and showing the parts in an operative position different from that shown in Fig. 26;

Fig. 28 is a plan view of the mechanism employed to load the novel printing plates of the present invention into the carriage adapted to receive the same included in the embossing apparatus illustrated in Fig. 13;

Fig. 29 is a vertical sectional detail view taken substantially on the line 29—29 on Fig. 28;

Figs. 30, 31 and 32 are horizontal sectional detail views taken substantially and respectively on the lines 30—30, 31—31 and 32—32 on Fig. 29;

Figs. 33 and 34 are sectional detail views taken substantially and respectively on the lines 33—33 and 34—34 on Fig. 28;

Fig. 35 is a vertical sectional view taken substantially on the line 35—35 on Fig. 23;

Fig. 36 is a view similar to Fig. 35 but showing the parts in an operative position different from that shown in Fig. 35;

Fig. 37 is a sectional detail view taken substantially on the line 37—37 on Fig. 13 and showing the relation between a plate to be embossed and the means for embossing the same;

Figs. 38 and 39 are sectional detail views taken substantially and respectively on the lines 38—38 and 39—39 on Fig. 37;

Fig. 40 is a vertical sectional detail view taken substantially on the line 40—40 on Fig. 13;

Figs. 41 and 42 are sectional detail views taken substantially and respectively on the lines 41—41 and 42—42 on Fig. 40;

Fig. 43 is a fragmentary plan view of the main carriage of the embossing apparatus;

Fig. 44 is an elevational view looking in at the right-hand side of Fig. 43;

Fig. 45 is an elevational view looking in at the upper edge of the apparatus as it is illustrated in Fig. 43;

Fig. 46 is a sectional detail view taken substantially on the line 46—46 on Fig. 45;

Fig. 47 is a sectional detail view taken substantially on the line 47—47 on Fig. 43 but showing the jaw of the carriage in an operative position different from that shown in Fig. 43;

Fig. 48 is a detail view of the end portion of the body of the carriage as illustrated in Fig. 46 but drawn to an enlarged scale;

Fig. 49 is a perspective view of the jaw of the carriage as illustrated in section in Fig. 46;

Fig. 50 is a plan view of the jaw of the carriage with the top plate of the jaw removed and showing the parts in latched position;

Fig. 51 is a view similar to Fig. 50 but showing the operative parts in unlatched position;

Fig. 52 is a detail view taken substantially on the line 52—52 on Fig. 13 and showing the escapement mechanism and associated parts;

Figs. 53 and 54, respectively, are fragmentary views similar to the upper part of Fig. 52 but showing operative parts of the escapement mechanism in positions different from that shown in Fig. 52;

Fig. 55 is a sectional detail view taken substantially on the line 55—55 on Fig. 52;

Fig. 56 is a fragmentary perspective view of the operating bolt for the escapement pawl of the escapement shown in Fig. 52;

Fig. 57 is a front elevational view of an auxiliary carriage employed in the embossing apparatus illustrated in Fig. 13;

Fig. 58 is a sectional detail view taken substantially on the line 58—58 on Fig. 57;

Fig. 59 is a fragmentary plan view in which certain parts are broken away of the plate holding jaw of the auxiliary carriage shown in Figs. 57 and 58;

Fig. 60 is a vertical sectional view taken substantially on the line 60—60 on Fig. 14;

Fig. 61 is a horizontal sectional detail view taken substantially on the line 61—61 on Fig. 13;

Fig. 62 is a vertical sectional view taken substantially on the line 62—62 on Fig. 14;

Fig. 63 is a fragmentary view similar to Fig. 62 but showing certain of the operative parts in an operative position different from that shown in Fig. 62;

Fig. 64 is a detail view taken substantially on the line 64—64 on Fig. 14 in which certain parts are broken away;

Fig. 65 is a sectional detail view taken substantially on the line 65—65 on Fig. 64;

Fig. 66 is a sectional detail view taken substantially on the line 66—66 on Fig. 65;

Fig. 67 is a sectional detail view taken substantially on the line 67—67 on Fig. 66;

Fig. 68 is a vertical sectional view taken interiorly of the casing about the keyboard at the right hand end of Fig. 14 and taken along the line 68—68 on Fig. 70;

Fig. 69 is a vertical sectional view taken substantially along the line 69—69 on Fig. 68;

Fig. 70 is a sectional view showing elements of the keyboard and taken substantially along the line 70—70, Fig. 68;

Fig. 71 is a front elevational view of a printing machine in which the novel printing plates of the present invention may be utilized;

Fig. 72 is a vertical sectional view taken through the printing plate guideway of the printing machine shown in Fig. 71;

Figs. 73 and 74, respectively, are detail views taken substantially on the lines 73—73 and 74—74 of Fig. 72, the scale of Fig. 74 being enlarged;

Fig. 75 is a perspective detail view of the printing plate guideway and the anvil upon which the printing plates come to rest when an impression is to be made therefrom in the printing machine shown in Fig. 71;

Fig. 76 is a sectional view taken substantially on the line 76—76 on Fig. 71;

Fig. 77 is a sectional view taken substantially on the line 77—77 on Fig. 76;

Fig. 78 is a sectional view taken substantially on the line 78—78 on Fig. 77; and Figs. 79 and 80 are fragmentary sectional views similar to Fig. 77 but showing certain of the parts in operative positions different from those in which the parts are illustrated in Fig. 77.

The novel printing plate of the present invention is so constituted and arranged that plates of this nature may be stacked in the magazine of an embossing apparatus to be thereafter automatically withdrawn from the magazine and fed into a jaw adapted to receive and retain the same while type characters are embossed on the plate during the embossing operation and thereafter the novel plate may be rolled to flatten the same and insure that the type characters embossed thereon are of uniform height. Likewise after type characters have been embossed on the novel printing plates of the present invention these may be introduced into the magazine of a printing machine that is constituted and arranged to have printing plates fed therethrough. In order that the novel printing plates of the present invention may be thus automatically advanced through embossing, printing and like machines I provide a groove in desirably rectangular printing plates P of this invention adjacent one of the longer edges of the plate.

Thus as illustrated in Fig. 1 a printing plate of the character disclosed in my Patent No. 1,955,803, patented April 24, 1934, is provided in the present invention with a discontinuous groove G formed in one face thereof to pass across the base of the serpentine projections E along one of the longer edges of this plate. It is advantageous to afford a groove as G in a plate as P because so to do enables such a plate to be used in accordance with the present invention and yet enables the plate to be used in the same manner as that in which a plate such as that disclosed in my aforesaid Patent No. 1,955,803 may be utilized.

Using a plate of the type shown in Fig. 10, a groove as G1 may be formed to intersect the bases of the projections E1 along the edge of a printing plate as P1, this particular plate being of the general character disclosed, for example, in Duncan Patent No. 808,909 patented January 2, 1906. As a further modification, a similar groove as G2 may be formed to intersect substantially rectangular projections E2 provided along the edge of a plate as P2, as disclosed in Fig. 11. A groove of the same character, as shown at G3, may be provided adjacent one of the longer edges of a substantially rectangular plate as P3, Fig. 12, which is not provided with serpentine or serrated projections along the longer edges thereof. With all these various kinds of plates, however, a groove as G, G1, G2 or G3 will be formed in one face of the plate, and preferably the lower or intaglio face, adjacent to and generally parallel with one of the longer edges thereof; since so to do enables such plates to be fed through embossing, printing or like machines without mounting such plates in the frame or carrier customarily provided for printing plates as these have been used heretofore.

In the plate P3, Fig. 12, there is preferably provided a notch which may be arcuate in form and of a width and depth generally corresponding to the width and depth of one of the concave elements between projecting parts E of the serpentine edged plate of Figs. 1 and 2. The purpose of this notch is to cooperate with certain feeding mechanism, as will be explained hereinafter. As the plates of Figs. 1, 10, and 11 all have notch elements, provision of a special notch therein is unnecessary.

While in the illustrated forms of my invention I have shown the groove as G formed adjacent to one of the longer edges of a substantially rectangular printing plate as P, it will be understood that such a groove might, if desired, be formed along one of the shorter edges of a substantially rectangular printing plate without departing from the purview of my invention, for so to do will enable a printing plate to be fed through embossing, printing and like machines in the same manner, generally speaking, as that in which a plate having a groove as G formed therein adjacent one of the longer edges thereof may be fed through such machines. Also, while the groove is preferably in the lower or intaglio face, it may be formed in the upper or printing face of the plate.

A groove as G may be formed in a printing plate as P by resort to a die equipped with a cutting blade that will be effective to form the groove as G in the course of operation of the die. Grooving of the plate may thus be accomplished simultaneously with the operation of cutting the plate out of sheet stock, if desired. However, in some instances it may be advantageous to feed pre-cut printing plates, or strips from which such plates are to be cut, which are to be equipped with the grooves G, past a suitable rotating cutting tool. To do so is within the purview of my invention although preferably the groove as G will be formed by providing a die with a cutting blade as above described.

The novel printing plate of the present invention is suitable for use as formed and need not be mounted in a frame or carrier F in the manner in which similar printing plates have heretofore been mounted. However, the novel printing plate of the present invention may advantageously be utilized in a frame or carrier. Thus where it is advantageous to have an index card associated with the printing plate so as to facilitate filing and other handling of the printing plate, such a plate may be mounted advantageously in a frame or carrier F. Any of the illustrated plates as P, P1, P2 or P3 may be mounted in a frame or carrier in place, for example, of a plate of the character shown in my aforesaid Patent No. 1,955,803. Thus the plate P, Fig. 1, of the present invention is capable of being mounted directly in the frame or carrier shown in that patent in the same manner as that in which the serpentine or wavy edged plate shown in that patent may be mounted in such frame. Likewise, the plates P1, P2 or P3 may be used in frames or carriers of the character widely used in the prior art, for example, in the carrier disclosed in the aforesaid Duncan Patent No. 808,909.

However, where a printing plate as P is equipped according to my present invention, with a groove such as G, Figs. 1 and 2, resort may be had advantageously to a frame or carrier particularly constituted and arranged to cooperate with such a plate. One of the marked advantages of the present invention is that such a plate may be effectively retained on such a carrier by merely engaging one marginal portion of the plate adjacent the groove formed therein with a suitable retaining means afforded on the frame or carrier. In such an instance plate retaining means need not be provided on the carrier for the opposite edge of the plate.

Thus, for example, on the frame or carrier F shown in Fig. 4, which is generally of the character disclosed in my Patent No. Re. 22,249, patented January 12, 1943, a card C is retained on the face of the frame F by means RC in the customary manner. It will be noted, however, that the frame F does not include retaining devices arranged for cooperation with the edge of the plate P, mounted on the frame F, that lies adjacent to the index card C. As is customary, the frame F is provided with a lower bead LB which extends along the lower edge thereof. However, beneath the plate and opposite the upturned edge of the lower bead LB, an element of the frame is formed to project into the groove and provide a retaining lip RL. See Fig. 5. The free edge of the retaining lip RL is desirably formed to be complementary to the cross sectional configuration of the groove as G and where in the present instance the groove as G is substantially V-shaped in cross section, the free edge of the retaining lip RL is likewise of V-shaped cross section. The free edge of the retaining lip RL is accurately spaced from the adjacent face of the lower bead LB, such spacing being accurately related to the thickness of the plate between the inner edge of the groove as G and the face of the plate opposite that in which the groove G is formed. Therefore, when a plate as P is slid into a retaining bead as LB, the retaining lip as RL may pass into the groove as G, and in view of the interrelationship between the aforesaid thickness of the plate and the spacing of the free edge of the retaining lip RL from the bead LB, the plate as P is held in position between the bead LB and the lip RL. The fitting of the retaining lip as RL into the groove as G is of course effective to prevent transverse movement of the plate as P on the frame as F. In order to prevent longitudinal movement of the plate on the frame, resort may be had to yielding tongues such as are customarily provided for this purpose, the tongues T shown in Fig. 4 desirably being of the character disclosed in my aforesaid Patent No. Re. 22,249. In order that the plate as P may cooperate with tongues as T' notches as N are formed in the shorter edges of the plate in the manner and for the purpose disclosed in my aforesaid Reissue Patent No. 22,249. It will be understood however that resort might well be had to other arrangements for retaining a plate as P against longitudinal movement on a frame as F, as for example, by resorting to spring tongues such as are disclosed in the patent to Mohler 1,812,294, patented July 7, 1931.

While it is desirable that the free edge of the retaining lip RL neatly fit into a groove as G in a printing plate as P, the usual manufacturing tolerances are permissible, for it is desirable that the free edge of the retaining lip as RL not fit into the groove as G and force the plate as P so tightly against the adjacent face of the frame as F as to impair free sliding movement of the plate as P onto the face of the frame as F with a retaining lip as RL passing into a groove as G. Where resort is had to a retaining lip as RL adapted for cooperation with a groove as G, it is not necessary that the spacing of the free edge of the retaining lip as RL from the inner face of the lower bead as LB be maintained with extreme accuracy, reasonable accuracy being sufficient since the usual manufacturing tolerances, or even more, are permissible in such spacing.

In Fig. 5A the plate P has a groove G on the printing face instead of the rear face and the upturned edge of the lower bead LB is formed to provide a retaining lip RL1, having the same function as the element RL of Fig. 5. By this means, the plate may be retained solely by the lower edge thereof.

The retention of a plate as P on a frame as F by merely engaging one edge thereof in the manner shown, for example in Fig. 4, is advantageous for this eliminates the necessity of spacing retaining devices for opposite edges of a printing plate from each other in such a way as to care for printing plates of varying widths. Thus while all printing plates may be made of uniform width within customary manufacturing tolerances, after embossing they vary somewhat. Such variations are due to differences in the lengths of different names and addresses or other matter to be printed from type characters T embossed on plates as P. Printing plates expand in width to various degrees when they are embossed, depending upon the number of characters, and especially upon the number of rows of characters embossed. Heretofore the spacing between retaining devices for opposite edges of a printing plate on a frame has been balanced, so that those printing plates on which but a small number of type characters were embossed would be properly retained against transverse movement on the face of the frame and at the same time those printing plates on which a large number of type characters T had to be embossed would not bind on such retaining devices.

However, while the novel printing plate of this invention may be retained on a frame as F by merely engaging one of the longer edges thereof with a retaining means therefor, as the retaining lip RL or RL1, a frame or carrier adapted to receive the novel printing plate of the present invention may be equipped with retaining devices adapted for cooperation with opposite of the longer edges of a printing plate as P. Thus the frame F2 shown in Fig. 6 is arranged to retain an index card as C2 on one face thereof and plate retaining devices as RD are provided at spaced intervals on the face of the frame adjacent to the retaining devices RC adapted to retain the lower edge of an index card as C2 mounted on the face of the frame as F2. As best shown in Fig. 7 the frame F2 is provided with a lower bead LB2 that is arranged in the manner conventional in the art, which is to say, this bead is not equipped with a retaining lip as RL. However, in this instance the retaining devices RD are equipped with retaining lips RL2 that are arranged similarly to the retaining lips RL1 and these retaining lips RL2 are adapted to cooperate with the groove as G in a plate as P disposed on the face of the frame F2. In this case the groove G is formed in the relief or printing face of the plate P. As explained hereinabove it is not necessary that the retaining devices RD and the retaining lips RL2 thereon be accurately spaced from the lower bead as LB and advantageously the spacing between such retaining devices and bead may be such as to amply accommodate the maximum of expansion of a plate as might be effected by embossing type characters over substantially the entire surface of a printing plate as P.

When retaining devices as RD are afforded in conjunction with retaining lips as RL2 a plate as P may be effectively retained on the face of the frame as F without resorting to a lower bead as LB1 and a frame F3 equipped in this manner is illustrated in Fig. 8. Thus it will be seen that the novel printing plate of the present invention may be effectively retained on a frame or carrier therefor by providing retaining devices that are adapted to cooperate with a groove as G formed in the plate. Such retaining devices may be arranged to cooperate with either the lower or the upper edge of a plate as P mounted thereon, as shown in Figs. 4 and 8 respectively, and with either the relief or intaglio face, as shown in Figs. 5, 5A, 7 and 9. If desired, retaining means may be provided for cooperation with the edge of the plate opposite the grooved edge. An arrangement of this character is shown in Fig. 6 and could be combined with the retaining means RL3, Fig. 8. In this respect it will be understood that where a frame as F is equipped with a bead as LB and a retaining lip as RL, Figs. 4, 5, and 5A, conventional retaining devices may be provided on the face of the frame for cooperation with the upper edge of the plate and such retaining devices may be arranged in the manner conventional in the art.

When the groove as G is formed in the plate as P on the face of the plate on which the type characters G1 appear in intaglio, the groove engaging means are formed in the body of the carrier or frame F, as in Figs. 5 and 9. Where the groove is in the relief side of the plate, the groove engaging elements as RL1, RL2, Figs. 5A and 7, are preferably formed as part of overhanging bead or other plate retaining elements.

Thus where a novel printing plate of the present invention is to be mounted on a frame or carrier therefor, such frame or carrier will be equipped with retaining means that are adapted to cooperate with a groove as G formed adjacent to one marginal edge of the plate to be mounted on the frame or carrier. Such retaining means will be arranged in the manner described hereinabove with particular reference to the groove engaging element RL, RL1, etc., and in such an instance a plate as P will be effectively retained on the frame or carrier therefor whether or not such frame or carrier is equipped with retaining means adapted for cooperation with the edge of the plate as P opposite the edge along which the groove as G is formed.

While the novel printing plate of the present invention may be mounted on a frame or carrier, as in those instances where it is necessary or advantageous that an index card be associated with the plate, one of the marked advantages of the printing plate of the present invention is that such a flat plate may be automatically fed through embossing, printing and like machines without being mounted on a frame or carrier therefor, something which has not been heretofore possible in flat printing plates that were not equipped with spacing flanges or other reenforcing means. The primary reason that this is possible with the flat plate of the present invention is the provision of the groove as G adjacent to one of the edges of the plate. Such a groove enables the plate to be effectively grasped and held by mechanism by which it may be fed through embossing, printing and like machines.

Where the novel printing plates of the present invention are to be automatically fed through an embossing machine to have type characters T embossed thereon, such embossing machine or apparatus is equipped with means particularly adapted for cooperation with plates including a groove as G. An embossing machine so equipped is illustrated in Figs. 13 to 70, inclusive, of the accompanying drawings, the embossing machine there illustrated being of the same general character as that disclosed in the patent to Duncan No. 1,518,904, patented December 9, 1924. This embossing machine includes a rotating head 100 in which female embossing dies 101 and punches or male dies 102, Fig. 37, are mounted. A keyboard K includes keys which may be operated in the manner in which the keys of a typewriter are operated and depression of one such key is effective to selectively arrest a punch as 102 and a die as 101 in position to emboss a particular numeral or character on a plate as P disposed therebetween.

When such a punch and die have been arrested in embossing position, suitable means actuate the punch and die to emboss a type character T on the portion of a plate P disposed between such punch and die. The manner in which depression of a key, as aforesaid, is effective to bring about such an embossing operation is fully disclosed in said Duncan Patent No. 1,518,904, to which reference may be made for a detailed description of such arrangement and operation. It will be understood, however, that resort may be had to embossing machines other than that disclosed in said Patent No. 1,518,904, such, for example, as those disclosed in Duncan Patents Nos. 750,831, 921,600, 955,116, and others, within the purview of my invention which particularly has to do with means effective to dispose a printing plate as P in position to have type characters T embossed thereon. Such advancing of the plate as P is known as line spacing. The hydraulic means which is provided in the embossing machine, as illustrated for example in Fig. 14, functions to bring about such line spacing of the plate as P. The hydraulic means also is designed to return the plate as P to an initial longitudinal position at which the embossing operation is desirably started irrespective of which line of type characters is being embossed on a plate as P. At the time such movements of the plate as P are effected, the plate will be secured in a retaining jaw therefor provided on a cross slide of the main carriage of the mechanism which effects movement of the plate in the embossing machine and the aforesaid movements of the plate as P will be referred to respectively, hereinafter, as the line spacing and carriage return movements.

In order that such line spacing and carriage return movements of a plate P may be effected at the proper time in the course of the embossing of type characters as T thereon, a key 103 is provided which is mounted on a key lever 104, Figs. 68 and 70, the key lever 104 being pivotally mounted on a shaft 105, Fig. 70. The shaft 105 is mounted in a bore 106 provided in a block 107 that is secured to and mounted beneath the bed plate 114 of the embossing machine. The end of the key lever 104 opposite that whereat the key 103 is secured extends through a slot 107A in the block 107 to thereby be held against transverse movement relative to the shaft 105 but at the same time this arrangement enables free pivoting movement of the key lever about the shaft 105. The lever 104 and the key 103 are maintained in the normal inoperative position thereof shown in Fig. 68 through yieldable means effective on parts operated by the key lever as will be described more fully hereinafter.

The arrangement associated with the embossing machine, shown for example in Figs. 13 and 14, for handling the plates as P in the embossing machine includes a magazine ME into which the plates as P are loaded when these are to pass through the embossing machine to have type characters T embossed thereon. When the desired number of type characters have been embossed on a plate as P, and the embossing operation is complete, the mechanism functions to eject the completely embossed plate from the jaw in which it is held during the embossing operation and to insert another plate into such jaw. Such movements of the plate are effected under control of a key 108 mounted on a key lever 109, Fig. 70, which is mounted on the shaft 105 in a manner similar to that in which the key lever 104 is mounted. The key 108 is positioned on the embossing machine adjacent to the key 103 in the location shown, for example, in Fig. 14. When the key 108 is depressed, the main carriage in which the plate is retained during the embossing operation moves in a manner similar to the carriage return and line spacing movements but additionally the carriage moves into a position in which plate ejection and plate loading operations may be effected.

The aforesaid carriage return and line spacing movements and the movements of the carriage into position to have plate ejecting and loading operations effected are, in the illustrated form of my invention, brought about by hydraulic means. Such means include a hydraulic pump, generally indicated at 110, Figs. 14 to 21, inclusive, which comprises a cylindrical housing 111, Fig. 15, to which a bracket 112 is welded or otherwise suitably secured. The bracket 112 is secured to the frame 113 of the embossing machine above the bed plate 114 thereof rearwardly and to one side of the die head 100 in the position shown, for example, in Fig. 14.

The cylindrical housing 111 of the pump 110 constitutes a reservoir in which oil or similar hydraulic fluid may be stored and in the present instance the lower end of the cylindrical housing 111 is screw threaded onto a block 115 which constitutes the lower end of the reservoir afforded by the cylindrical housing 111. The upper end of the cylindrical housing 111 is closed by a cap 116 which is arranged to be removable so that the supply of hydraulic fluid stored in the housing 111 may be replaced from time to time as this may be required.

As best shown in Figs. 15 and 17 the block 115 includes a medially located and upwardly projecting cylinder 118 that is disposed interiorly of the housing 111 so as to be surrounded by the hydraulic fluid stored in said housing. Ports 119 are provided at the lower end of the cylinder 118 so that when the piston 120 mounted for reciprocation in the cylinder 118 is moved upwardly, the ports 119 are opened whereupon hydraulic fluid flows into the cylinder 118 to be forced therefrom upon downward movement of the piston 120.

Reciprocation of the piston 120 in the cylinder 118 is effected through a connecting rod 121, the lower end of which is pivotally mounted on a wrist pin 122 mounted in a block 123 secured in a recess 124 provided in the upper end of the piston 120. The upper end of the connecting rod 121 is pivotally mounted on a crank pin 125 that is eccentrically mounted on a crank disc 126 fast to a shaft 127 journaled in a bearing 128 provided in the housing 111 and in an outboard bearing arrangement 129.

Rotative movement is imparted to the shaft 127 from a gear 131 that is rotatably mounted on the shaft and which includes a hub 132 which has clutch teeth 133 provided at the free end thereof. The hub 132 and the clutch teeth 133 are part of a one revolution clutch of the character disclosed in my Patent No. 2,265,134, patented December 9, 1941, and this clutch also includes a collar 134 slidably but non-rotatably mounted on the shaft 127. The hub 134 has a pin 135, Fig. 20, projected therefrom which normally engages a cam face 136 on a lever in the form of a plate member 137 that is pivotally mounted as at 138 on a bracket 139 carried by the pump housing 111. Springs as 140, Fig. 15, are normally effective on the hub 134 to urge the clutch teeth 141 on the hub into engagement with the clutch teeth 133 on the hub 132. These springs are also effective to normally urge the pin 135 into engagement with the cam face 136. In my aforesaid Patent No. 2,265,134, I have described the cam face 136 as being retracted from engagement with the pin 135 upon the operation of a solenoid including means effective on a plate lever as 137 to thereby withdraw the cam face as 136 from engagement with the pin as 135. In the present instance, however, such movement of the plate 137 is effected through the intermediary of a rod 145, which rod is operated in a manner that will be described hereinafter.

When the cam face 136 is withdrawn from engagement with the pin 135, the springs as 140 engage the clutch teeth 141 with the clutch teeth 133 and thereupon the hub 134 is set in rotation with the hub 132 and the gear 131. In the course of such rotation of the hub 134 the pin 135 advances away from the cam surface 136 and after this has been effected the plate 137 is restored to normal position so that near the end of a complete revolution of the hub 134 the pin 135 thereon will ride onto the cam face 136 to thereby retract the clutch teeth 141 from engagement with the clutch teeth 133, this being effected at the end of a complete revolution of the hub 134 and shaft 127. A roller 145A, Figs. 20 and 21, is carried by the upper end of the plate 137 and is adapted to roll in contact with the plane face of gear 131 to resist the thrust between pin 135 and cam 136 on plate 137 when the clutch elements are forced apart at the end of a cycle. Hence when the rod 145 is operated the shaft 127 is caused to make a complete revolution and in the course of such a complete revolution of the shaft 127, the piston 120 is moved from a normal at rest position thereof at the bottom of the cylinder 118 into a position to open the ports 119, and also in the course of such a revolution of the shaft 127 the piston 120 returns to the normal at rest position thereof to close the ports 119 and in the course of such movement hydraulic fluid is forced from the cylinder 118 through an outlet passage 146, Figs. 15 and 17, to thereafter be directed to operative parts of the plate movement controlling means as will be explained more fully hereinafter.

The gear 131 is rotated constantly during operation of the embossing machine and to this end a pinion 147, Figs. 15, 20 and 21, fast to a shaft 148 journaled in the bracket 139 is meshed with the gear 131. Another pinion 149 on the shaft 148 meshes with an idler pinion 150 mounted on a stud shaft 151, Fig. 16, carried by the bracket 139 and this pinion in turn meshes with a gear 152 that is rotatable on a stud shaft 153 extended from the bracket 139. A pulley 154 is also fast to the gear 152 so as to rotate with and serves as a driving means for the gear 152, and an endless belt 155 is passed about this pulley and another pulley 156 fast to the main drive shaft 157 of the embossing machine. Another pulley 158 is also fast on the main drive shaft 157 and an endless belt 159 is passed about this pulley and about another pulley (not shown) associated with a source of power such as an electric motor (not shown).

As best shown in Figs. 13 and 14 the magazine ME into which plates as P are introduced when these are to be embossed in an embossing machine such as that shown on the accompanying drawings, is located at the left-hand side of the machine as this is viewed in Fig. 13. As will be described hereinafter, the plates as P are automatically ejected from the machine at the right-hand side thereof as it is viewed in Fig. 13, when embossing and other operations are completed thereon in the embossing machine. Hence, the plates as P move transversely across the embossing machine from left to right as the machine is viewed in Fig. 13 and such movements of the plates are effected along a path located above and parallel to what will be referred to hereinafter as a carriage rail 160, Figs. 13, 14, 29, 31, 35, 36, 37, 40, 52 to 54, inclusive, 60, 61, 62 and 63. The carriage rail 160 is bolted or otherwise suitably secured to the front face of the main frame 113 of the embossing machine.

The magazine ME to which reference has been made hereinabove is mounted on the carriage rail 160 adjacent the left hand end thereof, Fig. 13. To this end a casting 161, Figs. 13, 29, and 31, is secured to the carriage rail 160 as by having a groove 162 formed in a vertical wall thereof and having a bolt or stud 163 passed through this groove and through an opening in the carriage rail 160 to be threaded into the frame 113, as shown in Fig. 31. Also as best shown in Fig. 31 shoulders 164 and 165 are formed on the casting 161 to respectively embrace the lower and upper edges of the carriage rail 160 to thereby prevent relative movement between this casting and the carriage rail. The groove 162 is provided in the vertical wall of the casting 161 to enable the position of this casting to be adjusted along the rail 160 for a purpose which will be described hereinafter.

As best shown in Fig. 29, a rib 166 is provided on the upper horizontal wall of the casting 161 and this rib neatly fits into a rabbetted groove 167 formed in the lower wall 168 of a casting generally indicated by 169 on which the magazine ME is mounted, as will be explained presently. The casting 169 is adjustable along the rib 167 on the casting 161 to enable accurate positioning of certain portions of the magazine ME for a purpose that will also be explained presently. To this end a slot 170, Fig. 28, is provided in the rib 166. A bolt 171 is passed through the slot 170 and is threaded into a tapped opening provided in the casting 169, as best shown in Fig. 31. When the casting 169 has been disposed in the proper adjusted position on the casting the bolt 171 is tightened to thereby clamp the casting 169 in such position.

As best shown in Figs. 14, 28 and 33, front and rear plates 172 and 173 are fastened to the upper side of the casting 169 by screws as 174, Fig. 14, and the frame members 175 and 176 of the magazine ME are fastened to the front plate 172 by screws 177, Figs. 13 and 14. As best shown in Fig. 14, the frame members 175 and 176 of the magazine ME are substantially L-shaped in cross section and these L-shaped cross members are oppositely fastened and the corner portions thereof are spaced one from the other in an amount corresponding to the length of the plates as P so that when a stack of plates as P is disposed between the frame members, opposite corners of the plates will be respectively embraced by the frame members 175 and 176. These frame members may be mounted in a relatively fixed position with respect to one another since the length of plates P customarily remains uniform, even though such plates may vary in width.

Since the width of plates P is ofttimes varied so that a different number of lines of type characters may be accommodated thereon, adjustable means are provided to enable plates of varied widths to be retained in the magazine ME. To this end a vertical backing plate 178, Figs. 13, 14, 28 and 21, is provided which includes a horizontal base portion 179 that rests on the back plate 173. In order that the vertical portion of the backing plate 178 may be retained in adjusted positions with respect to the frame members 175 and 176, a slot 180, Fig. 28, is formed in the base portion 179 thereof through which a bolt 181 is passed. This bolt is threaded into a tapped opening in the plate 173 and when tightened is effective to secure the base portion 179 in a fixed position on the plate 173. Desirably, to prevent canting of the vertical portion of the backing plate 178 and to insure that this plate will remain in a fixed position, dowel pins as 182, Fig. 28, are passed through the base portion 179 and into the plate 173. Hence, once the plate 178 has been adjusted relative to the frame members 175 and 176 to accommodate plates P of a predetermined width, this plate is retained in a fixed position.

When a stack of plates P has been introduced into the magazine ME a weight W is desirably disposed on the top of such a stack of plates to insure that the lowermost plate in such a stack will be pressed down into position to insure withdrawal thereof from the magazine ME by means provided for this purpose.

The means which are effective to withdraw the lowermost plate P from a stack include a spring plate 184, Figs. 13, 14, 28, 29, and 33. This plate is fastened to the upper face of a slide 185 which, as best shown in Fig. 33, is substantially the shape of an inverted T in cross section, the spring plate 184 being secured to the upwardly disposed free end of the stem of such T-shaped formation. The plates 172 and 173 are secured to the upper face of the casting 169 in such a relation that the adjacent edges thereof are spaced one from the other to neatly accommodate the stem of the slide 185 therebetween, the branches of the T-shaped slide 185 lying respectively beneath the adjacent marginal edges of the plates 172 and 173. Also as best shown in Fig. 33, the spring plate 184 is of sufficient width to overlie the adjacent marginal edges of the plates 172 and 173 and therefore when the plate 184 is secured to the slide 185, this slide is supported for sliding movement between the plates 172 and 173.

Normally, the slide 185 is disposed in the at rest position thereof shown in Fig. 29 so that the leading free edge of the spring plate 184 lies beyond the adjacent free edge of the lowermost plate P in a stack thereof disposed in the magazine ME. In a manner to be described presently, the slide 185 is advanced from the position in which this slide is shown in Fig. 29 toward the right as viewed in the same figure. In the course of such movement the leading edge of the spring plate 184 engages the lowermost plate P in the stack thereof in the magazine ME and thereafter this lowermost plate is passed out through the discharge opening 186, Fig. 14B, afforded by cutting away a portion of the lower end of the frame member 176.

When a stack of plates P is introduced into the magazine ME and these plates embody serpentine edges such as those provided on the plate P as shown in Fig. 1, separation of the lowermost plate in the stack from those disposed thereabove is insured by providing a post 187, Figs. 22 and 33. A screw 188 is passed through the post 187 and threaded into a tapped opening in the front plate 172 to secure this post in position to engage in one of the serpentine recesses in each of the plates 183 adjacent to the frame member 175 as shown in Fig. 22. Moreover, as best shown in Fig. 33, the post 187 is of reduced diameter for a thickness equal to the thickness of a plate as P. Likewise, as shown in Fig. 33, the post 187 is tapered so that as the plates pass downwardly thereover, alignment of the face of the aforesaid serpentine recesses with the reduced portion 189 of the post 187 will be assured. Inasmuch as the reduced portion 189 is of a height but very little more than the thickness of a plate as P when the lowermost plate in a stack thereof in magazine ME clears the larger diameter of the post 187, the aforesaid serpentine recess therein will be in position opposite the reduced portion 189. The reduction in diameter of the post allows the lowermost plate to be slid past. Inasmuch as the larger diameter of the post 187 will at this time be engaged in the aforesaid recess of the next uppermost plate P, this next uppermost plate is retained in the magazine ME when the lowermost plate is fed therefrom by advancing of the slide 185 and the plate 184. The post 187 may be used with any of the plates shown in Figs. 1 to 12, with minor and obvious modifications in shape of the post.

As best shown in Figs. 28 and 29, the upper surfaces of the marginal portions of the plates 172 and 173 adjacent the slide 185 have inclined recesses 190 and 191 respectively formed therein. The uppermost ends of these tapered recesses are disposed to lie beneath marginal portions of plates P disposed adjacent to the frame member 175 and the deepest portions of these recesses lie rearwardly thereof or to the left as seen in Fig. 29. The spring plate 184 is biased to press against the bottom of the recesses 190 and 191 and when the slide 185 is disposed in the at rest position thereof shown in Fig. 29, the leading edge of the spring plate 184 is disposed to engage less than the entire thickness of the lowermost plate P in the stack. However, as the slide 185 advances toward the right as viewed in Fig. 29 the free end of the spring plate 184 is carried upwardly as it travels along the recesses 190 and 191 so that by the time the free end of the spring plate 184 has advanced beyond the adjacent free edges of the plates P in the magazine the leading free edge of the spring plate 184 will be disposed to engage substantially the entire thickness of the lowermost plate. This insures that the plate to be fed will be effectively engaged by the spring plate 184.

The slide 185 is normally urged to its retracted or left-hand position by spring 185A, Fig. 30. When the slide reaches this position, it is locked against movement by the action of a shiftable locking pawl 192, Fig. 28, that enters a complemental notch 192A formed in the slide 185. The locking pawl 192 is urged to its effective position by a control bar 193 that is slidably mounted on the casting 169 for movement parallel to the rail 160. The control bar 192 has a spring 193A connected thereto, Figs. 28 and 34, so as to urge the bar to the right, as seen in these figures, and a cam surface 194 on the bar 193 is arranged in the course of such right hand movement to cam the locking pawl 192 to its effective or locking position. When an operative plate feeding stroke of the slide 185 is to be effected, advancing movement is imparted to the slide 185 by effecting operation of the hydraulic pump 110. Hydraulic fluid under pressure acts upon a piston so as to tend to bring about such advancing movement. Upon release of the locking pawl 192, in the manner that will be described presently, such advancing movement will be effected against the influence of the springs 185A. At the end of an advancing stroke of the slide 185 and upon release of the hydraulic pressure, the springs 185A will be effective to return the slide 185 to the normal at rest position thereof shown in Fig. 29.

A lug 195, Fig. 29, is welded or otherwise suitably secured to the underside of the slide 185 near the leading or right-hand end thereof and the leading end of a cylinder 196 is abutted thereagainst. The rear end of the cylinder 196 is screw threaded into a tapped opening at one end of a pocket 196A afforded at the rear end of the casting 169, the opposite end of this pocket being closed by a screw threaded plug 196B. A piston 197 in the form of an elongated cylindrical rod or pin is disposed in the cylinder 196 and normally has the rear end thereof disposed in the pocket 196A as shown in Fig. 29. A fluid inlet 197A leads into the pocket 196A and one end of a fluid conduit 198 leads to the inlet 197A. The opposite end of the conduit 198 leads to a discharge passage 199, Fig. 18, provided in the block 200 that is secured to the lower end of the block 115 at the lower end of the housing 111. The discharge passage 199 leads from the accumulating chamber 201 provided in the block 200 and into which the outlet passage 146 from the pump cylinder 118 discharges. Therefore, when the piston 120 of the pump is forced downwardly from the normal at rest position shown in Fig. 17, hydraulic fluid under pressure is forced through the passage 146 into the accumulator chamber 201 and thence through the outlet passage 199, through conduit 198, and into the passage 197A and pocket 194. Such fluid is effective on the rear end of the piston 197 to force the same forwardly or to the right, Fig. 29, through the cylinder 196. The forward end of the piston 196 bears against the lug 195 and therefore when the piston 196 is forced through the cylinder 196 the slide 185 is moved to the right to advance the lowermost plate P in the magazine ME through the opening 186, Fig. 14B. This means is effective to load such plate into the jaw in which the plate is to be retained when type characters as T are embossed thereon, the loading operation being described in further detail hereinafter. Springs 185A extend between the lug 195 and spring anchors 204 and 205, Fig. 30, mounted in the casting 169. When the piston 120 attains the lowermost position thereof in the cylinder 118 and thereafter ascends, the pressure on the hydraulic fluid is relieved and thereupon the springs 185A are effective to return the slide 185 from the advance position thereof to the normal at rest position of this slide shown in Fig. 29. In the course of such return movement of the slide 185, hydraulic fluid is forced back into the accumulator chamber 201 and thence through the passage 146 into the cylinder 118.

In Figs. 22 and 23 I have indicated the lowermost plate in the magazine ME as Pa, and when such a plate is advanced from the magazine ME it is disposed in a position designated Pb. Thus when a plate P is advanced from the magazine as ME upon movement of the slide 185 toward the right it moves to an idle position between the magazine ME and the position occupied when it has been initially loaded into the main carriage where the plate is retained during the embossing operation. This carriage will be described presently.

When a plate is advanced into the position occupied by the plate Pb, Figs. 22 and 23, its front edge is retained beneath a retaining plate 206, Figs. 22, 23, 28, and 31. As best shown in Fig. 31, the plate 206 is mounted above a plate 207 which is secured to the upper face of the plate 172, the plates 206 and 207 being secured to the plate 172 by screws as 208. Also, as best shown in Fig. 31, the inwardly disposed marginal edge of the plate 206 is disposed to extend beyond the adjacent edge of the plate 207. This edge of the plate 207 is accurately located relative to the forward edge of the magazine ME as afforded by the frame members 175 and 176 so that when the lowermost plate in the magazine ME is advanced therefrom in the manner described hereinabove, the forwardly disposed edge of this plate will pass along the inwardly or rearwardly disposed edge of the plate 207 to thereby be disposed beneath the marginal portion of the plate 206 which projects beyond the edge of the plate 207. Inasmuch as it is necessary that a printing plate P be accurately located, since such a plate is fed from this position into the jaw of the main carriage for embossing, means are provided which are effective to insure that the printing plate as P will be forced into engagement with the inwardly disposed edge of the plate 207. To this end a pawl 209 is provided, Figs. 22, 23, 28 and 31. This pawl is mounted for pivotal movement on a pin 210 mounted in the horizontally disposed portion 179 of the back-up plate 178 as best shown in Figs. 28 and 31. The pawl 209 has an opening 211 therein through which a pin 212 mounted in the portion 179 is extended. Engagement of the pin 212 with edges of the opening 211 limits pivotal movement of the pawl 209 about the pin 210. The free end of the pawl 209 is biased toward the plates 206 and 207 by a spring 213 which has opposite ends thereof connected to the pins 210 and 212, the medial portion of the spring 213 being effective on a pin 214 mounted in the pawl 209. A roller 215 is mounted on the underside of the pawl 209, this roller being carried by a pin 216 carried by the pawl 209. When serpentine plates are used, this roller is disposed in position to engage one of the serpentine depressions in the edge of a plate as P opposite that engaged with the inwardly disposed edge of the plate 207. On other plates, the roller preferably engages a depression or notch if the plate has one. The engagement of the pin 212 with an edge of the opening 211 disposes the roller 215 in position to insure that as a printing plate as P is advanced from the magazine ME into the position of the plate Pb, Figs. 22 and 23, the roller 215 will be in position to ride along the serpentine edge opposite the edge engaging the inwardly disposed plate 207. Therefore by reason of the influence of the spring 213, the roller 215 is effective to keep the printing plate pressed against the inwardly disposed edge of the plate 207. Furthermore, since roller 215 is disposed in such position as to insure seating thereof in one of the serpentine depressions along the inner or rear edge of the printing plate P when the plate reaches position Pb, such seating of the roller 215 is effective to retain the printing plate as P against longitudinal displacement from its position beneath the overhanging portion of the plate 206.

By referring to Figs. 22 and 23 it will be seen that the trailing edge of the plate in the position Pb is spaced from the leading edge of the plate at Pa, the reciprocatory movement imparted to the slide as 185 being greater than the length of a plate. By this arrangement, when a succeeding plate is advanced from the magazine ME into the position of the plate Pb, the plate formerly in position Pb will be advanced into the jaw of the main carriage where it is retained during the embossing of type characters thereon.

The main carriage generally indicated at 250, to which a plate is passed to have type characters T embossed thereon, travels along the rail 160. The manner in which this carriage is mounted for movement along such rail and the particular construction of the carriage will be described hereinafter. Among the elements of the main carriage 250 is the line spacing frame 251 on which brackets 252 and 253 are provided near the inner edge of the frame. The brackets 252 and 253 afford pivotal supports for a jaw, generally indicated at 255, into which a plate is inserted upon movement of a plate from the position Pb in Figs. 22 and 23. This jaw 255 is best shown in Figs. 43 to 51, inclusive.

The jaw 255 includes a plate 256 which has a corner lug 257 on one edge thereof to which a pintle 258 is secured. See Fig. 49. Another lug 259 projects from the same edge of the plate 256 as that from which the lug 257 extends, the lugs 257 and 259 being arranged at opposite ends of the plate 256. The lug 259 has a pintle 260 secured thereto. As shown in Figs. 22 and 49 the pintle 258 includes a reduced portion 261 that is rotatably mounted in an opening in an upstanding portion of the bracket 252 and the pintle 260 includes a reduced portion 262 that is mounted in an opening provided in an upstanding portion of the bracket 253 whereby the plate 256 of the jaw 255 is supported for pivotal movement between the positions respectively shown in Figs. 46 and 47.

When a plate is to be initially inserted into the jaw 255, and during the time type characters T are to be embossed, the jaw 255 is disposed in the position shown in Fig. 46. To this end the lower plate 263 of the jaw 255, described more fully presently, rests on the stop 264, Figs. 46 and 47, that is suitably secured to the frame 251 in position to accurately locate the jaw 255 in horizontal position. As shown in Fig. 46 the jaw is disposed to have a plate as P inserted thereinto and also to support the plate in properly aligned position to have type characters T embossed thereon.

As best shown in Fig. 46 the upper surface of the plate 263 includes a substantially medially located recess 265 and the plates 256 and 263 are secured together by screws as 266.

As best shown in Fig. 48, the upper surface of the plate 263 is recessed as indicated at 267 and an upstanding substantially V-shaped rib 268 projects upwardly from the lower surface of the recess 267. The rib 268 is formed to be complementary to the groove G formed in the plate P and when a plate is to be inserted by sliding it longitudinally into the jaw 255, the rib 268 is aligned with the groove G in a plate disposed at Pb, Figs. 22 and 23. As the plate advances from the position Pb the groove G thereon passes along the rib 268 at which time the upwardly disposed face of the plate P engages the lower face of the plate member 256 holding the plate P against transverse displacement from the jaw 255.

While the engagement of the rib 268 in a groove as G in a plate P is effective to prevent lateral displacement of the plate as P from the jaw 255, it is necessary to accurately position the plate as P longitudinally in the jaws 255. It is advantageous, also, to tightly clamp the plate P when the same is disposed in the jaw 255, particularly during the embossing of type characters T. When the plate includes a serpentine configuration along the edges thereof of the nature disclosed in my aforesaid Patent No. 1,995,803, suitable locking pawls may be provided for cooperation with one or more selected serpentine recesses along the edge where the groove G is formed. To this end pawls 269 and 270, Figs. 50 and 51, are mounted in the recess 265, such pawls being supported for pivotal movement about pins as 271 and 272 fastened to the plate 263. The pawls 269 and 270 respectively include rounded nose portions 273 and 274, these nose portions being complementary to the configuration of the serpentine recesses afforded along the edge of plate P. If plates of other configuration are used, the pawl noses are modified. The pawls 269 and 270 rest on the lower wall of the recess 265 for movement thereover, and in order to move them into position to seat the nose portions 273 and 274 in recesses along the serpentine edge of the plate P, cam surfaces 275 and 276 are respectively formed on the pawls 269 and 270 opposite the nose portions 273 and 274. These cam surfaces cooperate with cam surfaces afforded respectively on lugs 277 and 278 on a slide bar 279 mounted for sliding movement in the recesses 265, in the manner best shown in Figs. 46, 50 and 51.

As shown in Figs. 50 and 51, the slide 279 is slightly longer than the plate 263 so that an end portion of the slide 279 may be projected beyond the adjacent end of the plate 263. The end portions 280 and 281 of the plate 263 at opposite ends of the recess 265 are formed to afford slots 282 and 283 through which opposite ends of the slide 279 may be passed to extend beyond the adjacent edge of the plate 263. A spring anchor 284 is provided in the recess 265 and a spring 285 extends between this spring anchor and the lug 278 and is normally effective to urge the slide 279 to the position thereof shown in Fig. 50. This normally disposes the slide 279 in position to engage the cam surfaces on the lugs 277 and 278 respectively with the cam surfaces 275 and 276 to thereby urge the noses 273 and 274 into position to seat in recesses along the serpentine edge of a plate P. When, however, a plate as P is to be removed from the jaw 255 the slide 279 is forced from the position thereof shown in Fig. 50 into the position shown in Fig. 51 against the effect of the spring 285, whereupon the pawls 269 and 270 may move into the position shown in Fig. 51 with the noses 273 and 276 retracted from cooperation with recesses along the edge of plate P.

Movement of the slide 279 from the position shown in Fig. 50 into the position shown in Fig. 51 is effected as an incident to movement of the carriage 250 into position to have a plate advanced thereinto from the intermediate position of the plate Pb, where the carriage 250 is shown in Fig. 22.

The carriage 250 moves into the position shown in Fig. 23 in the course of travel thereof along the rail 160. By referring to Figs. 37 and 38 it will be seen that lugs 286 and 287 project from the sides of the main frame 288 of the carriage 250. Studs as 289 and 290 respectively project from the lugs 286 and 287 and rollers as 291 and 292 are mounted on these studs. As shown best in Fig. 37, the rollers as 291 and 292 are disposed to travel in a rabbetted groove 293 formed in the upper edge of the rail 160. Inasmuch as the rollers 292 and 293 are provided at opposite sides of the carriage 250 the carriage is firmly supported for travel along the rail 160. However, in order to insure against canting of the carriage 250, a bracket 294, Figs. 37 and 38, is provided on the main frame 288 of the carriage 250 and this bracket includes a depending lug 295 in which a stud 296 is mounted. A flanged roller 297 is rotatably mounted on the stud 296 to have the periphery thereof engaged with the lower edge of the rail 160, the flange of the roller 297 riding on one face of the rail 160. In order to maintain this flange in engagement with this face of the rail, a stud 298 is mounted on the bracket 294 and carries a roller 299 that rides along the opposite face of the rail 160. To further insure that the carriage 250 will smoothly travel along the rail 160, rollers 301 and 302, Fig. 38, are rotatably mounted in the main frame 288 of the carriage 250 adjacent to the brackets 286 and 287 and in position to travel along the inner or rear face of the upstanding ledge 303 at one side of the groove 293. Still another roller 304 is rotatably mounted on the main frame 288 of the main carriage 250 substantially midway between the rollers 301 and 302 and in position to travel along the front or outer face of the ledge 303.

Normally the carriage 250 is biased to the right as viewed in Fig. 13 and to this end a spring barrel 305, Figs. 13, 24, 25, 60 and 62, is fast to the rail 160 near the right-hand end thereof, this barrel housing a coil spring (not shown) to which one end of a band 306 is secured so that the tension of the spring is effective on the band to urge the same toward the right as viewed in Fig. 13. As best shown in Fig. 35, a pin 307 depends from the main frame 288 of the carriage 250 and the free end of the band 306 is connected to this pin so that the spring tension on the band 306 is effective to urge the carriage 250 to the right as viewed in Figs. 13 and 35.

Movement of the carriage to the left, as viewed in Fig. 13, against the effect of the spring tension on the band 306 is effected by hydraulic means operated from the pump 110. A cylinder 308, Figs. 60 and 61, is secured to the rail 160 near its right end as viewed in Fig. 13. A port 309, Fig. 60, leads from the cylinder 308 to an inlet passage 310 to which one end a conduit 311 is connected, the opposite end of this conduit leading to an outlet passage 312, Fig. 18, from the accumulator chamber 201 of pump 110. Therefore, when the pump 110 is set in operation fluid is forced from the accumulator chamber 201 through the outlet passage 312, conduit 311, passage 310 and port 309 into the cylinder 308. Such fluid under pressure is effective on a piston 313 that is mounted in the cylinder 308 to thereby force the piston toward the left, Fig. 60.

As best shown in Fig. 60, a block 314 is fast to the free end of the piston 313 and the block 314 has a plate 315 secured to the upper surface thereof. The block 314 is normally biased to the right as viewed in Fig. 60 under the influence of a coil spring housed in the spring barrel 316, one end of a band 317 being connected to this spring enclosed in the barrel 316 and the other end of this band being connected to a pin 318, Fig. 60, secured to the plate 315. The spring enclosed in the spring barrel 316 urges the plate 315 toward the right into the position in which it is shown in Figs. 13, 60 and 61.

However, when fluid under pressure is admitted to the cylinder 308 to advance the piston 313 toward the left as viewed in Fig. 60, the block 314 and therefore the plate 315 are also moved to the left from the normal at rest position thereof shown in Figs. 13 and 25 into one of the advanced positions of the plate 315 shown in Fig. 22. When the plate 315 is in the advanced position shown in Fig. 22, it is effective to dispose the main carriage 250 in the position shown in Fig. 22 which is the position occupied by the carriage 250 when a plate is to be advanced from position Pb into the jaw 255. Normally, however, when fluid under pressure is admitted into the cylinder 303 to advance the piston 313 toward the left as viewed in Fig. 60, the plate 315 is advanced only sufficiently to dispose the carriage 250 in an initial embossing position in which it is shown in Fig. 23 which is the position into which the carriage is normally returned for a line spacing operation. Such line spacing of course advances the plate P relative to the type and punches 101 and 102 in the die head 100 of the embossing machine so that the type characters next to be embossed on the plate P will be embossed on a new line spaced from the line of printing characters previously embossed thereon. An adjustable stop 314A on carriage 250 engages block 314 at certain times as indicated in Fig. 35.

It will be understood that the main carriage 250 is moved to the position shown in Fig. 22 only when it is desired to feed a new plate into the jaw member 255. When this is done, the lock pawl 192 must be released so that the plate feeding slide 185 and associated parts may be advanced. As long as the lock pawl 192 remains engaged, the feed mechanism remains in its inoperative position at the extreme left, as seen in Figs. 28 and 29. Even though hydraulic pressure may have been applied to the piston 197, Figs. 29 and 30, the piston cannot move, a pressure relief means being provided at the pump, Fig. 17, as more fully explained hereinafter.

It is necessary, also, that the pawls 273 and 274, Figs. 50 and 51, for locking plates in the carriage jaw 255 be released. When the carriage 250 moves to its extreme left position, where it is shown in Fig. 22, a surface of the carriage end frame pushes bar 193 to the left, against the force of its spring 193A, Fig. 28. At the same time the bar 279 which locks the plate holding pawls is moved from its normal position shown in Fig. 50 to the release position of Fig. 51. The plate advancing slide is now free to move to the right, under the force of its hydraulic piston 197, and the plate P already in the carriage jaw is free to be pushed out to the right, Fig. 51, as a new plate is fed in.

As shown in Figs. 37 and 38 a rock shaft 319 is mounted in the carriage frame 288 and is normally biased clockwise as seen in Figs. 37 and 40 by a spring 320 attached to a long curved arm secured to shaft 319. A roller 321 is mounted on a stud 322 carried by the downturned free end of the long lever. This lever is shown at 323. The roller 321 cooperates with a release mechanism to be described hereinafter.

In order to stop the carriage 250 in its normal initial position in which it is shown in Fig. 23, a block 451, Fig. 23, is provided which is mounted on the rock shaft 319 on which the line spacing pawl releasing lever 323 is mounted. This block is adapted to be moved into a carriage stopping position except when a new plate is to be fed to the carriage. When the carriage 250 is moved to the position shown in Fig. 22, a spring bumper, Fig. 32, is provided as a stop to prevent shock or injury to the machine. This bumper comprises a hollow block 441 secured by a screw 442 to the end of carriage rail 160. A spring 443 allows limited yielding of bumper 441. Normally the spring 320 is effective to rotate shaft 319 and dispose block 451 thereon into the carriage stopping position in which it is shown in Fig. 23, as distinguished from the inoperative position of this block shown in Fig. 22. When the block 451 is disposed in the position shown in Fig. 23, and when the piston 313 is urged to the left as viewed in Fig. 60, the block 451 engages an adjustably mounted stop lug or stud 452 that is carried by the casting 161.

Moreover, when the piston 313 moves to the left as viewed in Fig. 60, the block 314 carried by the piston 313 picks up and moves along the rail 160, an arrangement which will be referred to hereinafter as the auxiliary carriage 400, Figs. 13, 14, 22, 24 and 25. As best shown in Fig. 62 a pawl 453 is pivotally mounted as indicated at 454 on the main frame 401 of the auxiliary carriage 400, a spring 455 normally being effective on the pawl 453 to urge the leading left end thereof downwardly as viewed in Figs. 62 and 63. The auxiliary carriage 400 is mounted to the right of the main carriage 250 as these devices are viewed in Fig. 13 and therefore when the piston 313 moves the auxiliary carriage 400 toward the left as viewed in Fig. 13, the pawl 453 is arranged to extend beyond what is then the leading end of the carriage 400.

Normally, the carriage 400 is disposed in the right hand or home position thereof shown in Figs. 13, 14, 60 and 62 in which position this carriage engages the stop block 455A secured to the rail 160. This carriage is held in this position under the influence of the spring enclosed in the spring barrel 316. When, however, the auxiliary carriage is to be moved to the left in an operation in which a plate is to be advanced from the position Pb, Figs. 22 and 23, into the jaw 255, the key 108, Figs. 14 and 68, is depressed. By referring to Fig. 69 it will be seen that a push pin 460 is disposed beneath a lug 461 mounted on the key lever 109. The push pin 460 extends into a sleeve 465, Fig. 69, carried by a block 466 mounted beneath and carried by the bed plate 114 of the embossing machine. A Bowden cable 462 is connected to the push pin 460. The sheath 463 for the Bowden cable 462 is anchored in the sleeve 465 into which the push pin 460 is extended. The sheath 463 and the Bowden cable 462 are extended to the block 464, Figs. 15, 20 and 21, carried by the bracket 139. As best shown in Fig. 21, the sheath 463 is secured by means such as a set screw 464A in an opening 475 provided in the block 464 into which the lower end of the push rod 145 is extended. The lower end of the push rod 145 is desirably loosely mounted in the opening 475. The push rod 145 is discontinuous and the sections thereof are interconnected by adjustable fastening means including a sleeve 476 to enable the length of the push rod 145 to be adjusted. The upper end of the push rod 145 is connected to the arm 477 of a bell crank 478 that is pivotally mounted on a stud 479 carried by the bracket 139. The other arm 480 of the bell crank 478 is pivotally connected as indicated at 481 to a plate 482 that rides on the collars 134 and 132 and which has a tongue 483 formed thereon that normally lies in position to engage the free end of the clutch operating cam plate 137. A spring 483, Fig. 21, extends between a spring anchor on the plate 137 and a spring anchor on the plate 482 and is effective to urge these plates toward the peripheries of the collars 134 and 132. When however the push rod 145 is moved upwardly in the manner described above, the bell crank 478 is pivoted clockwise as viewed in Fig. 21 and thereupon plate 482 is moved to the right as viewed in Fig. 21 to thereby disengage the cam surface 136 from the pin 135 to permit interengagement of the clutch teeth 141 and 133 to thereby set the shaft 127 in rotation in a counter-clockwise direction as viewed in Fig. 21.

A lug 484 is provided on a collar 485 that is fast on the shaft 127 and which acts as a reactant for the springs 140 that are effective on the collar 134 as described above. In the course of rotation of the collar 484 with the shaft 127 the lug 484 engages the lip 486A, Fig. 21, formed in a plate 486 pivotally mounted as indicated at 487 on the frame 139 and this cams this plate downwardly, rotation of shaft 127 being counterclockwise as seen in Fig. 21. The free end of the plate 486 bears on an arm 490 fast on the bell crank 478 and when the plate 486 is forced downwardly under the influence of the lug 484, this is effective through the plate 490 to pivot the bell crank 478 counterclockwise as viewed in Fig. 21 to thereby restore this bell crank and parts connected thereto including the push rod 145 to their normal at rest positions.

Hence, when the key 108 is depressed the pump 110 is set in operation and thereupon fluid under pressure is forced from the accumulator chamber 201 through the conduit 311 to thereby move the piston 313, Fig. 60, to the left, whereupon the auxiliary carriage 400 is moved away from the stop block 455 to the left as viewed in Fig. 60. It should be observed from Fig. 18 that at this same time pressure from the accumulator chamber 201 is applied through the conduit 198 to the piston of the plate advancing slide 185, but such pressure is ineffective to impart plate advancing movement to the slide 185 until such time as the locking pawl 192 is released, as will hereinafter be described.

As has been stated, and as shown in Fig. 60, the pawl 453 projects forwardly, that is to the left, from the auxiliary carriage 400 in the course of movement thereof to the left as viewed in this figure. As shown in Figs. 13 and 60, when the auxiliary carriage 400 and the pawl 453 are in the normal at rest position, the leading end of the pawl 453 is slightly spaced from the roller 321. The roller 321, as mentioned previously is mounted on the free end of the line spacing pawl release lever 323, which is fast on the shaft 319. As clearly shown in Fig. 60 the forward end of the pawl 453 is tapered and therefore when the auxiliary carriage 400 moves to the left as viewed in Fig. 60, this tapered end quickly moves into engagement with the roller 321 and forces this roller and the lever 323 upwardly to thereupon pivot the shaft 319 counterclockwise as viewed in Fig. 40. This is effective to move the block 451, carried by shaft 319, from the effective position in which it is shown in Fig. 23 into an elevated or inactive position such as that shown in Fig. 22. This moves the block 451 out of the position in which it is disposed when effective to engage the adjustable stop 452, so that therefore a stop rod 491 mounted in the main frame 288 of the carriage 250 moves into direct engagement with the adjustable stop 452 as shown in Fig. 22. This disposes the carriage 250 in the position in which it is shown in Fig. 22, in which position one end of the jaw 255 engages the end of the plate 172 to therefore also engage the ends of the plates 206 and 207 which extend to the end of the plate 172. In order to insure that the rib 268 will be aligned with the groove G in the plate in the position of the plate Pb beneath the overhanging part of the plate 206, a projection 492, Figs. 50 and 51, is provided on the lower plate 263 of the jaw 255 and this projection passes into a recess formed in the end of the plate 172. Such projection and recess are of complementary configuration and are accurately related so as to insure the aforesaid desired alignment.

A similar projection 493 is formed on the other or right-hand end of the lower plate 263 of the jaw 255, and this projection or aligning pin 493 is arranged to extend into a complemental recess formed in the jaws of the supplemental carriage 400.

The supplemental carriage 400 is of course mounted on the rail 160 for movement therealong and such mounting is effected by means of a pair of upper rollers 510, a lower roller 511 and a front roller 512 that bears against the forward face of the mounting rail 160. The supplemental carriage 400 comprises a main casting 513 that is generally of a box-like form so as to be open at the bottom and open at the lower portion of the rear side thereof. A lower bracket 514 is extended in a rearward direction so as to carry the rollers 511 and 512 in proper position for engagement with the mounting rail 160. See Fig. 58.

Along its upper rear edge the casting 513 of the auxiliary carriage 400 has a rearwardly projecting supporting plate 515 secured thereon by screws 516. Along the rear edge of the projecting plate 515 a jaw structure 518 is provided so that a plate P may be moved longitudinally into such jaw structure from the jaw structure 255 of the carriage 250. The jaw structure 518 is afforded by a plate 519 secured to the plate 515 by screws 520 so as to extend somewhat rearwardly from the rear edge of the plate 515. A lower jaw member 521 is engaged with the lower rear edge of the plate 519 so as to afford an upwardly extending rib 522 that extends along the entire rear edge of the plate 519. An upper plate 523 formed from a spring material is disposed on the top of the plate 519 so as to extend rearwardly to a position over the rib 522. A generally U-shaped clamp plate 524 is secured along the end edges and the forward edge of the spring plate 523 by means such as screws 525, thereby to secure the spring plate 523 in position. The relationship between the plate 523 and the rib 522 is such that the spring plate 523 exerts a frictional retaining action upon the plate when the plate is in position between the plate 523 and the rib 522.

The movements of a plate P into and out of the jaw structure 518 are in the direction of the arrows in Figs. 57 and 59. To facilitate entry of the plate P into position between the plate 523 and the rib 522, an entry throat 522A is provided as indicated in Fig. 57. When a plate P is inserted into position between the spring plate 523 and the rib 522, it is essential that the plate be ultimately located in a predetermined position with relation to the auxiliary carriage 400. For this purpose a stop plunger 528 is mounted in a guide 529 for movement transversely with respect to the rib 522. The plunger 528 is biased in a rearward direction, or to the right as seen in Fig. 59, by a spring 530 so that the rear end of the plunger 528 is normally disposed in the path of the leading edge of a plate P as such plate is moved into position in the jaw structure 518. Thus the stop plunger 528 acts as a stop for determining the extent of feeding movements that are to be imparted to the entire row of plates that are fed through the machine in each normal cycle of operation. As to the plate at Pc, located in the jaw structure 255 of the main carriage 250, such positioning by the action of the stop plunger 528 is more or less preliminary in character, since the positioning dogs 269 and 270, described hereinabove, become effective prior to the embossing operation to accurately determine the longitudinal position of the plate that is in the main carriage 250.

The positioning plunger 528 must of course be withdrawn in order to enable the plate P to be withdrawn therefrom. This is accomplished automatically, in a manner that will be hereinafter described, when the auxiliary carriage 400 moves into its right-hand or home position. Thus as shown in Figs. 24 and 25, a cam lug 532 is mounted in a stationary position so as to lie in the path of a lower portion of the angular forward face of the stop plunger 528. The relationship is such that when the auxiliary carriage 400 is substantially in its home position, the plunger 528 will engage the lug 532 so that by the time the auxiliary carriage 400 reaches the home position, the stop plunger 528 will be cammed forwardly to an ineffective position. Thus the plate P is conditioned for unloading by endwise movement of the plate P in a left-hand direction with respect to the auxiliary carriage 400. In the course of such unloading movement, the plate P is discharged into a downwardly sloping chute 533 along which the plate moves in a downward direction into a collecting hopper 534.

Prior to the discharge of the plate from the auxiliary carriage 400, the present invention makes provision for automatic rolling of the faces of the type characters so as to thereby insure high quality impressions from the embossed type characters that have been formed on the plate P. For this purpose a plate rolling mechanism 540 is mounted on the rail 160 for cooperation with each plate P when the plate is in the position determined by the home position of the auxiliary carriage 400. The plate rolling mechanism is best shown in Figs. 24, 25, and 64 to 67 inclusive wherein it will be apparent that a supporting bracket 541 is secured by a bolt 542 to the rear side of the rail 160. On the top of the bracket 542 a relatively rigid casting 543 is secured by bolts 544. This casting 543 is generally C-shaped in cross section so as to afford a throat 545 that opens forwardly toward the rail, thereby to afford space into which the plate P that is to be unloaded may be moved, as indicated in Fig. 67, and also to afford space within which the plate rolling mechanism may be mounted. The lower side of the throat 545 has an anvil 546 secured thereon as by screws 547. When the auxiliary carriage 400 is moved into its home position, the plate P that is carried in the jaw structure of the auxiliary carriage is moved into position on the flat upper surface of the anvil 546.

It will be observed in Figs. 24, 25, 64 and 65 that the left-hand end portion of the anvil 546 has an upstanding transverse ridge 548 formed thereon so as to afford a shoulder against which the left-hand or trailing edge of the plate P may bear during the rolling operation, but this shoulder or ridge 548 is of such a height and form that in the movement of the auxiliary carriage 400 to its home position, the forward edge of the plate P carried by such carriage will move readily over the ridge 548. When the auxiliary carriage 400 reaches the home position thereof, the left-hand or trailing edge of the plate P will drop into position against the shoulder formed by the right-hand side of the ridge 548.

When a plate P has thus been positioned on the anvil 546, the rolling means are rendered effective to roll the surfaces of the embossed type characters to an even and flat configuration. Such rolling means are mounted for movement by guiding and supporting means that are fixed along the upper face of the anvil member 546. Thus the rolling means in the present instance comprise a roller carriage 550 having side plates 551 and 552 that are held in spaced relation by spacer devices 553.

Adjacent the lower edges of the plate 511 and 552, a lower roller 555 is mounted on a shaft 556. Upwardly of the roller 555, a pair of backing rollers 557 are rotatably supported between the two plates 551 and 552. The backing rollers 557 are so arranged that when an upward pressure is exerted on the lower roller 555, the backing rollers 557 will ride along a hardened surface afforded by a pair of bearing rails 559. All three rollers 555 and 557 are mounted with sufficient play to transmit their roller pressure to the bearing rails 559, rather than submitting end bearing parts such as shaft 556 to such pressure. The bearing rails 559 are spaced apart so as to be disposed adjacent to the opposite end portions of the backing rollers 557. These rails are held in position by screws 560. When the carriage 550 is not subjected to upward pressure, the carriage is slidably supported by inturned upper edges 551A and 552A on the side plates thereof which extend onto bearing shoulders 559A formed on the outer upper edges of the rails 559, as shown in Fig. 67.

The roller carriage 550 is normally urged to the right-hand position shown in Figs. 64 to 66 inclusive. This is accomplished by a spring 562 that acts between an anchoring pin 563 on the carriage and an anchoring pin 564 that extends downwardly from the upper side of the throat 545, as best shown in Fig. 66.

When a plate rolling operation is to be performed, the roller carriage 550 is moved to the left against the action of the spring 562 by hydraulic piston and cylinder means that are in turn operated by fluid pressure from the main pump of the machine. Thus the side plate 552 of the roller carriage has the left-hand end thereof bent in a rearward direction to afford an attaching lug 567, and a relatively long piston 570 is secured to the lug 567 so as to extend to the right as viewed in Fig. 65. The piston 570 is surrounded by a stationary cylinder 571 that is screw threaded at its right-hand end into a bore 572 formed in a block 573. The block 573 is secured by bolts 574 to the casting 543, and the opposite end of the bore 572 is closed by a plug 575. An inlet 576 is afforded into the block 573 so that hydraulic fluid under pressure may be supplied to the cylinder 571, thereby to force the roller carriage to the left through an operative plate rolling stroke. The inlet 576 is connected by a pipe 577 to a valve port 578, Fig. 18, so that the valve port 578 is controlled by a shiftable valve member 580 that is mounted in the block 200 and which is of the piston or spool type.

The valve member 580 is arranged to be reciprocable in the chamber 201, and the valve member 580 normally occupies the position shown in Fig. 18 so as to close the valve port 578 while opening the valve ports 199 and 312. When it is desired to operate the plate rolling carriage 550, the valve 580 must be shifted so as to open the supply port 578. At the same time, the valve port 312 that communicates with the piston 313 of the carriage return mechanism must be closed. Shifting of the valve member 580 is accomplished automatically as an incident to the movement of the auxiliary carriage 400 into its home position.

The valve member 580 has a Bowden cable 582 arranged for cooperation with the left-hand end of the valve member, as shown in Fig. 18, the sheath 583 of the Bowden cable 582 being anchored in a sleeve 584 that is extended into one end of the bore that affords the chamber 201. The Bowden cable 582 is extended to a position adjacent to the home position of the auxiliary carriage 400, and means are provided for operation by the auxiliary carriage as it approaches its home position to impart an endwise shifting movement to the Bowden cable 582 to thereby shift the valve 580 to the right from the position shown in Fig. 18. Thus as shown in Figs. 24 to 27, the Bowden cable 582 is extended so that the sheath 583 thereof may be anchored in a stationary guide sleeve 587. An operating plunger 588, mounted in the guide sleeve 587, is arranged so that movement of the plunger 588 to the left in Fig. 26 will impart a longitudinal shifting movement to the Bowden cable 582 to thereby shift the valve member 580 to its right-hand position from the position shown in Fig. 18. The plunger 588 is arranged for operation by a lever 590 that is pivoted at 591. Lever 590 has a laterally extending ear 592 adjacent the lower end thereof in position for engagement with the end of the plunger 588. The upper end of the lever 590 is arranged for operative engagement by means that are mounted on the auxiliary carriage 400, and the lever is adapted to be shifted between the two positions shown respectively in Figs. 26 and 27, a spring detent device 593 being associated with the lever 590 to maintain the same in one or the other of these two positions.

The means for shifting the lever 590 from the position shown in Fig. 26 to the position shown in Fig. 27 are so arranged that the lever 590 is first operatively engaged and moved to the right-hand position shown in Fig. 27 and is thereupon released so as to be free for return movement to the left and to the position shown in Fig. 26. Thus the auxiliary carriage 400 has an actuating pawl 595 mounted thereon so that the forward or right-hand edge of the pawl 596 is adapted to engage an abutment surface 597 formed on a pin that extends forwardly from the upper end portion of the lever 590. The pawl 595 is connected to the carriage 400 by a spring hinge 598 that tends to urge the right end of the pawl 595 in an upward direction and into such a position as to tend to engage the abutment surface 597. Such upward biasing movement by the spring hinge 598 is limited by a limiting arm 599 fixed on the pawl 595 and arranged to engage the lower surface of a rigid arm 600 that is secured on the carriage 400 beneath the end of the spring hinge 598.

By reason of the action of the spring hinge 598, the pawl 595 normally occupies the position shown in Fig. 26 so that in the course of the right-hand movement of the auxiliary carriage 400, the end 596 of the pawl 595 will engage the abutment surface 597, thereby to impart a rocking movement in a right-hand direction to the lever 590. Such engagement of the pawl 595 with the abutment 597 is maintained until the auxiliary carriage 400 has substantially reached its home or right-hand position.

At this time, the pawl 595 is moved downwardly so as to disengage the end 596 thereof from the abutment 597 of the arm 590. Such disengaging movement is imparted to the pawl 595 by means that are associated with the lever 590. Thus the lever 590 has a right-hand extension 604 formed at its upper end, and a pin 605 is mounted on the extension 604 in such a position as to overlie an extension 599A of the member 599, it being observed that the member 599 is fixed to the pawl 595 by a rivet 606. The release pin 605 is in the present instance mounted on the extension 604 by an eccentric mounting 605A so that the position of the pin 605 may be accurately adjusted, and this adjustment is such that in the course of a right-hand shifting movement of the lever 590, the pin 605 will engage the extension 599A and move the same downwardly at such a time as to release the pawl 595 from the abutment 597 at substantially the end of the right-hand stroke of the auxiliary carriage 400. Thus as will be evident in Fig. 27 of the drawings, the end 596 of the pawl 595 will be disposed downwardly with respect to the abutment 597 so that while the auxiliary carriage 400 is in its home position, the lever 590 will be free for return or left-hand shifting movement when this is required, as will hereinafter be explained.

The shifting of the lever 590 into the position shown in Fig. 27 results in a shifting of the valve member 580 from the normal position, shown in Fig. 18, to a right-hand position wherein the port 312 is closed and the port 579 is opened. This of course conditions the hydraulic system for actuation of the plate rolling carriage 550 and, in addition to such conditioning action, the operation of the lever 590 also results in tripping the clutch of the pump 110, so as to thereby cause the pump to operate through a pumping cycle. Thus as will be evident in Fig. 20 of the drawings, the valve 580 has the end thereof that is opposite with respect to the Bowden cable 582 arranged so as to be in opposed relation to a downwardly extending arm of a bell crank 610 that is pivoted at 611 on the pump bracket 139. The other arm of the bell crank 610 has a lateral extension 610A formed therein so as to underlie a collar 612 that is fixed to the control rod 145. The downward movement of the control rod 145 as hereinbefore described occurs near the end of a cycle of operation of the pump and serves normally to locate the bell crank 610 in the position shown in Fig. 20 wherein the bell crank abuts a limiting stop 613.

When the lever 590 is actuated to the position shown in Fig. 27, so as to thereby actuate the valve 580, the end of the valve 580 acts upon the bell crank 610 so as to rock this bell crank in a clockwise direction as viewed in Fig. 20. This results in upward or clutch releasing movement of the control rod 145 so as to thereby initiate an operating cycle of the pump. In such cycle of operation, the hydraulic fluid is forced through the port 578 and the conduit 577 so as to operate the plate rolling carriage 550 through a plate rolling cycle.

When the cycle of operation of the pump is substantially completed, the control rod 145 is moved downwardly in the manner hereinbefore described, and when this is done, the bell crank 610 is rocked back to the position shown in Fig. 20 so as to thereby return the valve 580 to its normal position as shown in Fig. 18. The return movement that is thus applied to the valve 580 is likewise transmitted through the Bowden cable 582 and back to the lever 590 so that concurrently with the restoring of the valve 580, the lever 590 is returned from the full line position of Fig. 27 to the dotted line position. In such return movement of the lever 590, the abutment 597 moves freely past the pawl 595 so as to be located in the dotted line relationship shown in Fig. 27. Such relationship of the abutment 597 with respect to the pawl 595 and the edge 596 is also clearly illustrated in Fig. 25 of the drawings wherein it will be evident that the abutment pin 597 at this time in the machine cycle is disposed above the pawl 595.

It should be pointed out that the plate rolling operation as above described takes place at a time when the plate feeding slide 185 of the plate supply mechanism is latched in its rest position by the latch 192, and also that the plate rolling operation takes place at a time when the port 312 of the hydraulic system is closed. As a result of this, the pumping capacity at this time very greatly exceeds the amount of hydraulic fluid that will be required to effect the operation of the plate rolling mechanism. Under such circumstances, the excess hydraulic fluid is bypassed by pressure relief mechanism back to the supply chamber 111 of the pump.

As will be evident in Figs. 17 and 19 of the drawings, a valve chamber 615 is provided in the body 200 of the pump, and this valve chamber 615 communicates through a relative short passage 616 with the pump outlet passage 146. A slidable valve closing member 617 is mounted within the valve chamber 615 for cooperation with a valve seat formed about the right-hand end of the passage 616, as viewed in Fig. 17. The valve member 617 is urged toward a closed relationship by a spring 618 that acts against a threaded plug 619 that closes the outer end of the valve chamber 615. The valve chamber 615 has an upwardly extending passage 620 that connects the valve chamber 615 with the supply chamber 111 of the pump so that when excessive pressure within the pump chamber causes the valve 617 to be unseated, the excess hydraulic fluid may be forced past the valve member 617 and into the chamber 615 from which it may pass through the relief passage 620 into the supply chamber 111 of the pump. This relief mechanism functions not only during the plate rolling operation, but also in those other cycles of pump operation where the plate feeding slide 185 is held against movement, or where the main carriage 250 is operated through the relatively short stroke that is utilized in the normal carriage return movements of the main carriage.

It has been pointed out hereinbefore that after the plate rolling operation has been completed by operation of the plate rolling carriage 550, the plate P that has just been rolled is ejected from the auxiliary carriage 400 and is discharged into the collecting chute 533. This is accomplished by means that are associated with the plate rolling carriage 550.

Thus, as will be evident in Figs. 64 and 65 of the drawings, an ejecting pawl 625 is pivotally mounted on the inner side of the side plate 552, such pivotal mounting being afforded by a screw 626 that is associated with the lower left-hand one of the spacers 553, as seen in this figure. A spring 627 urges the left-hand end of the ejecting pawl 625 in an upward direction to an extent that is determined by a stop pin 628 that is fixed on the pawl 625 so as to project through an opening 629 formed in the side plate 552. During the left hand or plate rolling stroke of the plate rolling carriage 550, the right-hand end of the pawl 625 rides along the upper surface of the plate P that is being rolled, such engagement being adjacent to the edge of the plate that is clamped in the jaws of the auxiliary carriage. At the end of the plate rolling stroke of the plate rolling carriage, the pawl 625 rides off the end of the plate P. Thereupon the pawl is snapped by spring 627 in a downward direction so as to be aligned with the left-hand end edge of the plate P, as seen in Fig. 64. Hence in the return movement of the plate rolling carriage, to the right as seen in Fig. 64, the pawl 625 engages the left-hand end edge of the plate P and moves the plate P longitudinally out of the jaws 518 of the auxiliary carriage, it being recalled that while the auxiliary carriage 400 is in home position, the stop plunger 528 which would otherwise block ejection of the rolled plate is maintained in its retracted or ineffective position by the action of the cam block 532, Fig. 25.

In the operation of the machine, the main carriage 250 is operated through two different types of return strokes, one of which may be termed the loading return stroke wherein the main carriage 250 is moved to the loading position shown in Fig. 22, while the other of such return strokes may be termed the normal carriage return stroke. In the loading return stroke, it should be observed that the auxiliary carriage 400 is also moved to the left to the position shown in Fig. 22 so that when the plate feeding slide 185 is operated, it will not only serve to move a new printing device into position on the main carriage 250, but will also serve to discharge the completely embossed printing plate from the position of Pc in carriage 250 into a position Pd wherein the plate is held by the jaw structure of the auxiliary carriage. In contrast with such operation in the loading return stroke, it should be observed that in the normal return stroke of the main carriage 250, the auxiliary carriage 400 remains stationary in its right-hand or home position, the plate at Pc being retained in carriage 250 for further embossing operations.

In its normal return stroke, the main carriage 250 is shifted to the left to an initial position that is determined by the interposing of stop bar 451. This bar remains effective in such normal carriage return strokes, as will hereinafter be explained, but is ineffective when a new plate is to be loaded. Another difference between the loading return stroke and the normal return stroke of the main carriage 250 is that in the loading return stroke, the cross slide or line spacing mechanism of the carriage is released by the action of the pawl 453 and the roller 321, Fig. 60, to return the plate holding elements to their outer or first line position with respect to the embossing dies. In the normal return stroke of the main carriage 250, the line spacing mechanism of the cross slide is engaged and operated so as to space the cross slide one line inwardly toward the dies. This action will be described in detail hereinafter.

The carriage return movements of both types, as above defined, are attained through operation of the piston 313. Means are provided for rendering the piston 313 effective selectively to operate the auxiliary carriage 400 and the main carriage 250 in a left-hand direction, or to merely operate upon the main carriage 250 while allowing the auxiliary carriage 400 to remain stationary in the home or right-hand position thereof. It has been pointed out that the movements of the piston 313 are transmitted to the auxiliary carriage 400 through the releasable connecting pawl 453. The arrangement is such that this releasable connection remains in its operative or connected relationship for a loading return stroke and is released in those cycles of machine operation where the auxiliary carriage 400 is to remain stationary while the main carriage 250 is operated through a normal carriage return and line spacing operation.

As will be evident in Figs. 60, 62 and 63, the pawl 453 has a notch 630 formed therein that is arranged normally to embrace the upper edge of the member 314. The dimensions of the slot 630 are such that there is a substantial lost motion with respect to the member 314. Thus when the piston 313 is actuated to the left in Fig. 60, the member 314 moves to the left from the position shown in Fig. 60 to the position shown in Fig. 63. Notch 630 is wider than the element 314 which it engages and, during this taking up of the lost motion, the auxiliary carriage 400 remains stationary. Unless pawl 453 is unlatched, however, further movement of the piston 313 and the member 314 is transmitted through the pawl 453 to the auxiliary carriage 400 so as to thereby move the auxiliary carriage to the position shown in Fig. 22, it being noted that the forward edge of the pawl 453 is effective upon the roller 321, Fig. 60, to release and cause return of the line spacing slide and at the same time to rock the interposing or stop member 451 to its inactive position. This makes it possible for carriage 250 to be moved the full distance required for a loading operation so that at the end of the left-hand stroke of the piston 313, the main carriage 250 will be in the loading position of Fig. 22 and the auxiliary carriage will be in a position of Fig. 22. The auxiliary carriage will thus be in a position to receive the printing plate that is to be ejected from the jaws of the main carriage.

It will be recognized that when the carriages are located in the position shown in Fig. 22, a considerable force will be exerted thereon in a right-hand direction by the operation of the plate feeding mechanism, since the plate at Pd in the carriage 400 is held with considerable friction. Means are therefore provided for latching the auxiliary carriage 400 and the main carriage 250 in the positions shown in Fig. 22. Such latching mechanisms are illustrated in Figs. 57 and 60 to 63, and as there shown they comprise a latching pawl 635 pivoted at 636 on the rear face of the pawl 453 and a spring 637 which acts on the pawl 635 so as to urge the left-hand end thereof, Fig. 62, in a downward direction. The latch 635 has a tooth 635A that projects downwardly near the forward or left-hand end of the pawl 635. This tooth normally tends to ride upon the upper surface 639 of a bar 640 that is secured in position on the forward face of the rail 160 by clamping devices 641. Near its left-hand end, Figs. 62 and 63, the bar 640 has a notch or recess 643 formed in the upper surface 639 thereof. The adjustment of the bar 640 in a longitudinal sense is such that when the auxiliary carriage and the main carriage 250 have been moved into the plate loading position shown in Fig. 22, the tooth 635A will drop into the recess 643 so as to thereby interengage with the recess. This serves to prevent right-hand movement or displacement of the auxiliary carriage 400 as well as the main carriage 250 until such time as the tooth 635A is disengaged from the notch 643.

Disengagement of the tooth 635A from its effective or latched position with notch 643 is attained by means that operate as an incident to the taking up of the lost motion between the ends of the slot or notch 630 in pawl 453 and the member 314. Thus it will be noted that the pawl 635 may move down to its engaging or latching position of Fig. 63 only when the member 314 is engaged with the left-hand end edge of the notch 630. When the parts 630 and 314 are in the relative condition shown in Fig. 62, a sloping cam surface of the pawl 635 rests on member 314 and prevents latching of tooth 635A with the notch 643. When the direction of movement of the piston 313 is reversed, or in other words when the right-hand movement of the piston is initiated, the taking up of the lost motion between the member 314 and the right-hand end of the notch or slot 630 is utilized to effect disengaging movement of the pawl 635. The sloping cam surface 645, and the complemental upper surface 646 provided on the upper edge of the member 314, are effective to disengage the tooth 635A, as will be evident in Figs. 62 and 63.

Thus when the member 314 moves to the right from the position shown in Fig. 63, the latch 635 will be cammed upwardly so as to disengage the same from the recess 643. After such release of the pawl 635, the right-hand edge of the member 314 will engage the right-hand end, Fig. 63, of the slot 630 to thereby impart right-hand movement to the auxiliary carriage 400 toward the home position thereof. In the first portion of such right-hand movement of the auxiliary carriage 400, the main carriage 250 will follow along under the influence of its tensioning spring 305, and after a predetermined movement that is sufficient to allow the interposer or stop 451 to return to its effective position of Fig. 23, the main carriage 250 will be stopped as will be hereinafter described, in position for the first embossing operation.

The return movement of the auxiliary carriage 400 continues until the auxiliary carriage reaches the home position that is determined by the stop 455A. When such home position of the carriage 400 is attained, the location of the member 314 in engagement with the right-hand end of the slot 630 maintains the latching pawl 635 in its elevated position, but it should be observed that this latching pawl is again released for downward movement into engagement with the surface 639 of the bar 640 as soon as another left-hand movement of the piston 313 is initiated.

When the main carriage 250 is to be operated through a normal carriage return and line spacing stroke, the pawl 453 is released from this member 314 by moving the latter to an elevated position such that the left-hand end of the slot 630 will lie out of the path of the left-hand edge of the member 314. This is accomplished by actuation of the control key 103. Such actuation of the control key 103 serves to initiate operation of the pump and also serves to disconnect the auxiliary carriage 400 from the piston 313. Hence the piston 313 will operate through a left-hand stroke to move the main carriage through a normal carriage return stroke in the course of which a line spacing operation will be effected in the manner that will be described presently.

When the key 103 is actuated, an arm 650, Figs. 68 to 70, that is fixed on the lever 104 so as to overlie the lever 109 acts to depress the lever 109 so that the lever 109 operates in the manner hereinbefore described to cause release of the pump clutch and this causes the pump to operate through a pumping cycle. The depression of the key 103 also serves to elevate and release the pawl 453 which at this time is located directly over a push rod 651. The push rod 651 is guided in an aperture 652 formed in a guide block 653, Figs. 60 and 62, so that when the push rod 651 is actuated in an upward direction, the pawl 453 will be elevated so that the left-hand end edge of the notch 630 will be disposed out of the path of the left-hand edge of the member 314. This serves therefore to disconnect the auxiliary carriage 400 from its actuating piston 313 and the piston 313 will therefore operate through its cycle independently of the carriage 400. The carriage 400 meanwhile, will remain in its right-hand or home position.

The operating connection between the key 103 and the push rod 651 is afforded by means including a Bowden cable 655. This Bowden cable has a sheath 656 that is anchored in the anchoring block 466, Fig. 68, previously described. The end of the Bowden cable 655 is connected to a plunger 656 that is mounted for reciprocation in the block 466. The plunger 656 is located so as to underlie a laterally projecting ear 657 that is secured to the lever 104 as shown in Figs. 63 to 70. Thus when the key 103 is depressed, the Bowden cable 655 will be actuated, and such actuation is arranged to be transmitted to the push rod 651.

As shown in Fig. 13 the opposite end of the sheath 656 may be anchored in an anchoring block not shown that is mounted on the frame element 114 and the anchoring element 658 has a vertically disposed push rod 659 mounted therein and connected to the end of the Bowden cable 655. An upper end of the rod 659 has an adjustable connector element 660 fixed thereon. This element is connected to the lower end of the push rod 651 so as to transmit movement thereto. The adjustable connector 660 enables the stroke of the push rod 651 to be adjusted so that the desired operation of the pawl 453 may be readily attained.

When the key 103 is depressed as hereinbefore described, to initiate a normal carriage return stroke of the carriage 250, the release of the pawl 453 and the operation of the pump will cause the piston 313 to start through its left-hand stroke while leaving the auxiliary carriage 400 in its right-hand or home position. There may be instances where the operator will not hold the key 103 depressed for a sufficient time to allow the left-hand edge of the member 314 to pass beneath and beyond the left-hand edge of the slot 630. To take care of such a situation, means are provided for latching the pawl 453 in its elevated or released position until the piston 313 has advanced a considerable distance to the left. Thus as will be evident in Figs. 60 and 61, a latching pawl 662 is pivoted at 663 on the top of the plate 315, and a spring 664 tends to maintain the latching end of the latch 662 in contact with a control block 665 that is secured to the forward face of the pawl 453. The relationship of the control block 665 to the latching pawl 662 is such that when the pawl 453 is lifted to its elevated position as hereinbefore described, the latching pawl 662 will move into position beneath the lower edge 665A of the block 665, thereby to maintain the pawl 453 in its elevated or released position.

The left-hand movement of the piston 313 and the associated plate 315 will cause the latching pawl to move to the left beneath the lower surface of the block 665. After such movement of the piston has progressed to such a point that the left-hand edge of the member 314 is disposed beyond and to the left of the left-hand edge of the slot 630, the latching pawl 662 will ride out from beneath the control block 665, thereby to allow the pawl 453 to return to its lowermost position. When the left-hand movement of the piston 313 has been completed, and the piston starts through its right-hand or return movement under the influence of the return spring 316, the sloping surface 646 of the member 314 will first engage the pointed end of the pawl 453 so as to ride into position beneath the pawl 453. At the end of the right-hand stroke of the piston 313, the member 314 will be embraced within the slot 630.

In addition to the control keys 103 and 108, a third control key 670 is provided for releasing the carriage 250 from its escapement mechanism. They key 670 is mounted on a pivoted lever 671 on the same pin 105 which mounts the levers 104 and 109 for keys 103 and 108. The lever 671 has attached thereto a bracket 672 having a foot portion which overlies a slidable pin 673 mounted in a sleeve 674 to which the sheath 675 of a Bowden cable 676 is secured. The sleeve 674 is anchored to the block 466 in any suitable manner, as shown in Figs. 69 and 70.

The sheath 675 of Bowden cable 676 is carried up beneath the frame to a suitable anchor point, not shown, below the carriage supporting rail or bar 160 at a point about opposite the right-hand edge of carriage 250 when the carriage is moved to the right as at the completion of embossing a line of characters T on a plate. A slidable rod 677, Figs. 35 and 36, is attached to the end of cable 676 and is adapted for vertical sliding movement when the key 670 is operated. The upper end of rod 677 rises behind the carriage supporting bar or rail 160 and an end portion of the rod projects forwardly, towards a person observing the machine from the front, and through an opening 678 provided in the rail 160. The end of rod 677 is pivotally connected at about the mid-point of a lever 679 pivotally secured to the bar 160 as by a screw 681. A small coil spring 682 is carried in a pocket in a block 683 secured to the bar or rail 160 and it bears on the lever 679 to urge it downwardly or clockwise as seen in Figs. 35 and 36. Movement of the lever 679 in either direction is limited by the dimensions of the opening 678 through which rod 677 passes.

The lever 679 extends to the left and its free end is stepped to provide a stop shoulder 685 for a purpose which will be described presently.

The carriage 250, which supports a printing plate at Pc during embossing operations, is caused to travel to the right step by step as each character T is embossed thereon. This action is caused by the tape or band 306 attached to the spring barrel 305 mentioned hereinabove. The tape 306 has its free end attached to a stud secured to the bracket 294 of the carriage 250, as previously mentioned. Hence whenever the carriage is free to move to the right, the spring barrel 305 draws it in that direction until it is stopped by one of various stop or control means which will next be described.

Referring now to Figs. 52 to 56, a bracket member 701 is secured to the bar or rail 160 by means such as screws 702 and it projects downwardly from the rail to support an escapement mechanism which controls step by step movement of the carriage 250 to the right under the influence of spring barrel 305. The bracket 701 provides a bearing for a shaft 705 which mounts a gear 706, an escapement ratchet wheel 707, and a notched wheel 708. A knurled knob 709, Fig. 55, may also be provided.

Above the gear 706, the bracket 701 is grooved to slidably receive a rack bar 711 which has teeth meshing with those of gear 706 and which has its right end, Figs. 35 and 36, provided with a pawl 712 pivoted thereto at 713 and normally rocked clockwise by a leaf spring 714 to latch over the edge of the bracket 294. The lower edge of the right end of the pawl 712 is cam shaped as shown at 715 and the sloping cam portion terminates in a locking tooth 716.

A stationary pin 717 is provided in the bar 160 and when the carriage 250 and the rack bar 711 reach the position shown in Fig. 36 the pawl 712 is lifted, by engagement with pin 717, to release the rack 711 from the carriage bracket 294. At this point the end of the rack bar 711 contacts pin 717 and further movement of the rack bar to the right is prevented.

When the lever 679 is in its lowered position, as shown in Figs. 35 and 36, the shoulder 685 on the left end thereof contacts the upper edge of bracket 294, as previously mentioned, preventing further movement of the plate carriage 250 to the right. For automatic operation, further movement to the right is neither necessary nor desirable and the stop position is so arranged as to dispose a plate Pc in the embossing dies so that the trailing edge thereof is disposed between the dies in embossing position.

It may be desirable, at times, to feed plates by hand, as when a small number of plates of odd sizes are to be embossed. The mechanism of the present invention is designed to permit such manual operation at any time without dismantling or even unloading the automatic plate feed mechanism.

As shown in Fig. 13, the plate magazine ME and plate feeding elements at the left make it impracticable to feed a plate manually into the jaw 255 of the carriage 250 from that direction. Also, it is not possible to swing the jaw 255 between the position where it is shown in Fig. 46 and the position of Fig. 47 without moving the carriage longitudinally to clear the embossing dies. Therefore an arrangement is provided whereby the carriage may be moved to the right and well beyond embossing position for hand feeding of plates to the jaw 255.

The movement just described is accomplished by the spring barrel 305 and tape 306 when the key 670 is pressed to lift the lever 679 so that shoulder 685 clears the bracket 294, Fig. 36. The carriage 250 thus moves until its bracket 294 abuts against a stop pin 721. In this position the plate jaw 255 can be swung to the position of Fig. 47, an embossed plate removed by sliding it manually to the right as seen in Fig. 13, and a new plate may then be slid manually into the jaw from right to left. A vertical plate 725, Figs. 46 and 47, extends upwardly from the carriage at its left end and serves as a positioning stop when plates are inserted manually. It has a curved tongue 726 portion extending toward the embossing dies and curving also to the left, as best shown in Figs. 43 and 44. A shorter tongue 727, also slightly curving to the left is also provided.

The tongue 726 serves to cam the plate locking bar 279, Fig. 50, to the right as the jaw is raised from embossing position to unlock a plate held by the jaw in the manner previously described. Tongue 727 serves to align the plate in the jaw 255.

A guide member 731 consisting of a rabbeted plate 732 and a cooperating plate 733, welded or otherwise secured thereto, affords a groove through which a plate P may be slid into the jaw 255. See Figs. 43 to 45. The member 731 is secured as by screws 734 to a bracket 735 forming a rigid part of the carriage 255 and is arranged to align the groove between plates 732 and 733 with the groove between the jaw elements. A notch 736, Figs. 43 and 45, receives the projecting stud 493 on the jaw to insure registering alignment.

The escapement mechanism which controls longitudinal advancing of the carriage 255 during embossing has been mentioned hereinabove as comprising the rack 711, gear 706, shaft 705 and ratchet wheel 707. A pair of pawls 741 and 742 which operate alternately have their ratchet engaging teeth spaced a fraction of a ratchet tooth space apart so as to permit the ratchet wheel 707 to move one tooth space, under the influence of spring barrel 305, with each operation of the two pawls. A rocking shaft 743, Fig. 56, has two flat surfaces 744 and 745 disposed in different planes and adapted to engage at different times the depending arms 746 and 747, respectively, of the pawls 741 and 742. Both pawls are pivoted on the same pin 748, and each is acted upon by a leaf spring 749 as best shown in Fig. 54.

A pin 751 is carried by the carriage 250 and when the carriage is in the position shown in Fig. 35, that is, in plate loading position, the pin 751 is adapted to contact a sloping cam surface 752 on an arm 755. This arm extends to the right from shaft 748 and is secured to the escapement pawl 742.

The escapement pawl 742 is ordinarily the holding pawl, the other pawl 741 being normally disengaged. At each embossing step the shaft 743 is rocked first in one direction and then in the other by a bell crank 757 secured thereto. Such operation reciprocates each of the pawls 741 and 742. This operation is attained by a reciprocable link 761 attached as at 762 to an element that is operable by a spacer bar 762A, Fig. 14, in the manner disclosed in my aforesaid Patent No. 2,265,229. In the normal operations of the machine, the rod 761 is pulled downwardly near the end of the cycle in the manner disclosed in Patent No. 1,831,103, patented November 10, 1931. The upper end of link 761 has a block 764 attached thereto which has a shoulder 765 adapted to catch on and pull down an arm 766 of bell crank 757 at each reciprocation. A spring 767 attached to an upstanding arm 768 of bell crank 757 restores the shaft 743 to its normal clockwise position where it is shown in Fig. 52, thus holding pawl 741 out of engagement with the ratchet and permitting pawl 742 to remain in engagement.

When the carriage is moved to plate loading position, the pin 751 lifts the arm 755, Fig. 35, and thus disengages the pawl 742 from the ratchet wheel 707. The carriage is thus free to move to the right as soon as released.

As explained hereinabove, the carriage 250 moves to its extreme left position only when a new plate is to be fed into it. Normally it stops in the position shown in Fig. 23. In this position, the first type character may be embossed on the plate, the carriage automatically moving to the right space by space as character keys and word space means are operated. The operation of the embossing machine is almost identical, after a plate has been placed in the carriage, with the operation of a standard typewriter. Means are provided, however, for tabulating the carriage, if it is not desired to emboss the initial character at the extreme right end of the plate, and such means will next be described.

The tabulating means comprise the notched disk 708 which is adapted to receive one or more clips 771 for frictional retention in notches 772 in the periphery of the disk. The points at which the clips are placed manually determine the tabulation to be effected.

A tabulating pawl 773 is pivoted on shaft or pin 748, just as are the pawls 741 and 742, and a spring 749 urges it clockwise so that its depending arm 775 bears against the upper edge of the surface 744. The arm 775 is shorter than arm 746 of pawl 741, so as to terminate at or above the center line of the rock shaft 745 and when the shaft 743 is in its normal position of Fig. 52, the pawl 773 is in its elevated or inactive position. Arm 746 of pawl 741, on the other hand, is longer so that this pawl is first lowered as the shaft 743 rocks counterclockwise, and is then raised after the shaft has rocked counterclockwise beyond its normal range and to its tabulating position of Fig. 54.

A vertical link 781 has a bent upper end portion 782 which is disposed in an arcuate slot 783 provided in a wide arm 784 secured to shaft 743. A key 785 is associated to the lower end of link 781 as shown in my Patent No. 2,265,229, patented December 9, 1941, and depression of this key lowers the link in slot 783 to engage the lower end of the slot to rock the shaft 743 counterclockwise through a tabulating movement.

Another key 787 is attached to a rocker 763 so that depression of key 787 rocks member 763. A pawl member 788 is also attached to member 763 and extends vertically through a notched guide 789. A leaf spring 791 on the pawl member 788 bears against a fixed pin 792 mounted in bracket 701 and urges the nose 793 of the pawl member toward the notched disk 708 and the body of pawl member 788 in the guide 789. A pin 794, fixed to bracket 701, serves as a stop for the pawl and also serves to cam the pawl outwardly or to the right, Figs. 52 to 54, when in its lower position.

A bell crank 795 is pivoted on a pin 796 mounted in bracket 701 and a spring 797 tends to rotate the bell crank clockwise as seen in Figs. 52 to 54. Spring 797 also tends to draw the link 761 upward and to the right. An arm 798 extends to the rear from the left end of the bell crank and a slotted arm 799 serves as a guide for link 761.

When the character spacing rod 761 is actuated downwardly, the lower end of the block 764 strikes spring arm 799 when the downward movement of the rod 761 has progress in an amount sufficient to cause functioning of the escapement pawls 741 and 742, and the rocking of the bell crank 795 causes the arm 798 thereof to engage the block 764 and force the same to the right. This releases the shoulder 765 of the block 764 from the tooth 766 of the lever 757. Thus the rock shaft 743 is promptly restored to its normal position.

The operation of the tabulating mechanism is as follows. Assuming that a clip 771 has been placed in a desired notch 772, the carriage being in its "home" position where the first character might be embossed, the tabulating key 785 is depressed to rock shaft 743 counterclockwise through a tabulating stroke wherein the pawl 755 is moved to its active position and the pawls 741 and 742 are released. As shown in Fig. 54, the pawl 773 is thus disposed in stop position where it engages clip 771. Upon release of key 785, pawl 741 is lowered and pawl 773 is raised, and clip 771 is then released, while the carriage is held in its tabulated position by the pawl 741.

The carriage 250 may be moved manually in either direction by grasping a pair of levers 801 and 802, normally held separated by a spring 803, Fig. 40. Depression of the upper arm 801 which is pivoted to the carriage at 804, Fig. 40, raises its rear end which is in the form of a stud 805 engaging under the upper horizontal leg of a longitudinally extending channel bar 806. Channel bar 806 is carried at its ends by two links 807 pivoted to pins 808 secured to rail 160. At its left end the bar 806 engages a roller 809 carried by holding pawl 742. See Figs. 35, 36 and 40.

The arms or links 807, Fig. 35, constrain the channel bar 806 for parallel movement so that, no matter where the carriage is when lever 801 is pressed down, the left end of the channel bar 806 raises and disengages the holding pawl 742. Hence as long as lever 801 is held down, the carriage may be freely moved, against the tension of the spring drum or by its aid, to any desired position. The lower arm 802 is a rigid part of the carriage 250.

The line spacing mechanism has been briefly referred to above and is best shown in Figs. 37 to 39, inclusive. The transversely slidable upper frame 251, referred to hereinabove as the line spacing frame, comprises a flat rectangular metal plate with downturned edge flanges on all four sides. Front and rear flanges are shown at 801' and 802', respectively, Figs. 46 and 47, and a left side flange 803' is provided with a rack 804' on the lower edge thereof. A similar flange 805' is formed on the right hand side and is provided with a similar rack 806' as shown, for example, in Fig. 37. All four flanges are shown in section in Fig. 38. The line spacing frame of course carries the plate holding jaw 255.

A transverse shaft 811 is mounted in the main frame of the carriage 250 below the flanged parts of the line spacing frame and it bears a pair of gears 812 and 813 which are fixed thereto and which mesh respectively with the racks 804' and 806'. Hence rotation of shaft 811 causes the line spacing carriage to move forward or backwards, away from or towards the embossing dies. A pair of coil springs 814 and 815, Fig. 38, are secured at their forward ends to the main frame of carriage 250 and at their rear ends to the line spacing frame just described so as to tend to urge the line spacing frame forwardly towards the operator, that is, away from the embossing dies.

The shaft 811 is provided with a ratchet wheel 816 with which two pawls are adapted to cooperate. As seen in Fig. 37, the curved arm 323, previously described as being mounted on a shaft 319 which is mounted below and parallel with shaft 811, includes a pawl tooth 821 for holding the ratchet against rotation counterclockwise as seen in the figure. At its free end the arm 323 carries the roller 321 which is operated by means described above to release the pawl tooth 821 and permit springs 814 and 815 to move the line spacing carriage outwardly.

Another pawl 822 in the form of a curved arm is pivoted on a rocker arm 823 pivotally mounted on shaft 811. The pawl has a tooth 824 adapted to engage the ratchet wheel 816 at certain times and at its opposite end pawl 822 bears a roller 825 adapted to contact a part of the curved arm 323 so that when arm 323 is rocked counter-clockwise, as by lifting the roller 321, or manually by depressing a finger piece 826, the roller 825 is moved downwardly so as to rock pawl 822 clockwise, as seen in Fig. 37. Hence both teeth 821 and 824 are disengaged and the ratchet wheel is free to rotate under the influence of springs 814 and 815 which restore the line spacing frame to its forward or outer first line position. Suitable stop means are provided for limiting the outward movement. A spring 827 urges pawl 822 counter-clockwise into engagement with ratchet wheel 816. The spring 828 previously described urges the arm 323 clockwise, as seen in Fig. 37, for the same reason.

The rocker arm 823 is urged counter-clockwise, as seen in Fig. 37, by a spring 828 attached to a lower part thereof. The arm also has a projecting finger 831 which is adapted to be engaged by an arm 832 of a bell crank element pivotally mounted, for movement in a substantially horizontal plane, on a vertical stud 833. The other arm 834 of the bell crank just mentioned is adapt to be engaged by a depending finger 835 integral with a lever 836 which is also pivoted on the stud 833. The lever 836 has an arm portion 837 extending beyond the stud and a spring 838 urges the lever counterclockwise as viewed from above to a position abutting the frame. See Fig. 39. When the lever 836 is moved clockwise, for example manually, the bell crank below it is similarly moved and the arm 832 thereof rocks the depending finger 831 to move the rocker arm 823 clockwise and causes the pawl tooth 824 to rotate the ratchet wheel by an amount corresponding to the space of one tooth. This of course rotates shaft 811 and through gears 812 and 813 moves the line spacing frame 251 one line space toward the dies.

The lever 836 has a depending finger piece 839 by which it can be moved manually when desired to effect the line spacing operation just described. Normally, however, in automatic operation, line spacing is effected by the engagement of a projecting finger 841 which forms a part of the plate 315 carried by the hydraulic piston which operates the carriage as previously described. See Figs. 25 and 61. This finger contacts lever 834 just to the rear of lug 835 and rocks it clockwise as seen in Fig. 39 when the hydraulic piston moves to the left to restore the carriage. The manner in which the line spacing frame 251 is released when a new plate is to be inserted has been described above.

It is believed that the operation of the embossing machine will be clear from the above description. Briefly, the operation may be summarized by reference to Fig. 13. The operator presses key 108 and initiates a cycle of the hydraulic pump 110. A plate P in the magazine ME is fed to an intermediate position Pb, Fig. 22, by a hydraulically operated feeder 184, the carriage 250 having been brought up against stop 452, and the interposing normal stop block 451 having been swung out of the way by the action of pawl 453 on roller 321, lever 323, shaft 319, etc.

The plate already in intermediate position Pb, Fig. 22, is moved into the carriage jaw 255 to position Pc. As soon as this is accomplished, the feed mechanism 184 and associated parts returns to the left position where it remains idle until time to feed another plate. Movement of piston 313 and mechanism 314 releases latching means 635 and 643, Figs. 62 and 63, and the carriage moves to the right, under the influence of spring drum 305, until the lever 755, Fig. 35, clears pin 751 and permits pawl 742 to engage ratchet wheel 707. Thereafter the escapement mechanism operates to space the carriage step by step as a line of characters are embossed on the plate.

After one line of characters has been embossed, the operator presses key 193 and initiates another cycle of the hydraulic pump 110. This time, however, the stop element 451 remains in interposed position and the auxiliary carriage 400 remains in its home position. Carriage 250 is restored to its initial position for embossing of the next line and the finger 831 is operated to move the upper carriage 251, upon which plate holding jaw 255 is mounted, one line space to the rear toward the embossing dies. If tabular spacing or indentation of the second line is desired, the tabular key 785 is operated.

After another line of characters is embossed, the operation is completed until three, four or more lines are completely formed and the plate is ready to be ejected. The operator again presses key 108 which initiates a cycle of operation of the pump 110, connects auxiliary carriage 400 to the main carriage 250, moves them both to the extreme left position, unlocks plate holding pawls 273, 274, Figs. 50 and 51, and permits ejection of the embossed plate into the auxiliary carriage 400. The rolling carriage, Figs. 66 and 67, is reciprocated over the plate thus ejected, and the rolled plate is in turn ejected by the pawl 625 into receptacle 533. These operations are repeated for each subsequent plate, but the rolling may be eliminated if desired.

It may be desirable to insert a plate of odd size, or of some different characteristic, without unloading the magazine or otherwise disturbing the setting of the machine for plates of a given size and type. In such case, by depressing key 670, the operator may move the main carriage 250 far enough to the right to clear the embossing dies completely so that he may swing the plate jaw 255 up to the position shown in Fig. 47 for manual loading. Manual loading is accomplished by inserting a plate in guide 732, Fig. 37, and sliding it into the jaw member 255. Thereafter, the jaw is swung down by means of handle element 255A, Fig. 49, and the carriage is restored manually to its initial embossing position. Embossing may then proceed as described above.

The printing machine shown in Figs. 71 to 80, inclusive, is particularly suited for the use of unmounted printing plates of the character described hereinabove in connection with Figs. 1 to 12, inclusive, of the drawings. Plates mounted on frames, as shown for example in Figs. 4, 6 and 8, may of course be used in various machines of the character and in the manner well known in the prior art.

It is highly advantageous in some cases, however, to be able to use unmounted plates, such as those shown in Fig. 1, for example, by feeding them to and through printing position without mounting them on frames or other backing members. For certain types of work the plates P are adequate without control tabs, cards, and other associated elements normally carried by the frame members. When this is the case the advantages of the use of unmounted plates are obvious. They include elimination of the assembly of plates with frames, very material savings in storage space, ease of handling, and important economies to users when the purchase of frames is not necessary.

Accordingly, the machine shown in Figs. 71 to 80, while basically similar to machines described in my prior patents, No. 1,975,318 issued October 2, 1934, and No. 1,992,661, issued February 26, 1935, is constructed and arranged to utilize plates which are unmounted and which are provided with no special guiding or holding means other than the groove G referred to hereinabove.

The printing machine comprises a flat substantially rectangular table top 850 supported on four legs or posts 851 suitably connected and braced by horizontal frame members 852. The table top 850 supports, on its lower surface, a casting or bracket 853 which depends therefrom to mount a number of operating elements including a main drive shaft 854 and a short jack shaft 855. Jack shaft 855 is driven by an electric motor 856 suitably supported on frame members 852. A V-belt or the like, 857, connects a pulley 858 on motor 856 with another pulley 859 on jack shaft 855. The shaft 855 carries a spur gear 861 which drives spur gear 862 on the main drive shaft 854.

Main shaft 854 has secured thereto a bevel gear 863 which drives another bevel gear 864 secured to a short horizontal shaft 865 which operates a plate feeding mechanism to be described hereinafter. Shaft 854 also bears an eccentric 866, Fig. 73, which operates platen mechanism substantially identical with that described in my aforesaid prior Patent No. 1,975,318.

Near the right end of the table 850 a magazine 870 is provided for printing plates P' which are to be fed through the machine to a position beneath a platen mechanism 871. The construction so far described is substantially identical with that described in my prior Patent No. 1,992,661, mentioned above, but the feeder is particularly designed and adapted for use with plates such as those shown in Figs. 1, 10, 11 and 12, having one or more notches in at least one longitudinal edge.

The magazine 870 comprises front and rear side walls 873 and 874 and end wall members 875 and 876 respectively at the left and right ends of the magazine, as seen in Figs. 71, 72 and 76. The end members may comprise angle or L-shaped vertical corner posts of which the front pair, not shown in Fig. 72 but indicated in Fig. 71, may be adjustably mounted, together with front wall 873, Fig. 76. Thus the magazine may be adjusted in width to accommodate plates P' of various widths. The rear side wall is fixed in accurate alignment with plate guiding and holding elements to be described hereinafter.

As best shown in Figs. 72, 77 and 79, the magazine bottom consists of a fixed plate 881 secured to the table 850 in any suitable manner. At its right end, as seen in Fig. 72, the top surface of plate 881 is cut away to provide a plurality, for example three spaced grooves 882. Grooves 882 receive a similar number of tongue elements 885 of a slidable feed plate 883 provided with depending ears 884 and mounted between a pair of guide elements 885 for rectilinear reciprocation.

The depending ears 884 are pivotally connected to a block 886 adjustably mounted on one end of a link 886'. The other end of link 886' is connected as by a screw or bolt 887 to the upper end of an oscillating arm 888 pivotally supported at its lower end on a stud 889 which projects from a depending lug 891 of the casting or bracket 853.

A crank arm 892 is secured to the front end of shaft 865 and carries a roller 893 adapted to be received in a longitudinal slot 894 of another oscillating arm 895. Arm 895 is also mounted on stud 889 directly behind the arm 888 and normally the two are latched together by a latch lever 896 mounted on a pivot 897 on arm 898 which engages a latch element 898 on arm 895. A spring 899 tends to hold lever 896 in engagement with the cooperating element 898.

Means are provided for unlatching the lever 896 from element 898. These means are identical with those described in my aforesaid Patent No. 1,992,661 and comprise briefly an upstanding arm 901 carried by lever 896, a roller 902 carried by the free end of a lever 903 pivoted on a stud 904, a vertically movable rod 905 having a spring 906 surrounding its upper end and bearing on lever 903, and an arm not shown carried by a rock shaft 908 having another arm 909 connected by a link 911 to a pedal lever 912. Depression of pedal 912 is effective to unlatch lever 896 from latch element 898 as described more fully in said Patent No. 1,992,661. Normally, however, the parts are latched together and each rotation of shaft 865 causes a reciprocation of feed plate 883 and feeds a plate out of the magazine.

Referring to Figs. 76 to 80, it will be noted that the rear side wall 874 of the magazine 870 is cut away to form an opening 915 to accommodate a portion of a post or stud 916 secured as by a screw 917 to the table top. The post 916 is substantially identical in purpose and structure with the post 187 described hereinabove in connection with mechanism for feeding plate blanks P to embossing dies. The top part of the post is tapered to provide a conical element 918 so that plates placed in the magazine will have a notch or a recess element engaged with the post, to maintain them in proper alignment. A notch or groove 919 at the bottom of post 916 permits feeding out the lowermost plate only. As mentioned above, plates may be of the serpentine edge type, shown in Figs. 1 and 76, or they may be any of the types shown in Figs. 10, 11 or 12. In any case, a notch or recess in one longitudinal edge of the plate cooperates with post 916 to retain the plates in accurately aligned relation in the magazine 870, the bottom plate only being free to be fed out of the magazine when feed plate 883 is advanced. The post 916 may be a roller, in which case the notch 919 becomes a circumferential rabbet at the lower corner of such roller.

As shown in Figs. 76, 77, 79 and 80, and as previously mentioned, the left or advance end of the feed plate 883' has the tongues 883 which ride in notches or grooves 882. With the plate in the position of Figs. 76 and 77, a projecting lip element 921 on the upper part of each of the tongues 883' engages the trailing end of the bottom plate in moving to the position of Fig. 79. Feed plate 883 thus passes under the next to bottom plate P' as shown in Fig. 79. However, as movement continues to the position shown in Fig. 80, the tongues 883' ride up the cam shaped left ends 882' of grooves 882 and the lip portions 921 rise above the bottom plate. Feeding movement is continued, however, by a shoulder element 922 on each tongue 883' below the lip 921 and lip 921 thereafter rides between the bottom plate and the next higher plate, flexing the latter somewhat and serving to break up any adhesion between such next plate and plates above it. Then after the feeding plate 883 completes its feeding stroke and is later withdrawn to the right, the next plate drops into feeding position, clearing the post 916 at notch 919 and subsequently the cycle is repeated.

As plates P' are fed out of the magazine, they enter between guiding and holding means which retain control over them during their movement into and out of printing position. Referring to Fig. 74, a grooved or channeled member 931, which may be integral with or separate from the table 850 but has its upper surface substantially flush therewith, is shaped to receive a guide rail 932. Rail 932 comprises a rectangular bar the lower part of which fits firmly in a groove 933 in the channel member 931. The upper front edge of the rail 932 is rabbeted as shown at 934 and a thin plate or strip 935, preferably of a resilient metal such as spring steel, is fastened to the rail 932 so as to project over the rabbeted portion 934.

To the front vertical face of the rail 932 there is adjustably secured another strip 936 preferably of resilient metal, for example spring steel. The upper edge is preferably of a complementary shape to engage in a groove G' provided in the lower face of each of the plate P' near the rear edge thereof, Fig. 76. The strip 936 is notched at a plurality of points, as indicated at 937, and screws 938 are passed through these notches into the rail 932. The strip 936 may thus be adjusted vertically so as to properly engage and hold plates P', in cooperation with the overlying plate or strip 935. The frictional grip on the plate should be sufficient to hold it securely and maintain it approximately in a horizontal plane.

At its right end, as seen in Figs. 72, 76, and 77, the horizontal holding strip 935 is curved upwardly as at 939 to provide a guide throat for reception of plates P' from the feed magazine. Plates P' may thus freely enter between the horizontal plate 935 and the V-edged vertical plate 936, but as they progress toward the left, the plate 935 forces them down so that the groove G' in each plate frictionally engages the sharp upper edge of vertical plate 936. As the plates P' are fed one after another, each succeeding plate advances those ahead by an amount equal to the length of one plate. As shown in Fig. 72, there may be, for example, four plates P' between the magazine 870 and the printing position under the platen 871. Each of these plates is quite firmly held and accurately aligned by the holding elements 935 and 936, no other holding device being required. This simple plate guiding, aligning and holding mechanism, in combination with the grooved plate structure described in detail hereinabove, constitutes an important feature of my invention.

When a plate P' reaches printing position, beneath the platen structure 871, a rigid support must be provided since the plate gripping elements 935 and 936 are obviously inadequate for holding the plate for a printing impression. Hence an anvil block 940 is provided in the channel member 931, directly below the platen mechanism. Since the free longitudinal edges of plates held by the gripping elements 935 and 936 may be disposed slightly below the table level the anvil member 940 is beveled as at 941 at its right end, Figs. 72 and 75, to guide the plates P' onto its supporting surface.

When a plate P' has reached printing position, where it is supported under the platen mechanism 871 by anvil block 940, a sheet or strip of paper and an inking ribbon, not shown, are disposed above the plate. As the platen descends the printing characters on the upper face of the plate P' produce an impression on the lower surface of the sheet of paper or the like in a manner well known in the art.

The platen mechanism 871 is operated by the eccentric 866 on shaft 854 in precisely the same manner as described in my aforesaid Patent No. 1,975,318. The operating structure comprises eccentric strap 951, Fig. 73, connected through link 952 to depending arm 953 of platen lever 954 pivotally mounted at 955. A spring 956 tends to hold the platen in raised position. Safety mechanism, indicated generally at 960, is provided and is identical with that described in said Patent No. 1,975,318.

A pedal lever 971 is pivoted on a transverse frame member as 852 and connected by a link 972 to a bail member 973 which controls a clutch mechanism 974 through a rod 975. See Fig. 71. The construction and operation of such control mechanism forms no part of my present invention, being described in detail in my aforesaid Patent No. 1,992,661.

From the above description it is believed that the construction and operation of the printing mechanism will be clear. Grooved plates are fed one by one from the magazine 870 into the frictional guiding structure 934, 935, 936, each plate advancing those in front of it, to dispose such plates sequentially in printing position over the anvil block 940 and beneath the platen 871. After printing is effected, the plates are pushed on to the left to a suitable receiving compartment 980, Fig. 1, where they are preferably stacked for reuse in the same order in which they are sequentially passed through the machine.

The advantages flowing from the plate construction illustrated in Figs. 1 to 12 and described in detail hereinabove are thus utilized both in plate embossing mechanism and in printing mechanism. Grooved plates may be fed and positively controlled by simple effective guiding, control and holding elements at every stage of the various operations through which such plates must be passed. The feeding mechanisms in the embossing and printing machinery alike take advantage of its grooved structure to maintain accurate alignment and register during movement to working position with a positive and effective holding by extremely simple mechanism during various required mechanical operations. The means whereby a plate may be securely held and controlled by engagement with a narrow longitudinal marginal portion, leaving the major part of the plate free for embossing, rolling, printing and like operations, thus constitute an important feature of my invention.

While I have thus described my invention, with reference to certain specific structural forms and features, it will be understood that variations may be made in the shape and location of the plate groove, in the means for receiving, guiding and holding the plate, and in various other instrumentalities, parts and mechanisms hereinabove described.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a machine for embossing printing characters on printing plate blanks having grooves and notches formed therein, the combination of a blank magazine, means for feeding blanks from said magazine, means for engaging a notch in each blank in said magazine, except the lowermost blank, to prevent premature feeding of any blank except the lowermost, and means for engaging a groove in each blank fed from said magazine to hold said blank securely and accurately during embossing thereof.

2. In a machine for embossing printing characters on printing plate blanks, the combination of a blank magazine, a reciprocating feeder for advancing blanks from said magazine to an embossing station, holding means at said station for gripping a longitudinal marginal edge of a blank and for processing it through said embossing station, means for receiving embossed plates from said holding means and passing them through a rolling station, and means at said rolling station for rolling embossed plates to bring to an even height the printing characters embossed thereon.

3. In an embossing machine of the character described, a magazine for printing plate blanks having grooves formed therein, embossing dies at an embossing station, a plate carriage opposite said station, means for advancing a blank from said magazine to said carriage, plate holding means on said carriage adapted to engage a groove in a plate to retain accurate control over said plate during an embossing operation, and guide means for directing a plate from said magazine into said holding means.

4. In an embossing machine of the character described, a magazine for printing plate blanks having grooves formed therein, embossing dies at an embossing station, rolling means at a rolling station, plate holding means including a groove engaging element for controlling a plate at said embossing station, other holding means including a groove engaging element for carrying said plate to said rolling station, and means for feeding said plate from said magazine and to said embossing station.

5. In an embossing machine, means for feeding plates having grooves formed therein, a main carriage adapted to process said plates through an embossing station and provided with groove engaging means for holding said plates, means defining a rolling station and including rolling means, and an auxiliary carriage adapted to process said plates through said rolling station after they have been embossed and comprising groove engaging means for holding said plates.

6. In combination, in a plate embossing machine, a main carriage, a plate feeder for feeding plate blanks onto and discharging embossed plates from said main carriage, an auxiliary carriage for receiving embossed plates discharged from said main carriage, means for moving said main carriage in one direction, and selective means for connecting said auxiliary carriage to said moving means.

7. In combination, in a plate embossing machine, a main carriage, a plate feeder for feeding plate blanks onto and discharging embossed plates from said main carriage, an auxiliary carriage for receiving embossed plates discharged from said main carriage, means for moving said main carriage in one direction, selective means for connecting said auxiliary carriage to said moving means for simultaneous movement in the same direction with said main carriage, and separate means for moving each of said carriages in the opposite direction.

8. In combination, in a plate embossing machine, a main carriage, an auxiliary carriage, hydraulically operated means for moving said main carriage in one direction, stop means capable of being selectively positioned to stop movement of said main carriage in one position or to allow movement to continue to another position, key operated means for controlling said stop means, and automatic means for connecting said auxiliary carriage to said moving means when said stop is positioned to allow said main carriage to move to said second named position.

9. In combination, in a plate embossing machine, a carriage, a hydraulic pump and piston assembly for moving said carriage, selectively operable stop means to limit movement of said carriage and a pressure operable bypass to allow said pump to complete an operating cycle when said carriage is stopped before being moved as far as the volume of fluid being pumped would normally move said carriage.

10. In a plate embossing machine, the combination of a hydraulically operated plate feeder, a hydraulically operated plate carriage, a hydraulic pump for supplying hydraulic fluid under pressure to operate said feeder and said carriage, and key controlled means for directing the flow of fluid selectively to operate said feeder and carriage simultaneously or to operate said carriage without operating said feeder.

11. In a plate embossing machine, a hydraulically operated plate feeder, a plate carriage for processing plates through an embossing station, an auxiliary carriage for receiving embossed plates from said plate carriage, hydraulic piston means for operating said plate carriage, means for selectively connecting said auxiliary carriage to said hydraulic piston means, a hydraulic pump for supplying operating fluid to said feeder and said piston means, and a key controlled valve for selectively operating said piston means only or said piston means and said feeder simultaneously.

12. In a plate embossing machine, a main carriage for processing a plate having a groove formed therein through an embossing station, and a plate holding jaw mounted on said carriage and comprising a planar backing element, a groove engaging element, and means for holding said plate against longitudinal displacement with respect to said elements.

13. In a machine of the character described, a plate advancing carriage, a line spacing frame mounted on said carriage, a plate holding jaw mounted on said frame, a stop member, means for returning said carriage to a normal initial position against said stop member and effective to move said frame by an amount corresponding to one line space after a line of printing characters has been embossed on said plate, and key controlled means effective to return said frame to an initial position, to render said stop member ineffective, and to release a plate held by said jaw, when a plate has been completely embossed.

14. In a machine of the character described, a plate feeder, key controlled means for operating said plate feeder, a main carriage selectively movable to an initial embossing position or to a plate loading position, an auxiliary plate unloading carriage, means for moving said main carriage to either of said positions, key controlled means for connecting said auxiliary carriage to said moving means when said main carriage is moved to said plate loading position, and automatic means for releasing a plate held by said main carriage and for receiving it in said auxiliary carriage when the plate feeder feeds a new plate to said main carriage.

WALTER T. GOLLWITZER.

REFERENCES CITED

The following references are of record in the file of this patent:

UNITED STATES PATENTS

| Number | Name | Date |
|---|---|---|
| 1,790,665 | Hubbard | Feb. 3, 1931 |
| 1,893,463 | McCain | Jan. 3, 1933 |
| 1,930,798 | Gollwitzer | Oct. 17, 1933 |
| 1,955,803 | Gollwitzer | Apr. 24, 1934 |
| 1,961,156 | McCain | June 5, 1934 |
| 1,992,663 | Gollwitzer | Feb. 26, 1935 |
| 2,030,865 | Gollwitzer | Feb. 18, 1936 |
| 2,115,455 | Chisholm | Apr. 26, 1938 |
| 2,279,142 | Kittel | Apr. 7, 1942 |